US012766813B2

(12) United States Patent
Oya et al.

(10) Patent No.: US 12,766,813 B2
(45) Date of Patent: Oct. 20, 2026

(54) PROTECTIVE FILM, RESIN SUBSTRATE, LAMINATE OF PROTECTIVE FILM AND RESIN SUBSTRATE, RESIN SHEET LAMINATE, AND PROTECTIVE FILM SET

(71) Applicant: SUMITOMO BAKELITE CO., LTD., Tokyo (JP)

(72) Inventors: Hiroshi Oya, Tokyo (JP); Tomoki Matsui, Tokyo (JP); Atsushi Izumi, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 20 days.

(21) Appl. No.: 18/284,380

(22) PCT Filed: Mar. 29, 2022

(86) PCT No.: PCT/JP2022/015418

§ 371 (c)(1),
(2) Date: Sep. 27, 2023

(87) PCT Pub. No.: WO2022/210702

PCT Pub. Date: Oct. 6, 2022

(65) Prior Publication Data

US 2024/0165920 A1 May 23, 2024

(30) Foreign Application Priority Data

Mar. 29, 2021 (JP) ................................ 2021-055667
Mar. 31, 2021 (JP) ................................ 2021-062379

(Continued)

(51) Int. Cl.
*B32B 7/12* (2006.01)
*B32B 7/06* (2019.01)

(Continued)

(52) U.S. Cl.
CPC ................. *B32B 7/12* (2013.01); *B32B 7/06* (2013.01); *B32B 27/08* (2013.01); *B32B 27/32* (2013.01);

(Continued)

(58) Field of Classification Search
CPC ..... B32B 38/0036; B32B 38/04; B32B 38/10; B32B 2038/042
See application file for complete search history.

(56) References Cited

U.S. PATENT DOCUMENTS

2014/0272401 A1 9/2014 Kim et al.
2015/0355395 A1 12/2015 Kimura et al.

(Continued)

FOREIGN PATENT DOCUMENTS

CN 102241951 A 11/2011
CN 103906819 A 7/2014

(Continued)

OTHER PUBLICATIONS

International Search Report dated Jun. 28, 2022, issued in counterpart International Application No. PCT/JP2022/015418 (4 pages).

(Continued)

*Primary Examiner* — Zachary M Davis
(74) *Attorney, Agent, or Firm* — WHDA, LLP

(57) ABSTRACT

The protective film 10 is used by being attached to a resin substrate 21 in a case of performing heat bending on the resin substrate while heating the resin substrate. The protective film includes a base material layer and a pressure sensitive adhesive layer which is positioned between the base material layer and the resin substrate, and is adhered to the resin substrate. The base material layer is composed of a laminate including a first layer which is positioned on a side opposite to the pressure sensitive adhesive layer and a second layer which is positioned on a side of the pressure (Continued)

sensitive adhesive layer. The protective film has a trouser elongation strain at break of 300% or less in a direction inclined at 45° to both MD and TD of the protective film, which is measured in accordance with JIS K 7128-1 (1998).

13 Claims, 7 Drawing Sheets

(30) Foreign Application Priority Data

| | | |
|---|---|---|
| Mar. 31, 2021 | (JP) | 2021-062391 |
| Mar. 31, 2021 | (JP) | 2021-062397 |
| Mar. 31, 2021 | (JP) | 2021-062398 |
| Jan. 11, 2022 | (JP) | 2022-002654 |
| Jan. 11, 2022 | (JP) | 2022-002655 |
| Jan. 11, 2022 | (JP) | 2022-002656 |
| Jan. 11, 2022 | (JP) | 2022-002657 |

(51) Int. Cl.

| | |
|---|---|
| ***B32B 27/08*** | (2006.01) |
| ***B32B 27/32*** | (2006.01) |
| ***B32B 38/00*** | (2006.01) |
| ***B32B 38/18*** | (2006.01) |

(52) U.S. Cl.

CPC ...... *B32B 38/0036* (2013.01); *B32B 38/1866* (2013.01); *B32B 2250/40* (2013.01); *B32B 2255/10* (2013.01); *B32B 2255/26* (2013.01); *B32B 2307/4026* (2013.01); *B32B 2307/412* (2013.01); *B32B 2307/538* (2013.01); *B32B 2307/54* (2013.01); *B32B 2307/704* (2013.01)

(56) References Cited

U.S. PATENT DOCUMENTS

| | | | |
|---|---|---|---|
| 2019/0129072 | A1 | 5/2019 | Ueno et al. |
| 2020/0385612 | A1 | 12/2020 | Onodera |
| 2021/0024782 | A1 | 1/2021 | Onodera et al. |

FOREIGN PATENT DOCUMENTS

| | | | |
|---|---|---|---|
| EP | 2116580 | A1 | 11/2009 |
| EP | 3 112 151 | A1 | 1/2017 |
| JP | 9-176586 | A | 7/1997 |
| JP | 2003-145616 | A | 5/2003 |
| JP | 2008-30349 | A | 2/2008 |
| JP | 2009-102629 | A | 5/2009 |
| JP | 2010-69760 | A | 4/2010 |
| JP | 2012-212120 | A | 11/2012 |
| JP | 2016-11131 | A | 1/2016 |
| JP | 2017-116882 | A | 6/2017 |
| JP | 2017-173427 | A | 9/2017 |
| JP | 2018-083327 | A | 5/2018 |
| JP | 2018-183922 | A | 11/2018 |
| JP | 2020-26103 | A | 2/2020 |
| JP | 2020-175672 | A | 10/2020 |
| WO | 2014/115705 | A1 | 7/2014 |
| WO | 2015/129426 | A1 | 9/2015 |
| WO | 2019/182047 | A1 | 9/2019 |

OTHER PUBLICATIONS

Notice of Reasons for Refusal dated Aug. 15, 2023, issued in counterpart JP Patent Application No. 2022-002654, w/English translation (6 pages).

Decision to Grant a Patent dated Aug. 15, 2023, issued in counterpart JP Patent Application No. 2022-002656, w/ English translation (5 pages).

Notice of Reasons for Revocation dated Sep. 6, 2024, issued in counterpart JP Patent No. 7351360, with English translation.(17 pages).

Catalog of products of "Tretech (R) Surface Protection Film", Toray Film Processing Co., Ltd., 2020, retrieved on Nov. 22, 2023, Internet <URL: https://www.toray-taf.co.jp/products/toretec.html>, with English translation (13 pages); Cited in JP Notice of Reasons for Revocation dated Sep. 6, 2024.

Report on measurement of crystallinity of #50-7H52 and #50-7A62, Mitsui Chemical Analysis Center Co., Ltd., 2023, with English translation.(6 pages); Cited in JP Notice of Reasons for Revocation dated Sep. 6, 2026.

Report on Trouser Breaking Elongation Strain of Film Samples (#50-7H52, #50-7A62), Tearing Strength Test Report, with English translation.(13 pages); Cited in JP Notice of Reasons for Revocation dated Sep. 6, 2026.

Report "Measurementof Crystallinity of Toraytec 7832C", Kyoto Industrial Technology Research Institute, 2024, with English translation. (6 pages); Cited in JP Notice of Reasons for Revocation dated Sep. 6, 2024.

Report "Measurement of Trouser Breaking Elongation Strain of Toraytec 7832C", Nihon Matai Co., Ltd., 2024, with English translation.(6 pages); Cited in JP Notice of Reasons for Revocation dated Sep. 6, 2024.

Report "Measurement of Trouser Breaking Elongation Strain of Tretech 7832C after Heating and Cooling", Nihon Matai Co., Ltd., 2024, with English translation.(6 pages); Cited in JP Notice of Reasons for Revocation dated Sep. 6, 2024.

Notice of Reasons for Revocation dated Mar. 13, 2025, issued in counterpart JP Patent No. 7351360, with English translation.(57 pages).

PROTECTIVE FILM, RESIN SUBSTRATE, LAMINATE OF PROTECTIVE FILM AND RESIN SUBSTRATE, RESIN SHEET LAMINATE, AND PROTECTIVE FILM SET

TECHNICAL FIELD

The present invention relates to a protective film which is used to be attached to a resin substrate in a case where the resin substrate is subjected to heat bending under heating, a resin substrate subjected to heat bending using such a protective film, a laminate of a protective film and a resin substrate in which such a protective film is attached to the resin substrate, a resin sheet laminate, and a protective film set.

BACKGROUND ART

With regard to a lens for sunglasses provided with a resin substrate having a configuration in which both surfaces of a polarizer are coated with a coating layer formed of a polycarbonate resin, a polyamide resin, or a cellulose resin, for example, with protective films attached to both surfaces of the resin substrate, which has a flat plate shape in a plan view, the resin substrate is punched into a predetermined shape such as a circular shape in the plan view, and then the resin substrate is subjected to heat bending while being heated. Next, after peeling off the protective films from the heat-bent resin substrate, a polycarbonate layer is injection-molded on a concave surface of this resin substrate to manufacture the lens for sunglasses.

As the protective film, for example, a protective film having a configuration in which a base material containing a polyolefin-based resin as a main material is attached to the resin substrate through a pressure sensitive adhesive layer containing, as a main material, polyethylene, an ethylene-propylene copolymer, and the like has been suggested (for example, see PTL 1).

However, the protective film having such a configuration can be attached to the resin substrate without being peeled off in a case of punching the resin substrate and in a case of performing heat bending, but it has the following problems. That is, in a case of punching the resin substrate, in a cut surface which is formed by carrying out the punching, the pressure sensitive adhesive layer extends to the resin substrate side, which causes so-called whiskers. As a result, in a case where the protective film is peeled off from the resin substrate, the pressure sensitive adhesive layer remains as the whiskers on the cut surface of the resin substrate. Accordingly, there has been a problem that the yield of the lens for sunglasses to be manufactured is reduced.

In addition, as described above, the protective films are attached to both surfaces of the resin substrate prior to punching the resin substrate, and this attachment is usually carried out using human hands, an arm provided with a machine tool, or the like. In the attachment of such a protective film, due to wrinkles in the protective film, air bubbles remaining between the protective film and the resin substrate, and the like, after at least part of the protective film is once peeled off from the resin substrate, in some cases, the peeled protective film may be re-attached (re-adhered) to the resin substrate.

However, with the protective film configured as described above, after peeling off the protective film from the resin substrate, re-adhesion of the protective film to be re-attached to the resin substrate cannot be sufficiently obtained. Therefore, the current situation is that development of a protective film having excellent re-adhesion is demanded.

In addition, in the protective film having such a configuration, the following problems may arise in a case where the protective film is peeled off from the resin substrate after the resin substrate is heat-bent. That is, in a case where the protective film is peeled off from the resin substrate after the heat bending of the resin substrate, a surface of the resin substrate, from which the protective film has been peeled off, is charged by static electricity caused by this peeling, and as a result, environmental foreign matter such as dust, scattered in the air, adheres to the surface of the resin substrate. Accordingly, there has been a problem that the yield of the lens for sunglasses to be manufactured is reduced.

In addition, as described above, a plurality of processings such as the punching of the resin substrate and the heat bending of the resin substrate are applied to the resin substrate, and during these processings, the processings are carried out in a state in which the protective film is attached to the resin substrate, that is, a laminate is formed.

During these processings, it is required that the protective film stably maintains the state in which the laminate is formed without peeling off the protective film from the resin substrate, but since conditions and the like in each processing are different, naturally, a degree of adhesive force required between the protective film and the resin substrate is also different. That is, the degree of adhesive force to the resin substrate, which is required for the protective film, varies depending on the varies types of processings, but as described above, the current situation is that there is no protective film excellent in usability in which the degree of adhesive force to the resin substrate can be selected according to various processings.

The same problem arises not only in the lens for sunglasses described above, but also in resin substrates such as a lens of goggles and a visor of helmets.

In addition, for example, a light-transmitting resin sheet having a polarizing function for the purpose of increasing contrast of the visual field, antiglare, and the like is known (for example, see PTL 2). This light-transmitting resin sheet is used by being attached to eyewear such as eyeglasses, sunglasses, and sun visors.

The light-transmitting resin sheet includes a polarizing layer including a polarizer and a resin layer covering the polarizing layer, and it has been suggested that the resin layer is mainly composed of a polycarbonate resin, and a slow axis of the polarizing layer is disposed in substantially the same direction as an absorption axis of the polarizing layer (for example, see PTL 3).

In addition, the light-transmitting resin sheet having such a structure is used in a state of being attached to one surface of the lens of the eyewear.

Therefore, in order to maintain visual quality of scenery visually recognized by a wearer of the eyewear, the light-transmitting resin sheet is required to be attached to the lens without fail both in vertical and horizontal directions and in upper and lower (front and back) directions. Accordingly, before being cut into a shape of the lens, the light-transmitting resin sheet is generally formed as a long sheet so that the vertical and horizontal directions can be distinguished. In order to distinguish the upper and lower directions, for example, in PTL 4, peelable protective films having different reflectances are laminated on an upper surface (front surface) and a lower surface (back surface) of the light-transmitting resin sheet (long sheet).

However, in this case, it is necessary to reflect light on the protective films laminated on the upper and lower surfaces to distinguish the upper and lower directions, and the current situation is that, since it takes time to distinguish the upper and lower directions, it is possible to easily distinguish the upper and lower directions from a difference in color tone visually recognized on the upper surface and the lower surface, and there is a demand for development of a protective film excellent in usability.

Such problems are not limited to the above-described protective film laminated on the light-transmitting resin sheet which is provided on the lens of eyewear such as sunglasses and eyeglasses, and the same problems arise with a protective film laminated on an emission window (light-transmitting resin sheet) provided in head-up display devices, or a display portion (light-transmitting resin sheet) included in smartphones, PC displays, car navigation systems, center information displays, and the like.

CITATION LIST

Patent Literature

[PTL 1] Japanese Unexamined Patent Application, First Publication No. 2003-145616

[PTL 2] WO2014/115705

[PTL 3] Japanese Unexamined Patent Application, First Publication No. 2017-116882

[PTL 4] Japanese Unexamined Patent Application, First Publication No. 2020-26103

SUMMARY OF INVENTION

Technical Problem

An object of the present invention is to provide a protective film in which, in a case of punching a resin substrate and then peeling off the protective film from the resin substrate, it is possible to accurately suppress or prevent a pressure sensitive adhesive layer from remaining on a cut surface which is formed by carrying out the punching.

Another object of the present invention is to provide a protective film which has excellent re-adhesion of being re-attached to the resin substrate in a case where the protective film is attached to the resin substrate and then at least a part of the protective film is peeled off.

Another object of the present invention is to provide a protective film in which, in a case of peeling off the protective film from the resin substrate after heat bending of the resin substrate, it is possible to accurately suppress or prevent environmental foreign matter from adhering to a surface of the resin substrate, a resin substrate subjected to heat bending using such a protective film, and a laminate of a protective film and a resin substrate in which such a protective film is attached to the resin substrate.

Another object of the present invention is to provide a protective film in which a degree of adhesive force to the resin substrate can be selected according to a type of processing applied to the resin substrate.

Another object of the present invention is to provide a resin sheet laminate in which, in a state in which a protective film laminated on each of both surfaces of an upper surface and a lower surface of a light-transmitting resin sheet, upper and lower directions of the light-transmitting resin sheet can be distinguished based on a difference in color tone between the upper surface and the lower surface, and a protective film set with which such a resin sheet laminate can be produced.

Solution to Problem

Such objects can be achieved by the present invention described in the following items (1) to (33).

(1) A protective film which is used by being attached to a resin substrate in a case of performing heat bending on the resin substrate while heating the resin substrate, the protective film including:

a base material layer; and a pressure sensitive adhesive layer which is positioned between the base material layer and the resin substrate, and is adhered to the resin substrate, in which the base material layer is composed of a laminate including a first layer which is positioned on a side opposite to the pressure sensitive adhesive layer and a second layer which is positioned on a side of the pressure sensitive adhesive layer, and the protective film has a trouser elongation strain at break of 300% or less in a direction inclined at 45° to both MD and TD of the protective film, which is measured in accordance with JIS K 7128-1 (1998).

(2) The protective film according to (1) described above, in which the protective film has a trouser elongation strain at break of 50% or more and 250% or less in the directions inclined at 45° to both MD and TD of the protective film, which is measured in accordance with JIS K 7128-1 (1998) after heating the protective film at 145° C. for 30 minutes and cooling the heated protective film at 25° C. for 30 minutes.

(3) The protective film according to (1) or (2) described above, in which the protective film has a nominal tensile strain at break of 400% or more and 650% or less, which is measured with an autograph manufactured by Shimadzu Corporation (tensile speed: 500 mm/min) in accordance with JIS K 7127 using a test piece (No. 1 dumbbell) obtained from the protective film under an atmosphere of 23° C. and 60% RH.

(4) The protective film according to any one of (1) to (3) described above, in which the protective film has a degree of crystallinity of 10% or more and 75% or less.

(5) A protective film which is used by being attached to a resin substrate in a case of performing heat bending on the resin substrate while heating the resin substrate, the protective film including:

a base material layer; and a pressure sensitive adhesive layer which is positioned between the base material layer and the resin substrate, and is adhered to the resin substrate, in which the base material layer is composed of a laminate including a first layer which is positioned on a side opposite to the pressure sensitive adhesive layer and a second layer which is positioned on a side of the pressure sensitive adhesive layer, and the pressure sensitive adhesive layer has a surface roughness Ra of 0.20 μm or less in a surface on a side of the resin substrate, which is measured in accordance with JIS B 0601.

(6) The protective film according to (5) described above, in which the protective film has an elastic modulus at 25° C. of 300 MPa or less and 600 MPa or less.

(7) The protective film according to (5) or (6) described above, in which, in a case where the protective film having a width of 25 mm and a length of 200 mm is attached to a polycarbonate substrate, and in an environment of 25° C., one end of the protective film is held and the protective film is peeled off in a direction of 90° to a position of a length of 100, and then the one end of the protective film is released to re-attach the protective film to the polycarbonate substrate, after 1 minute from the re-attachment, a total area in a plan view of a region where the polycarbonate substrate and the protective film are not bonded to each other is less than 1250 $mm^2$.

(8) A protective film which is used by being attached to a resin substrate in a case of performing heat bending on the resin substrate while heating the resin substrate, and subsequently being peeled off from the resin substrate after the heat bending, the protective film including:

a base material layer; and a pressure sensitive adhesive layer which is positioned between the base material layer and the resin substrate, and is adhered to the resin substrate, in which the base material layer is composed of a laminate including a first layer which is positioned on a side opposite to the pressure sensitive adhesive layer and a second layer which is positioned on a side of the pressure sensitive adhesive layer, and the protective film is configured such that, in a case where the protective film is peeled off from the resin substrate, a surface of the pressure sensitive adhesive layer on a side of the resin substrate is charged with a negative charge, and by the negative charge, a surface of the resin substrate on a side of the pressure sensitive adhesive layer is charged with a positive charge.

(9) The protective film according to (8) described above, in which, in a case where the protective film is peeled off from the resin substrate, a surface of the pressure sensitive adhesive layer on a side of the second layer is charged with a positive charge.

(10) A protective film which is used by being attached to a resin substrate in a case of performing heat bending on the resin substrate while heating the resin substrate, the protective film including:

a base material layer; and a pressure sensitive adhesive layer which is positioned between the base material layer and the resin substrate, and is adhered to the resin substrate, in which the base material layer is composed of a laminate including a first layer which is positioned on a side opposite to the pressure sensitive adhesive layer and a second layer which is positioned on a side of the pressure sensitive adhesive layer, and the pressure sensitive adhesive layer contains polyolefin having pressure sensitive adhesiveness as a main material and has two or more different melting points.

(11) The protective film according to (10) described above, in which the pressure sensitive adhesive layer contains at least two materials having different melting points as constituent materials.

(12) The protective film according to (11) described above, in which, in the constituent materials, a difference between a melting point of the constituent material having a lowest melting point and a melting point of the constituent material having a highest melting point is 5° C. or higher and 80° C. or lower.

(13) The protective film according to (12) described above, in which the melting point of the constituent material having the lowest melting point is 60° C. or higher and 130° C. or lower.

(14) The protective film according to (12) or (13) described above, in which the melting point of the constituent material having the highest melting point is 80° C. or higher and 160° C. or lower.

(15) The protective film according to any one of (10) to (14) described above, in which, in a case where, in accordance with JIS Z 0273:2009, the protective film is attached to a polycarbonate substrate by pressure-bonding the protective film with a rubber roll at a speed of 2 m/min with a pressure of 5880 N/m, and after heating the protective film under conditions of 100° C. for 30 minutes and then cooling the heated protective film to 23° C., the protective film is cut into a size of 100 mm in length and 25 mm in width, and then one end of the cut protective film is held and the protective film is peeled off in a direction of 90° at a speed of 200 mm/min, a peel strength measured is in a range of 0.05 N/25 mm or more and 0.6 N/25 mm or less.

(16) The protective film according to any one of (10) to (15) described above, in which, in a case where, in accordance with JIS Z 0273:2009, the protective film is attached to a polycarbonate substrate by pressure-bonding the protective film with a rubber roll at a speed of 2 m/min with a pressure of 5880 N/m, and after heating the protective film under conditions of 145° C. for 30 minutes and then cooling the heated protective film to 23° C., the protective film is cut into a size of 100 mm in length and 25 mm in width, and then one end of the cut protective film is held and the protective film is peeled off in a direction of 90° at a speed of 200 mm/min, a peel strength measured is in a range of 0.15 N/25 mm or more and 1.5 N/25 mm or less.

(17) The protective film according to any one of (10) to (16) described above, in which a heating temperature of subjecting the resin substrate to the heat bending while heating the resin substrate is 110° C. or higher and 160° C. or lower.

(18) The protective film according to any one of (1) to (17) described above, in which the pressure sensitive adhesive layer contains, as a main material, a polyolefin-based resin having pressure sensitive adhesiveness.

(19) The protective film according to any one of (1) to (18) described above, in which the first layer contains a thermoplastic resin as a main material and a melting point of the thermoplastic resin is 150° C. or higher, and the second layer contains a thermoplastic resin as a main material and a melting point of the thermoplastic resin is 120° C. or higher.

(20) The protective film according to (19) described above, in which both the thermoplastic resin contained in the first layer and the thermoplastic resin contained in the second layer are polyolefins.

(21) The protective film according to any one of (1) to (20) described above, in which the protective films are attached to both surfaces of the resin substrate.

(22) The protective film according to any one of (1) to (21) described above, in which at least one side constituting an edge of the resin substrate forms a curved convex curve in a plan view.

(23) The protective film according to any one of (1) to (22) described above, in which a coating layer, which is formed of a single layer or a laminate having at least one layer of a polycarbonate resin layer, a polyamide resin layer, and a cellulose resin layer, is provided on one surface or the other surface of the resin substrate, or the coating layers are provided on both surfaces of the resin substrate.

(24) The protective film according to any one of (1) to (23) described above, in which the resin substrate is subjected to the heat bending by carrying out press molding or vacuum molding.

(25) A resin substrate subjected to heat bending while heating the resin substrate to which a protective film is attached, where the resin substrate is subjected to the heat bending in a state in which the protective film is attached to the resin substrate and the protective film is peeled off from the resin substrate after the heat bending, in which the protective film includes a base material layer, and a pressure sensitive adhesive layer which is positioned between the base material layer and the resin substrate, and is adhered to the resin substrate, the base material layer is composed of a laminate including a first layer which is positioned on a side opposite to the pressure sensitive adhesive layer and a second layer which is positioned on a side of the pressure sensitive adhesive layer, and in a case where the protective film is peeled off, a surface of the pressure sensitive adhesive layer on a side of the resin substrate is charged with a negative charge, and by the negative charge, a surface of the resin substrate on a side of the pressure sensitive adhesive layer is charged with a positive charge.

(26) A laminate of a protective film and a resin substrate, which is formed by subjecting a resin substrate to heat bending in a state in which a protective film is attached to the resin substrate, in which the resin substrate is subjected to the heat bending in a state in which the protective film is attached to the resin substrate and the protective film is peeled off from the resin substrate after the heat bending, the protective film includes a base material layer, and a pressure sensitive adhesive layer which is positioned between the base material layer and the resin substrate, and is adhered to the resin substrate, the base material layer is composed of a laminate including a first layer which is positioned on a side opposite to the pressure sensitive adhesive layer and a second layer which is positioned on a side of the pressure sensitive adhesive layer, and in a case where the protective film is peeled off from the resin substrate, a surface of the pressure sensitive adhesive layer on a side of the resin substrate is charged with a negative charge, and by the negative charge, a surface of the resin substrate on a side of the pressure sensitive adhesive layer is charged with a positive charge.

(27) A resin sheet laminate including:

a light-transmitting resin sheet having light-transmitting properties; and protective films peelably laminated on both surfaces of the light-transmitting resin sheet, in which one protective film has light-shielding property, and at least one of the other protective film and the light-transmitting resin sheet is colored.

(28) The resin sheet laminate according to (27) described above, in which the one protective film contains a light-shielding material.

(29) The resin sheet laminate according to (28) described above, in which the light-shielding material is a white light-shielding material, and is at least one of titanium oxide, aluminum oxide, calcium oxide, zinc white, lead white, zinc sulfide, antimony white, and lithopone.

(30) The resin sheet laminate according to any one of (27) to (29) described above, in which the one protective film has a total light transmittance of 80% or less.

(31) The resin sheet laminate according to any one of (27) to (30) described above, in which the other protective film is colored.

(32) The resin sheet laminate according to any one of (27) to (31) described above, in which the light-transmitting resin sheet is used as a light-transmitting cover member of eyewear, which is in a state in which the protective film is peeled off.

(33) The resin sheet laminate according to any one of (27) to (31) described above, in which the light-transmitting resin sheet is used as a light-transmitting cover member of eyewear, which is in a state in which the protective film is peeled off.

Advantageous Effects of Invention

According to the present invention, in the protective film, a trouser elongation strain at break in a direction inclined at 45° to both MD and TD of the protective film, which is measured in accordance with JIS K 7128-1 (1998), is set to 300% or less. In this way, by setting the trouser elongation strain at break in a direction inclined at 45° to both MD and TD of the protective film to the above-described upper limit value or less, it is possible to, in a case of punching a resin substrate and then peeling off the protective film from the resin substrate, accurately suppress or prevent a pressure sensitive adhesive layer from remaining as so-called whiskers in which the pressure sensitive adhesive layer extends to the resin substrate side on a cut surface which is formed by carrying out the punching. Accordingly, in a case where the resin substrate is applied to, for example, a resin substrate of a lens for sunglasses, the lens for sunglasses can be manufactured with high yield.

In addition, according to another embodiment of the present invention, in the pressure sensitive adhesive layer included in the protective film, a surface roughness Ra of a surface on a side of the resin substrate, which is measured in accordance with JIS B 0601, is set to 0.20 μm or less. In this way, by setting the surface roughness Ra of the pressure sensitive adhesive layer in the surface on a side of the resin substrate to the above-described upper limit value or less, it is possible to obtain a protective film which has excellent re-adhesion of being re-attached to the resin substrate in a case where the protective film is attached to the resin substrate and then at least a part of the protective film is peeled off.

In addition, according to another embodiment of the present invention, the protective film is configured such that, in a case where the protective film is peeled off from the resin substrate, a surface of the pressure sensitive adhesive layer on a side of the resin substrate is charged with a negative charge, and by the negative charge, a surface of the resin substrate on a side of the pressure sensitive adhesive layer is charged with a positive charge. Here, most of the environmental foreign matter such as dust, scattered in the air, are generally charged with a positive charge. Therefore, as in the present invention, in a case where the protective film is peeled off from the resin substrate, static electricity due to this peeling causes a surface of the resin substrate on the pressure sensitive adhesive layer side to be charged with a positive charge, thereby exerting a repulsive force between the environmental foreign matter and the resin substrate. As a result, it is possible to accurately suppress or prevent the environmental foreign matter from adhering to the surface of the resin substrate, from which the protective film has been peeled off. Accordingly, in a case where the resin substrate is applied to, for example, a resin substrate of a lens for sunglasses, the lens for sunglasses can be manufactured with high yield.

In addition, according to another embodiment of the present invention, the pressure sensitive adhesive layer included in the protective film contains polyolefin having pressure sensitive adhesiveness as a main material and has two or more different melting points. Accordingly, by making the pressure sensitive adhesive layer have two or more different melting points, it is possible to obtain a protective film in which a degree of adhesive force to the resin substrate can be selected according to a type of processing applied to the resin substrate.

In addition, according to another embodiment of the present invention, in a resin sheet laminate including protective films peelably laminated on both surfaces of an upper surface and a lower surface of a light-transmitting resin sheet, one protective film has light-shielding property, and at least one of the other protective film and the light-transmitting resin sheet is colored. Accordingly, based on difference in color tone between the upper surface and the lower surface in the resin sheet laminate, it is possible to distinguish between the upper surface and the lower surface in the resin sheet laminate in a state in which the protective films are laminated on the both surfaces of the upper surface and the lower surface of the light-transmitting resin sheet, thereby distinguishing upper and lower directions of the light-transmitting resin sheet.

DESCRIPTION OF EMBODIMENTS

Figure 1A:
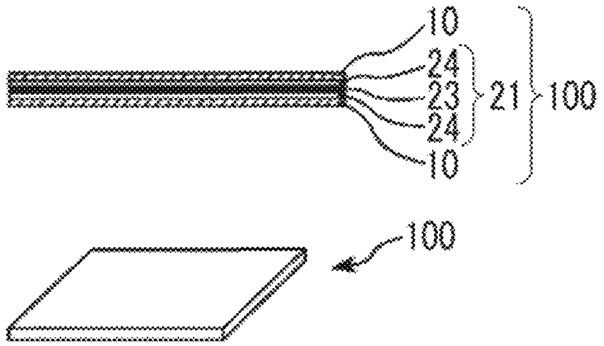
FIGS. 1A to 1D show schematic views for describing a method of manufacturing a lens for sunglasses using a protective film according to a suitable embodiment of the present invention.

Hereinafter, a protective film according to the present invention will be described in detail based on suitable embodiments illustrated in the accompanying drawings. A main material in the present specification refers to a constituent material contained in each layer in an amount of 50% by weight or more, and for example, "first layer 16 contains a thermoplastic resin as a main material" refers to that, in a case where the total weight of the first layer 16 is 100% by weight, the thermoplastic resin contained in the first layer 16 accounts for 50% by weight or more in the first layer 16.

First Embodiment

First, a first embodiment of the protective film according to the present invention will be described.

The protective film according to the present embodiment is a protective film which is used by being attached to a resin substrate in a case of performing heat bending on the resin substrate while heating the resin substrate, the protective film including a base material layer and a pressure sensitive adhesive layer which is positioned between the base material layer and the resin substrate, and is adhered to the resin substrate, in which the base material layer is composed of a laminate including a first layer which is positioned on a side opposite to the pressure sensitive adhesive layer and a second layer which is positioned on a side of the pressure sensitive adhesive layer, and the protective film has a trouser elongation strain at break of 300% or less in a direction inclined at 45° to both MD and TD of the protective film, which is measured in accordance with JIS K 7128-1 (1998).

By configuring the protective film as described above, that is, by setting the trouser elongation strain at break in a direction inclined at 45° to both MD and TD of the protective film to the above-described upper limit value or less, it is possible to, in a case of punching a resin substrate and then peeling off the protective film from the resin substrate, accurately suppress or prevent a pressure sensitive adhesive layer from remaining as so-called whiskers in which the pressure sensitive adhesive layer extends to the resin substrate side on a cut surface which is formed by carrying out the punching. Accordingly, in a case where the resin substrate is applied to, for example, a resin substrate of a lens for sunglasses, the lens for sunglasses can be manufactured with high yield.

Hereinafter, a method of manufacturing a lens for sunglasses using the protective film according to the present embodiment will be described prior to describing the protective film according to the present embodiment.

<Method of Manufacturing Lens for Sunglasses>

FIGS. 1A to 1D show schematic views for describing a method of manufacturing a lens for sunglasses using the protective film. Hereinafter, for convenience of description, the upper side of FIGS. 1A to 1D will be referred to as "upper" and the lower side thereof will be referred to as "lower".

Hereinafter, each step in the method of manufacturing a lens for sunglasses will be described in detail.

[1] First, a resin substrate 21 having a flat plate shape is prepared, and a protective film 10 (masking tape) is attached to both surfaces of the resin substrate 21, thereby obtaining a laminate 100 in which the protective film 10 is attached to the both surfaces of the resin substrate 21 (see FIG. 1A).

In the present embodiment, as the resin substrate 21, a substrate in which a polarizer 23 is coated on both surfaces with coating layers 24 is prepared, the polarizer 23 functioning as an optical element that extracts linearly polarized light having a polarization surface in one predetermined direction from unpolarized natural light. The coating layer 24 of the resin substrate 21 is composed of a single layer or a laminate having at least one layer of a polycarbonate resin layer, a polyamide resin layer, and a cellulose resin layer such as triacetyl cellulose. Furthermore, in addition to a case where the coating layer 24 is formed on both surfaces (surfaces on both sides) of the polarizer 23, the coating layer 24 may be formed on any one of the upper surface (one surface) and the lower surface (the other surface).

Figure 1B:
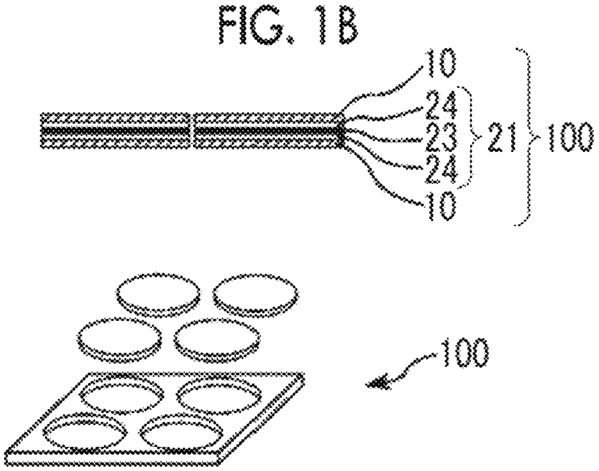

[2] Next, as illustrated in FIG. 1B, the prepared laminate 100, that is, the resin substrate 21 in a state in which the protective film 10 is attached to the both surfaces of the resin substrate 21 is punched in a thickness direction thereof, thereby forming the laminate 100 into a circular shape in a plan view.

Figure 1C:
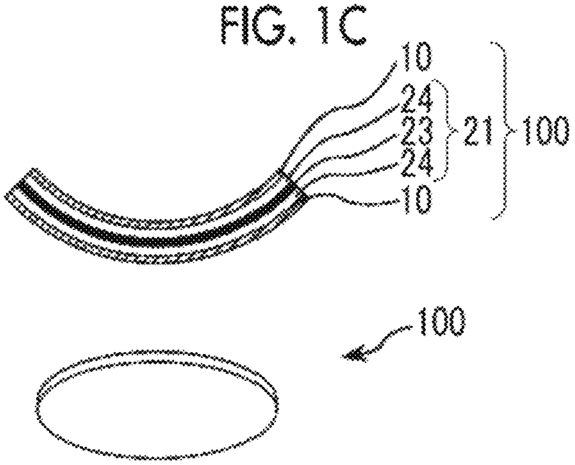

[3] Next, as illustrated in FIG. 1C, the laminate 100 which has been formed into a circular shape is subjected to heat bending while being heated.

The heat bending is typically performed by press molding or vacuum molding (REMA molding) using a mold.

As described above, in the present embodiment, since the resin substrate 21 includes the coating layer 24, and the coating layer 24 is composed of a single layer or a laminate having at least one layer of a polycarbonate resin layer, a polyamide resin layer, and a cellulose resin layer, heating temperature (molding temperature) of the laminate 100 (resin substrate 21) at this time is set to be preferably in a range of approximately 110° C. or higher and 160° C. or lower, and more preferably in a range of approximately 140° C. or higher and 150° C. or lower in consideration of melting or softening temperature of the coating layer 24. By setting the heating temperature to be within the above-described range, the resin substrate 21 can be reliably heat-bended in a state in which the resin substrate 21 is softened or melted while preventing change in quality and deterioration of the resin substrate 21.

Figure 1D:
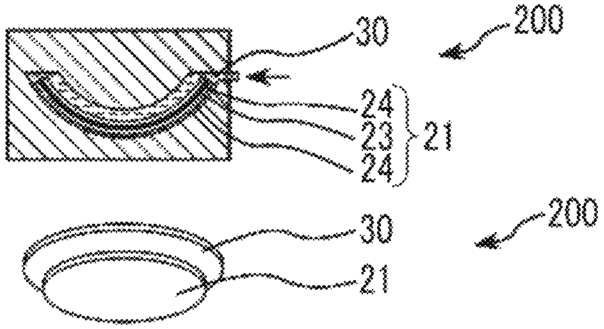

[4] Next, as illustrated in FIG. 1D, the protective film 10 is peeled off from the heat-bended resin substrate 21, that is, the heat-bended laminate 100, and a polycarbonate layer 30 formed of a polycarbonate resin is injection-molded on a concave surface of this resin substrate 21. A polyamide layer formed of a polyamide resin may be formed on the concave surface of the resin substrate 21 in place of the polycarbonate layer 30.

In this manner, a lens 200 for sunglasses including the heat-bended resin substrate 21 is manufactured.

Figure 2:
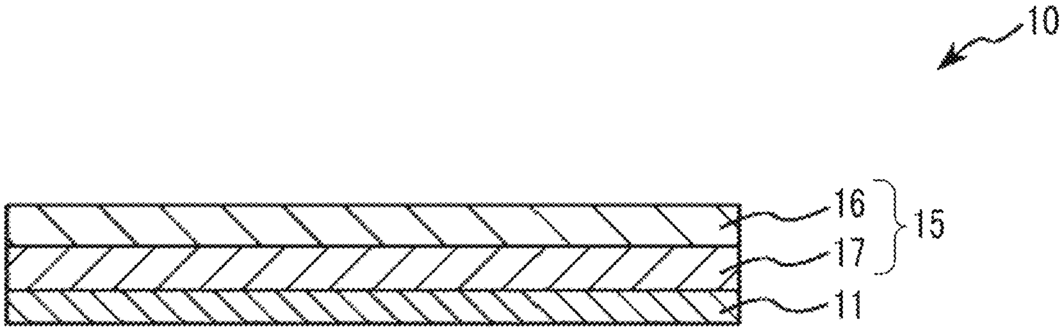
FIG. 2 shows a longitudinal cross-sectional view illustrating a suitable embodiment of the protective film of the present invention.

Here, in the method of manufacturing a lens for sunglasses described above, particularly in the above-described step [2], in a case of punching the resin substrate 21, at a cut surface (end surface) of the resin substrate 21, which is formed by carrying out the punching, a pressure sensitive adhesive layer 11 shown in FIG. 2 extends to a side of the resin substrate 21, which may cause so-called whiskers. In a case of, in the above-described step [4], peeling off the protective film 10 from the resin substrate 21 in a state in which whiskers are formed, the pressure sensitive adhesive layer 11 as the whiskers remains on the cut surface of the resin substrate 21. Accordingly, there has been a problem that the yield of the lens 200 for sunglasses to be manufactured is reduced.

As a result of studies on the problems, the present inventor has found that the generation of the whiskers on the cut surface of the resin substrate 21 due to the extension of the pressure sensitive adhesive layer 11 occurs, as described above, in a case where the laminate 100 is punched out so as to form a circular shape in a plan view, that is, in a case where the resin substrate 21 is punched out in a plan view so that sides constituting an edge thereof form a curved convex curve, and thus the whiskers are frequently generated on the cut surface of the resin substrate 21, which is a curved convex surface.

In addition, according to further studies, the present inventor has found that the above-described generation of the whiskers on the cut surface (curved convex surface) of the resin substrate 21 is related to a degree of a trouser elongation strain at break of the protective film 10, which is measured in accordance with JIS K 7128-1 (1998), and also closely related to an angle of the protective film 10 at which the trouser elongation strain at break is measured.

Further, as a result of further studies on the above-described generation of the whiskers on the cut surface of the resin substrate 21, which is a curved convex surface, the degree of the trouser elongation strain at break of the protective film 10, and the angle of protective film 10 for measuring the trouser elongation strain at break, the present inventors have found that, by setting the degree of the trouser elongation strain at break in a direction inclined at 45° to both MD and TD of the protective film 10 to 300% or less, it is possible to accurately suppress or prevent the above-described generation of the whiskers on the cut surface of the resin substrate 21, which is a curved convex surface, and completed the present invention.

As described above, by setting the degree of the above-described trouser elongation strain at break to 300% or less, in the above-described step [2], in a case of punching the resin substrate 21, at the cut surface of the resin substrate 21, which is formed by carrying out the punching, the generation of the whiskers in the pressure sensitive adhesive layer 11 extending toward the resin substrate 21 side can be accurately suppressed or prevented. Therefore, in the above-described step [4], in a case of peeling off the protective film 10 from the resin substrate 21, it is possible to peel off the protective film 10 (pressure sensitive adhesive layer 11) from the resin substrate 21 in a state of accurately suppressing or preventing the above-described whiskers from remaining on the cut surface of the resin substrate 21. Accordingly, the lens 200 for sunglasses can be manufactured with high yield. Hereinafter, the protective film 10 (protective film according to the present embodiment) will be described in detail.

<Protective Film 10>

FIG. 2 is a longitudinal cross-sectional view illustrating a suitable embodiment of the protective film of the present invention. Hereinafter, for convenience of description, the upper side of FIG. 2 will be referred to as "upper" and the lower side thereof will be referred to as "lower".

The protective film 10 includes a base material layer 15 and a pressure sensitive adhesive layer 11 which is positioned between this base material layer 15 and the resin substrate 21 and is adhered (bonded) to the resin substrate 21. Furthermore, as illustrated in FIG. 2, the base material layer 15 includes a first layer 16 which is positioned on the opposite side of the pressure sensitive adhesive layer 11, that is, on a molding die side and a second layer 17 which is positioned on the pressure sensitive adhesive layer 11 side, that is, on the resin substrate 21 side.

Hereinafter, each of these layers will be described in detail.

<<Pressure Sensitive Adhesive Layer 11>>

The pressure sensitive adhesive layer 11 is positioned (interposed) between the base material layer 15 and the resin substrate 21, and is a layer for bonding the base material layer 15 to the resin substrate 21 by adhering to the resin substrate 21.

As the pressure sensitive adhesive layer 11, a pressure sensitive adhesive layer which enables the punching and heat bending of the resin substrate 21 in the above-described step [2] and the above-described step [3] without peeling off the protective film 10 from the resin substrate 21 and enables peeling of the protective film 10 off from the resin substrate 21 in the above-described step [4] is preferably used.

In the pressure sensitive adhesive layer 11, as a thermoplastic resin, a resin having a configuration in which a polyolefin-based resin alone is contained in the pressure sensitive adhesive layer 11 or a resin having a configuration in which a combination of a polyolefin-based resin and an elastomer is contained in the pressure sensitive adhesive layer 11 is preferable. By configuring the pressure sensitive adhesive layer 11 to contain such a resin as the thermoplastic resin, functions as the pressure sensitive adhesive layer 11 can be reliably exhibited.

In addition, a polyolefin-based resin having pressure sensitive adhesiveness is not particularly limited. Examples thereof include a homopolymer of polypropylene, a homopolymer of polyethylene, a propylene-ethylene block copolymer having an EPR phase (rubber phase), an ethylene-vinyl acetate block copolymer, an ethylene-ethyl acrylate block copolymer, and an ethylene-methyl methacrylate block copolymer, and these may be used alone or in a combination of two or more kinds thereof. Among these, a homopolymer of polyethylene is preferable. The homopolymer of polyethylene is available at a relatively low cost. Transparency can be imparted to the pressure sensitive adhesive layer 11 in a case where the pressure sensitive adhesive layer 11 contains the homopolymer of polyethylene. Accordingly, in a case where the base material layer 15 also has transparency, the protective film 10 can have transparency. Therefore, in a case of, in the above-described step [1], attaching the protective film 10 to the resin substrate 21, it is possible to visually confirm whether or not dirt such as dust is present between the protective film 10 and the resin substrate 21. Accordingly, it is possible to reliably prevent a laminate 100 having dirt therebetween from being transitioned to the steps subsequent to the above-described step [2], and as the result, the yield of the lens 200 for sunglasses to be obtained can be improved.

The homopolymer of polyethylene is not particularly limited, and examples thereof low density polyethylene (LDPE), linear low density polyethylene (LLDPE), high density polyethylene (HDPE), and very low density polyethylene (VLDPE). One or a combination of two or more of these polyethylenes can be used.

In addition, the elastomer is not particularly limited, and examples thereof include an α-polyolefin-based resin/polyethylene copolymer elastomer, an α-polyolefin-based resin/polypropylene copolymer elastomer, and a styrene block elastomer. Among these, a styrene block elastomer is preferable, and a styrene-olefin-styrene block copolymer elastomer is particularly preferable. In a case where the elastomer is further contained in addition to the polyolefin-based resin as described above, it is possible to accurately suppress or prevent the pressure sensitive adhesive layer 11 from remaining on the resin substrate 21 during the peeling of the protective film 10 off from the resin substrate 21 in the above-described step [4], that is, accurately suppress or prevent adhesive residues from being generated on the resin substrate 21. Therefore, the protective film 10 can be more smoothly peeled off from the resin substrate 21. In a case where the elastomer includes styrene as a monomer component, it is possible to accurately suppress or prevent adhesive residues from being generated on the resin substrate 21 in the above-described step [4].

Examples of the α-polyolefin-based resin include 1-hexene, 4-methyl-1-pentene, 1-octene, 1-butene, 1-pentene, and 1-heptene.

In addition, in a case where the styrene-olefin-styrene block copolymer elastomer is used as the elastomer, a content of styrene in the elastomer is preferably 25% by weight or less, and more preferably in a range of 10% by weight or more and 18% by weight or less. In this manner, it is possible to accurately suppress or prevent an increase in hardness of the pressure sensitive adhesive layer 11 caused by an increase in content of styrene. Accordingly, it is possible to more accurately suppress or prevent adhesive residues from being generated on the resin substrate 21 while reliably maintaining adhesive force of the pressure sensitive adhesive layer 11 against the resin substrate 21 (coating layer 24).

Furthermore, examples of the styrene-olefin-styrene block copolymer include a styrene-isobutylene-styrene block copolymer (SIBS), a styrene-ethylene-butylene-styrene block copolymer (SEBS), a styrene-butadiene-styrene block copolymer (SBS), and a styrene-isoprene-styrene copolymer (SIS). Among these, a styrene-ethylene-butylene-styrene block copolymer (SEBS) is preferable. In a case where SEBS is selected as the styrene-olefin-styrene block copolymer, a content of styrene in the elastomer can be easily set to be 25% by mass or less, and the above-described effects can be reliably obtained.

In addition, in a case where the pressure sensitive adhesive layer 11 contains the elastomer, a content of the elastomer in the pressure sensitive adhesive layer 11 is not particularly limited, but is preferably set to in a range of 2% by weight or more and 60% by weight or less, and more preferably set to in a range of 4% by weight or more and 40% by weight or less. In this manner, the effects obtained by containing the elastomer in the pressure sensitive adhesive layer 11 can be exhibited more significantly.

In addition, an average thickness of the pressure sensitive adhesive layer 11 is preferably in a range of 5 μm or more and 40 μm or less, and more preferably in a range of 10 μm or more and 20 μm or less. In this manner, the above-described functions as the pressure sensitive adhesive layer 11 can be reliably exhibited.

<<Base Material Layer 15>>

The base material layer 15 is bonded to the resin substrate 21 (coating layer 24) through the pressure sensitive adhesive layer 11, thereby functioning as a functional layer (protective layer) that protects (masks) the resin substrate 21 during the punching and heat bending of the resin substrate 21 in the above-described step [2] and the above-described step [3] and as a protective layer (functional layer) for peeling off (releasing) the resin substrate 21 (protective film 10) from a mold used for heat bending after the heat bending in the above-described step [3].

In addition, in the above-described step [4], in a case of peeling off the protective film 10 from the heat-bended resin substrate 21, excellent adhesion to the pressure sensitive adhesive layer 11 is exhibited without peeling between the base material layer 15 and the pressure sensitive adhesive layer 11.

In the present embodiment, as illustrated in FIG. 2, in order to allow the base material layer 15 to exhibit these functions, the base material layer 15 is composed of a laminate having the first layer 16 which is positioned on the side opposite to the pressure sensitive adhesive layer 11, that is, on a molding die side and the second layer 17 which is positioned on the pressure sensitive adhesive layer 11 side, that is, on the resin substrate 21 side.

Hereinafter, the first layer 16 and the second layer 17 will be described.

<<First Layer 16>>

The first layer 16 is positioned on the side opposite to the pressure sensitive adhesive layer 11, and functions as an outermost layer for protecting (masking) the resin substrate 21 in a case of the punching and heat bending of the resin substrate 21 in the above-described step [2] and the above-described step [3].

In the first layer 16, for the purpose of maintaining excellent releasability from the molding die after the heat bending in the above-described step [3], that is, allowing the first layer 16 not to adhere to the molding die (mold), a melting point of the first layer 16 is preferably 150° C. or higher and more preferably in a range of approximately 155° C. or higher and 170° C. or lower. Here, as described above, the heating temperature of the coating layer 24 (resin substrate 21) in a case of the heat bending in the step [3] is set to be preferably in a range of approximately 110° C. or higher and 160° C. or lower. Therefore, by setting the melting point of the first layer 16 as described above, it is possible to reliably prevent the first layer 16 from being melted or softened in a case of the heat bending in the above-described step [3]. Accordingly, it is possible to reliably release the laminate 100 from the molding die after the heat bending in the above-described step [3].

The first layer 16 contains, as a main material, preferably a thermoplastic resin having a melting point of 150° C. or higher, and more preferably a thermoplastic resin having a melting point in a range of approximately 155° C. or higher and 170° C. or lower. In this manner, the melting point of the first layer 16 can relatively easily be set to 150° C. or higher. Accordingly, it is possible to maintain excellent releasability of the laminate 100 from the molding die after the heat bending in the above-described step [3].

In the present specification, the melting point of each layer which constitutes the protective film 10 including the first layer 16 is acquired by multiplying, by the ratio of each constituent material, the melting point (the peak temperature obtained by DSC measurement) of each constituent material contained in each layer and summing the obtained values, and the acquired value is defined as the melting point.

In addition, in a case where the second layer 17 described later is also configured to contain a thermoplastic resin of 150° C. or higher, adhesion between the first layer 16 and the second layer 17 can be further improved. Accordingly, in the above-described step [4], in a case of peeling off the protective film 10 from the heat-bended resin substrate 21, it is possible to accurately suppress or prevent peeling between the first layer 16 and the second layer 17.

Furthermore, the first layer 16 preferably has a configuration in which, as the thermoplastic resin of 150° C. or higher, the first layer 16 contains only a polyolefin-based resin of 150° C. or higher. The polyolefin-based resin of 150° C. or higher can be obtained relatively easily and inexpensively as the thermoplastic resin of 150° C. or higher.

In addition, the polyolefin-based resin having a melting point of 150° C. or higher is not particularly limited, and examples thereof include resins of a homopolymer of polypropylene, a homopolymer of polyethylene, a propylene-ethyl acrylate copolymer, an ethylene-vinyl acetate copolymer, an ethylene-ethyl acrylate copolymer, and an ethylene-methyl methacrylate copolymer, which have a melting point of 150° C. or higher, and these may be used alone or in a combination of two or more kinds thereof. Among these, a homopolymer of polyethylene having a melting point of 150° C. or higher is preferable. In this manner, it is possible to easily and inexpensively obtain a polyolefin-based resin having a melting point of 150° C. or higher. In addition, it is possible to impart transparency to the first layer 16. Therefore, in a case where the second layer 17 and the pressure sensitive adhesive layer 11 also have transparency, the protective film 10 has transparency. Therefore, in a case of, in the above-described step [1], attaching the protective film 10 to the resin substrate 21, it is possible to visually confirm whether or not dirt such as dust is present between the protective film 10 and the resin substrate 21. Accordingly, it is possible to reliably prevent a laminate 100 having dirt therebetween from being transitioned to the steps subsequent to the above-described step [2], and as the result, the yield of the lens 200 for sunglasses to be obtained can be improved.

The above-described copolymer may be either a block copolymer or a random copolymer.

In addition, an average thickness of the first layer 16 is preferably in a range of 2 μm or more and 40 μm or less, and more preferably in a range of 5 μm or more 25 μm or less. In this manner, the above-described functions as the first layer 16 can be reliably exhibited.

<<Second Layer 17>>

Since the second layer 17 is positioned on the side of the pressure sensitive adhesive layer 11, that is, the resin substrate 21 side, the second layer 17 is positioned between the pressure sensitive adhesive layer 11 and the first layer 16, and functions as an intermediate layer for bonding these layers.

The second layer 17 contains, as a main material, a thermoplastic resin having adhesiveness (pressure sensitive adhesiveness) in order to exhibit the above-described functions, and as a result, the pressure sensitive adhesive layer 11 and the first layer 16 can be bonded with exhibit adhesion through the second layer 17. Accordingly, in the above-described step [4], in a case of peeling off the protective film 10 from the resin substrate 21, peeling between the pressure sensitive adhesive layer 11 and the second layer 17 and between the first layer 16 and the second layer 17 is accurately suppressed or prevented.

The thermoplastic resin having adhesiveness (adhesive resin) is not particularly limited, examples thereof include a polyolefin-based resin, an elastomer, an acrylic resin, and a polyurethane-based resin, and these may be used alone or in a combination of two or more kinds thereof. Among these, a polyolefin-based resin or an elastomer, which has adhesiveness, is preferable. In addition, in a case where the pressure sensitive adhesive layer 11 contains an elastomer, it is particularly preferable to use a combination of a polyolefin-based resin and an elastomer. In this manner, adhesion between the pressure sensitive adhesive layer 11 and the second layer 17 can be improved, and it is possible to accurately suppress or prevent peeling between the pressure sensitive adhesive layer 11 and the second layer 17.

In addition, examples of the polyolefin-based resin include an ethylene-vinyl acetate copolymer (EVA), an ethylene-maleic acid anhydride copolymer, an ethylene-methyl methacrylate copolymer (EMMA), an ethylene-methyl acrylate copolymer (EMA), an ethylene-methacrylic acid copolymer (EMAA), an ethylene-acrylic acid copolymer (EAA), an ethylene-ethylacrylic acid copolymer (EEA), and an ethylene-methacrylate-glycidyl acrylate terpolymer, and include grafted products obtained by grafting, onto various polyolefin-based resins, a monobasic unsaturated fatty acid such as acrylic acid and methacrylic acid, a dibasic unsaturated fatty acid such as maleic acid, fumaric acid, and itaconic acid, or an anhydride thereof, and functional group-introduced products obtained by introducing, into various polyolefin-based resins, a functional group such as a carboxylic acid group, a hydroxyl group, an amino group, an acid anhydride group, an oxazoline group, and an epoxy group, and these may be used alone or in a combination of two or more kinds thereof. Examples of the above-described grafted product include a maleic acid-grafted EVA and a maleic acid-grafted ethylene-α-polyolefin-based resin copolymer.

As the elastomer, the same materials as those described as the elastomer contained in the pressure sensitive adhesive layer 11 can be used, and among these, a styrene block elastomer is preferable, and a styrene-olefin-styrene block copolymer elastomer is particularly preferable. In this way, in a case where the elastomer includes styrene as a monomer component, since the adhesion of the second layer 17 to the pressure sensitive adhesive layer 11 is improved, it is possible to accurately suppress or prevent adhesive residues from being generated on the resin substrate 21 in the above-described step [4].

In addition, the second layer 17 may contain, as a constituent material, a thermoplastic resin having no adhesiveness (non-adhesive resin) in addition to the thermoplastic resin having adhesiveness. Since the thermoplastic resin having no adhesiveness exhibits excellent affinity with the polyolefin-based resin contained in the first layer 16 and having a melting point of 150° C. or higher, the adhesion between the first layer 16 and the second layer 17 can be improved. Accordingly, in the above-described step [4], in a case of peeling off the protective film 10 from the resin substrate 21, it is possible to accurately suppress or prevent peeling between the first layer 16 and the second layer 17.

Examples of the thermoplastic resin having no adhesiveness include a polyolefin-based resin, polyesters, polyurethanes, silicone resins, polyamides, polyimides, polyvinyl chlorides, and polycarbonates, and these may be used alone or in a combination of two or more kinds thereof. Among these, a polyolefin-based resin is preferable, and a polyolefin-based resin having a melting point of 150° C. or higher is more preferable. In this manner, the above-described effects can be exhibited more significantly.

In addition, the polyolefin-based resin is not particularly limited, and examples thereof include a homopolymer of polypropylene, a homopolymer of polyethylene, a propylene-ethyl acrylate copolymer, an ethylene-vinyl acetate copolymer, an ethylene-ethyl acrylate copolymer, and an ethylene-methyl methacrylate copolymer, and these may be used alone or in a combination of two or more kinds thereof. Among these, a homopolymer of polyethylene is preferable. In this manner, it is possible to easily and inexpensively obtain the polyolefin-based resin. In addition, it is possible to impart transparency to the second layer 17. Therefore, in a case where the first layer 16 and the pressure sensitive adhesive layer 11 also have transparency, the protective film 10 has transparency. Therefore, in a case of, in the above-described step [1], attaching the protective film 10 to the resin substrate 21, it is possible to visually confirm whether or not dirt such as dust is present between the protective film 10 and the resin substrate 21. Accordingly, it is possible to reliably prevent a laminate 100 having dirt therebetween from being transitioned to the steps subsequent to the above-described step [2], and as the result, the yield of the lens 200 for sunglasses to be obtained can be improved.

Furthermore, a melting point of the polyolefin-based resin having a melting point of 150° or higher is preferably in a range of 155° C. or higher and 170° C. or lower.

The above-described copolymer may be either a block copolymer or a random copolymer. Here, since the polyolefin-based resin having a melting point of 150° C. or higher alone does not have adhesiveness, the polyolefin-based resin having a melting point of 150° C. or higher alone is generally used as the thermoplastic resin having no adhesiveness. However, for example, a propylene-ethylene random copolymer (melting point: 151° C.) has adhesiveness so as to be used as the thermoplastic resin having adhesiveness.

From the above, in a case where the second layer 17 contains the thermoplastic resin having no adhesiveness, the thermoplastic resin having adhesiveness and the thermoplastic resin having no adhesiveness are preferably a combination of the elastomer and the polyolefin-based resin having a melting point of 150° C. or higher. With such a combination, it is possible to accurately suppress or prevent peeling between the pressure sensitive adhesive layer 11 and the second layer 17 and between the first layer 16 and the second layer 17.

The melting point of the second layer 17 having the above-described configuration is preferably 120° C. or higher. Here, as described above, the heating temperature of the coating layer 24 (resin substrate 21) in a case of the heat bending in the step [3] is set to be preferably in a range of approximately 110° C. or higher and 160° C. or lower. Therefore, in a case where the melting point of the second layer 17 is set to in a range of 120° C. or higher and lower than 150° C., it is possible to relatively easily melt or soften the second layer 17 during the heat bending in the above-described step [3]. As a result, in the above-described step [3], since the second layer 17 exhibits the function as the intermediate layer in a molten or softened state, and the first layer 16 can be shifted in a surface direction of the resin substrate 21, a gripping part formed of the first layer 16 can be reliably formed on the edge of the laminate 100. Accordingly, since the peeling of the protective film 10 in the above-described step [4] can be performed by gripping the gripping part, the peeling can be easily performed. In addition, in the above-described step [3], since the second layer 17 exhibits the function as the intermediate layer in a molten or softened state, it is possible to improve cushioning property of the second layer 17 during molding with a mold. As a result, unevenness of the mold or unevenness of contaminants unintentionally mixed between the mold and the protective film 10 can be effectively absorbed, so that the heat-bended resin substrate 21 has an excellent appearance.

In addition, in a case where the melting point of the second layer 17 is set to 150° C. or higher, it is possible to suppress or prevent the second layer 17 from being melted or softened during the heat bending in the above-described step [3]. Therefore, it is possible to accurately suppress or prevent a decrease in adhesive force between the first layer 16 and the second layer 17. Accordingly, in the above-described step [4], in a case of peeling off the protective film 10 from the heat-bended resin substrate 21, peeling between the first layer 16 and the second layer 17 is reliably prevented.

In addition, an average thickness of the second layer 17 is preferably in a range of 10 μm or more and 60 μm or less, and more preferably in a range of 10 μm or more 40 μm or less. In this manner, the above-described functions as the second layer 17 can be reliably exhibited.

In the protective film 10 including the pressure sensitive adhesive layer 11 and the base material layer 15 with the above configuration, it is sufficient that a degree A of the trouser elongation strain at break in a direction inclined at 45° to both MD and TD of the protective film 10 satisfies 300% or less, but the degree A of the trouser elongation strain at break is preferably 275% or less, more preferably in a range of 110% or more and 250% or less, still more preferably in a range of 130% or more and 240% or less, and particularly preferably in a range of 130% or more and 220% or less. As a result, in the above-described step [2], in a case of punching the resin substrate 21, at the cut surface of the resin substrate 21, which is a curved convex surface, it is possible to more accurately suppress or prevent the generation of so-called whiskers in which the pressure sensitive adhesive layer 11 extends to the resin substrate 21 side.

The trouser elongation strain A at break can be acquired in accordance with JIS K 7128-1 (1998) by preparing, as a test piece, the protective film 10 having a length of 100 mm, a width of 50 mm, a thickness of 50 μm, and a cut of 50 mm, and then tearing this test piece with the MD and TD inclined at 45°, in which a distance between grips of the test piece is 50 mm and a tensile speed is 200 mm/min.

In addition, the trouser elongation strain at break (tensile elongation strain) is calculated by the following expression (1) by dividing a distance between chucks at a breaking point by the distance between the grips of the test piece (50 mm).

$$\text{Breaking point (mm)/distance between chucks (mm)} = \text{Trouser elongation strain at break} \quad (1)$$

In addition, in the protective film 10, a trouser elongation strain B at break in the directions inclined at 45° to both MD and TD of the protective film, which is measured in accordance with JIS K 7128-1 (1998) after heating the protective film at 145° C. for 30 minutes and cooling the heated protective film at 25° C. for 30 minutes, is preferably in a range of 100% or more and 250% or less, more preferably in a range of 110% or more and 160% or less, and still more preferably in a range of 110% or more and 130% or less. Therefore, by setting the above-described trouser elongation strain B at break after heating the protective film at 145° C. for 30 minutes to be within the above-described range, since the protective film 10 can be configured to be cut relatively easily, in the above-described step [2], the punching of the resin substrate 21 can be reliably performed while accurately suppressing or preventing the generation of the whiskers on the cut surface of the resin substrate 21, which is a curved convex surface.

Furthermore, in the protective film 10, a nominal tensile strain at break, which is measured with an autograph manufactured by Shimadzu Corporation (tensile speed: 500 mm/min) in accordance with JIS K 7127 using a test piece (No. 1 dumbbell) obtained from the protective film 10, in which the MD direction of the protective film 10 is a longitudinal direction of the dumbbell, under an atmosphere of 23° C. and 60% RH, is preferably in a range of 400% or more and 650% or less, and more preferably in a range of 450% or more and 600% or less.

By setting the above-described nominal tensile strain at break of the protective film 10 to be within the above-described range, it is possible to relatively easily set the degree of the above-described trouser elongation strain A at break to the above-described upper limit value or less, and relatively easily set to the degree of the above-described trouser elongation strain B at break to be within the above-described range.

In addition, a degree of crystallinity of the protective film 10 is preferably in a range of 10% or more and 75% or less, more preferably in a range of 17% or more and 60% or less, and still more preferably in a range of 20% or more and 55% or less. By setting the degree of crystallinity of the protective film 10 to be within the above-described range, since it is possible to relatively easily set the above-described nominal tensile strain at break of the protective film 10 to be within the above-described range, it is possible to set the degree of the above-described trouser elongation strain A at break to the above-described upper limit value or less, and set to the degree of the above-described trouser elongation strain B at break to be within the above-described range.

The degree of crystallinity of the protective film 10 can be acquired by calculating a crystal peak area ratio to a total area using a wide-angle X-ray diffractometer.

$$\text{Degree of crystallinity [\%]} = (\Sigma \text{ crystal peak area}) \div (\text{total area}) \times 100$$

The protective film 10 having the degree of crystallinity within such a range can be obtained by adjusting the degree of crystallinity as follows, for example.

That is, in a case where the protective film 10 is manufactured using a co-extrusion method described later, the protective film 10 can be obtained by appropriately setting a cooling rate and a cooling temperature when cooling a laminate of the pressure sensitive adhesive layer 11, the first layer 16, and the second layer 17 in a molten or softened state, which are laminated in layers by being extruded from a co-extrusion T-die. In addition, in the above-described step [1], in a case where the laminate 100 is obtained by attaching the protective films 10 to the both surfaces of the resin substrate 21, conditions for attaching the protective films 10 can be adjusted as appropriate. Furthermore, the pressure sensitive adhesive layer 11, the first layer 16, and the second layer 17, which are included in the protective film 10, can be adjusted by appropriately setting the combination of constituent materials, and it can also be adjusted by including a crystal nucleating agent as the constituent material.

Examples of the crystal nucleating agent include sorbitol-based crystal nucleating agents, organic phosphoric acid-based crystal nucleating agents, rosin acid-based crystal nucleating agents, amide-based crystal nucleating agents, aromatic carboxylic acid-based crystal nucleating agents, and inorganic crystal nucleating agents, and these may be used alone or in a combination of two or more kinds thereof.

Each layer of the pressure sensitive adhesive layer 11 and the base material layer 15 (the first layer 16 and the second layer 17) in the above-described protective film 10 may contain various additives such as an antiblocking agent, an antioxidant, a light stabilizer, and an antistatic agent, in addition to the above-described constituent materials. A content of the above-described additive can be 10% by weight or less or 8% by weight or less, and can be 0.001% by weight or more or 0.1% by weight or more.

In particular, the first layer 16 preferably contains an antiblocking agent. As a result, the function of the first layer 16, which enables maintaining excellent releasability from the molding die, can be exhibited more reliably.

In addition, as the antiblocking agent, for example, inorganic particles, organic particles, or the like can be used, and these may be used alone or in a combination of two or more kinds thereof. The inorganic particles are not particularly limited, and examples thereof include particles such as silica, zeolites, smectites, mica, vermiculite, and talc; and the organic particles are not particularly limited, and examples thereof particles of acrylic resins, polyolefin-based resins, polyester-based resins, polyurethane-based resins, polystyrene-based resins, silicone-based resins, and fluorine-based resins.

In a case where the first layer 16 contains the antiblocking agent, a content of the antiblocking agent in the first layer 16 is not particularly limited, but is preferably in a range of 0.5% by weight or more and 10% by weight or less, and more preferably in a range of 1% by weight or more and 9% by weight or less. In this manner, the above-described functions of the first layer 16 can be exhibited more significantly.

In addition, an intermediate layer containing the above-described additives may be formed between these layers.

Furthermore, the above-described protective film 10 may be manufactured using any method, and for example, the protective film 10 can be manufactured using a co-extrusion method.

Specifically, three extruders are prepared, and after containing the constituent materials of the pressure sensitive adhesive layer 11, the first layer 16, and the second layer 17, respectively, the constituent materials in a melted or softened state are extruded. In this manner, from a co-extrusion T die, a laminate in which the layers are laminated in a molten or softened state is supplied to a sheet molding unit configured of a plurality of cooling rolls, and then is cooled in this sheet supplying unit, thereby manufacturing the protective film 10.

Second Embodiment

Next, a second embodiment of the protective film according to the present invention will be described.

Hereinafter, the second embodiment of the protective film according to the present invention will be described, but the differences from the above-described first embodiment will be mainly described, and the same matters will be omitted.

The protective film according to the present embodiment is a protective film which is used by being attached to a resin substrate in a case of performing heat bending on the resin substrate while heating the resin substrate, the protective film including a base material layer and a pressure sensitive adhesive layer which is positioned between the base material layer and the resin substrate, and is adhered to the resin substrate, in which the base material layer is composed of a laminate including a first layer which is positioned on a side opposite to the pressure sensitive adhesive layer and a second layer which is positioned on a side of the pressure sensitive adhesive layer, and the pressure sensitive adhesive layer has a surface roughness Ra of 0.20 μm or less in a surface on a side of the resin substrate, which is measured in accordance with JIS B 0601.

By configuring the protective film as described above, that is, by setting the surface roughness Ra of the pressure sensitive adhesive layer in the surface on a side of the resin substrate in the protective film to the above-described upper limit value or less, the protective film has excellent re-adhesion of being re-attached to the resin substrate in a case where the protective film is attached to the resin substrate and then at least a part of the protective film is peeled off.

In the method of manufacturing a lens for sunglasses described above, prior to the punching of the resin substrate 21 in the thickness direction in the above-described step [2], the protective films 10 are attached to the both surfaces of the resin substrate 21 in the above-described step [1], so that the laminate 100 including the protective films 10 attached to the both surfaces of the resin substrate 21 is obtained.

In the laminate 100, the attachment of the protective films 10 is usually carried out using human hands, an arm provided with a machine tool, or the like, but at this time, the protective film 10 may be wrinkled or air bubbles may remain between the protective film 10 and the resin substrate 21.

Figure 3A:
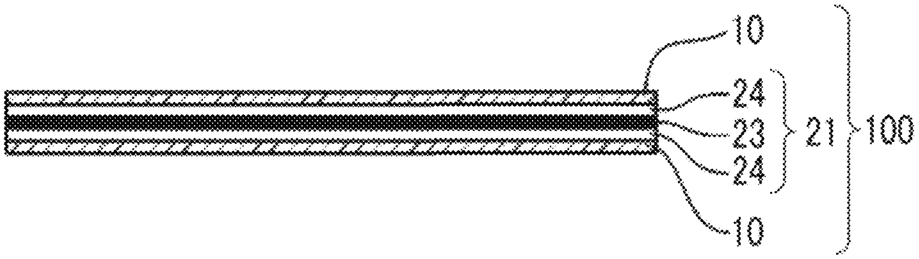
FIGS. 3A to 3C show schematic views for describing a method of peeling off at least a part of a protective film attached to a resin substrate and then re-attaching the protective film to the resin substrate.
Figure 3B:
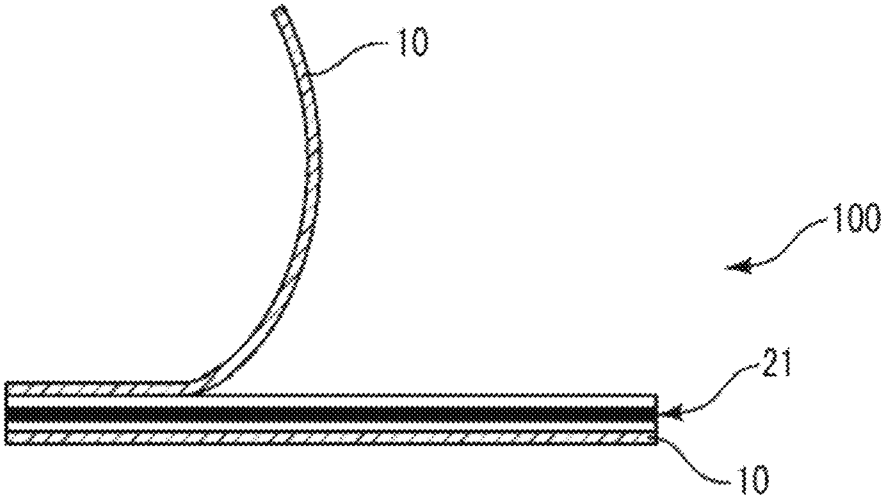
Figure 3C:
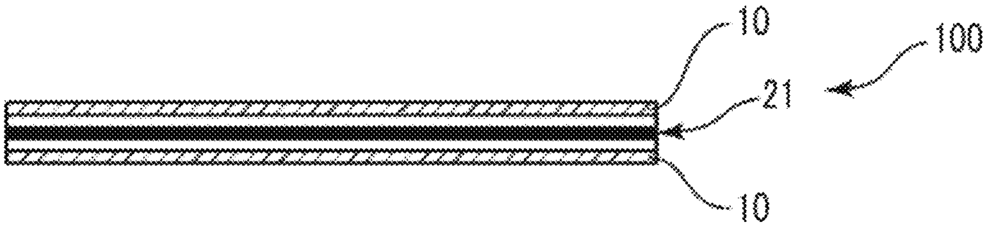

In this case, as shown in FIG. 3A, one end of the protective films 10 in the laminate 100 in which the protective films 10 are attached to the both surfaces of the resin substrate 21 is gripped, and then, as shown in FIG. 3B, a portion of the protective films 10 is peeled off once by peeling off the protective films 10 halfway from this one end. By releasing the gripping of the one end of the protective films 10 and attaching the peeled protective films 10 to the resin substrate 21 again, as shown in FIG. 3C, the protective films 10 are re-attached (re-adhered) to the resin substrate 21. However, in a case where the protective films 10 are re-attached to the resin substrate 21 in this manner, there is a problem that adhesion of the protective film 10 to the resin substrate 21 is not sufficiently obtained as compared with a case where the first adhesion of the protective film 10 to the resin substrate 21.

As a result of studies on such a problem, the present inventor has found that the re-adhesion of the protective film 10 once peeled off to the resin substrate 21 is closely related to surface properties of a surface of the pressure sensitive adhesive layer 11 included in the protective film 10 opposite to the base material layer 15 side, that is, surface properties of a surface of the pressure sensitive adhesive layer 11 on the resin substrate 21 side.

As a result of further studies on a relationship between the re-adhesion of the protective film 10 and the surface properties of the surface of the pressure sensitive adhesive layer 11 on the resin substrate 21 side, the present inventor has found that, by setting the surface roughness Ra of the surface of the pressure sensitive adhesive layer 11 on the resin substrate 21 side to 0.20 μm or less, the protective film 10 once peeled off exhibits excellent re-adhesion to the resin substrate 21, and completed the present invention.

Therefore, by using, as the protective film 10, the protective film according to the present embodiment in which the surface roughness Ra of the surface on the resin substrate 21 side is set to 0.20 μm or less and re-attaching the protective film 10, waste of the protective film 10 and the resin substrate 21 can be accurately suppressed or prevented. Accordingly, the lens 200 for sunglasses can be manufactured with high yield. Hereinafter, the protective film 10 (protective film according to the present embodiment) will be described in detail.

<Protective Film 10>

A longitudinal cross-sectional view of the protective film according to the present embodiment is the same as the longitudinal cross-sectional view of the protective film according to the first embodiment, shown in FIG. 2.

The protective film 10 includes a base material layer 15 and a pressure sensitive adhesive layer 11 which is positioned between this base material layer 15 and the resin substrate 21 and is adhered (bonded) to the resin substrate 21. Furthermore, as illustrated in FIG. 2, the base material layer 15 includes a first layer 16 which is positioned on the opposite side of the pressure sensitive adhesive layer 11, that is, on a molding die side and a second layer 17 which is positioned on the pressure sensitive adhesive layer 11 side, that is, on the resin substrate 21 side.

Hereinafter, each of these layers will be described in detail.

<<Pressure Sensitive Adhesive Layer 11>>

The pressure sensitive adhesive layer 11 is positioned (interposed) between the base material layer 15 and the resin substrate 21, and is a layer for bonding the base material layer 15 to the resin substrate 21 by adhering to the resin substrate 21.

As the pressure sensitive adhesive layer 11, a pressure sensitive adhesive layer which enables the punching and heat bending of the resin substrate 21 in the above-described step [2] and the above-described step [3] without peeling off the protective film 10 from the resin substrate 21 and enables peeling of the protective film 10 off from the resin substrate 21 in the above-described step [4] is preferably used.

Furthermore, in the present embodiment, prior to the above-described step [2], in the re-attachment of the protective film 10 to the resin substrate 21, which is performed as necessary, a layer capable of exhibiting excellent re-adhesion is used.

From this viewpoint, the pressure sensitive adhesive layer 11 preferably contains a thermoplastic resin having pressure sensitive adhesiveness as a main material, and more preferably contains, as this thermoplastic resin, a resin having a melting point of 110° C. or lower. With such a configuration of the pressure sensitive adhesive layer 11, the effect obtained by setting the surface roughness Ra of the surface of the pressure sensitive adhesive layer 11 on the resin substrate 21 side to 0.20 μm or less, that is, the effect that the protective film 10 once peeled off can re-attached to the resin substrate 21 with excellent re-adhesion can be remarkably exhibited. In addition, the melting point of the pressure sensitive adhesive layer 11 can be easily set to 110° C. or lower by containing, as the thermoplastic resin, the resin having a melting point of 110° C. or lower in the pressure sensitive adhesive layer 11. As a result, since the pressure sensitive adhesive layer 11 has excellent flexibility in a low temperature region such as room temperature, the effect obtained by setting the above-described surface roughness Ra to 0.20 μm or less can be more remarkably exhibited. That is, the protective film 10 once peeled off can be re-attached to the resin substrate 21 with more excellent re-adhesion. From the viewpoint of exhibiting such an effect more remarkably, the melting point of the pressure sensitive adhesive layer 11 is preferably 110° C. or lower, more preferably 100° C. or lower, and still more preferably in a range of 70° C. or higher and 95° C. or lower.

In addition, in the pressure sensitive adhesive layer 11, as a thermoplastic resin, a configuration in which a polyolefin-based resin alone is contained in the pressure sensitive adhesive layer 11 or a configuration in which a combination of a polyolefin-based resin and an elastomer is contained in the pressure sensitive adhesive layer 11 is preferable. By configuring the pressure sensitive adhesive layer 11 to contain such a resin as the thermoplastic resin, the above-described effects can be reliably exhibited.

In addition, a polyolefin-based resin having pressure sensitive adhesiveness is not particularly limited. Examples thereof include a homopolymer of polypropylene, a homopolymer of polyethylene, a propylene-ethylene block copolymer having an EPR phase (rubber phase), an ethylene-vinyl acetate block copolymer, an ethylene-ethyl acrylate block copolymer, and an ethylene-methyl methacrylate block copolymer, and these may be used alone or in a combination of two or more kinds thereof. Among these, a homopolymer of polyethylene is preferable. The homopolymer of polyethylene is available at a relatively low cost, and those having a melting point of 110° C. or lower are also easily available. Transparency can be imparted to the pressure sensitive adhesive layer 11 in a case where the pressure sensitive adhesive layer 11 contains the homopolymer of polyethylene. Accordingly, in a case where the base material layer 15 also has transparency, the protective film 10 can have transparency. Therefore, in a case of, in the above-described step [1], attaching the protective film 10 to the resin substrate 21, and in a case of re-attaching the protective film 10 to the resin substrate 21 prior to the above-described step [2], it is possible to visually confirm whether or not dirt such as dust is present between the protective film 10 and the resin substrate 21. Accordingly, it is possible to reliably prevent a laminate 100 having dirt therebetween from being transitioned to the steps subsequent to the above-described step [2], and as the result, the yield of the lens 200 for sunglasses to be obtained can be improved.

The homopolymer of polyethylene is not particularly limited, and examples thereof low density polyethylene (LDPE), linear low density polyethylene (LLDPE), high density polyethylene (HDPE), and very low density polyethylene (VLDPE). One or a combination of two or more of these polyethylenes can be used.

In addition, the elastomer is not particularly limited, and examples thereof include an α-polyolefin-based resin/polyethylene copolymer elastomer, an α-polyolefin-based resin/polypropylene copolymer elastomer, and a styrene block elastomer. Among these, a styrene block elastomer is preferable, and a styrene-olefin-styrene block copolymer elastomer is particularly preferable. In a case where the elastomer is further contained in addition to the polyolefin-based resin as described above, it is possible to accurately suppress or prevent the pressure sensitive adhesive layer 11 from remaining on the resin substrate 21 during the peeling of the protective film 10 off from the resin substrate 21 in the above-described step [4], that is, accurately suppress or prevent adhesive residues from being generated on the resin substrate 21. Therefore, the protective film 10 can be more smoothly peeled off from the resin substrate 21. In a case where the elastomer includes styrene as a monomer component, it is possible to accurately suppress or prevent adhesive residues from being generated on the resin substrate 21 in the above-described step [4].

Examples of the α-polyolefin-based resin include 1-hexene, 4-methyl-1-pentene, 1-octene, 1-butene, 1-pentene, and 1-heptene.

In addition, in a case where the styrene-olefin-styrene block copolymer elastomer is used as the elastomer, a content of styrene in the elastomer is preferably 25% by weight or less, and more preferably in a range of 10% by weight or more and 18% by weight or less. In this manner, it is possible to accurately suppress or prevent an increase in hardness of the pressure sensitive adhesive layer 11 caused by an increase in content of styrene. Accordingly, it is possible to more accurately suppress or prevent adhesive residues from being generated on the resin substrate 21 while reliably maintaining adhesive force of the pressure sensitive adhesive layer 11 against the resin substrate 21 (coating layer 24).

Furthermore, examples of the styrene-olefin-styrene block copolymer include a styrene-isobutylene-styrene block copolymer (SIBS), a styrene-ethylene-butylene-styrene block copolymer (SEBS), a styrene-butadiene-styrene block copolymer (SBS), and a styrene-isoprene-styrene copolymer (SIS). Among these, a styrene-ethylene-butylene-styrene block copolymer (SEBS) is preferable. In a case where SEBS is selected as the styrene-olefin-styrene block copolymer, a content of styrene in the elastomer can be easily set to be 25% by mass or less, and the above-described effects can be reliably obtained.

In addition, in a case where the pressure sensitive adhesive layer 11 contains the elastomer, a content of the elastomer in the pressure sensitive adhesive layer 11 is not particularly limited, but is preferably set to in a range of 1% by weight or more and 30% by weight or less, and more preferably set to in a range of 5% by weight or more and 15% by weight or less. In this manner, the effects obtained by containing the elastomer in the pressure sensitive adhesive layer 11 can be exhibited more significantly.

In addition, as described above, the thermoplastic resin more preferably contains a resin having a melting point of 110° C. or lower, and in a case where the pressure sensitive adhesive layer 11 contains both the polyolefin-based resin and the elastomer as the thermoplastic resin, a melting point of the polyolefin-based resin is preferably 110° C. or lower, and in this case, the melting point of the polyolefin-based resin is more preferably in a range of 70° C. or higher and lower than 110° C. As a result, the effect obtained by setting the surface roughness Ra of the surface of the pressure sensitive adhesive layer 11 on the resin substrate 21 side to 0.20 μm or less, that is, the effect that the protective film 10 once peeled off can re-attached to the resin substrate 21 with excellent re-adhesion can be particularly remarkably exhibited.

In the present specification, the melting point of each layer which constitutes the protective film 10 including the pressure sensitive adhesive layer 11 is acquired by multiplying, by the ratio of each constituent material, the melting point (the peak temperature obtained by DSC measurement) of a constituent material having a melting point among the constituent materials contained in each layer and summing the obtained values, and the acquired value is defined as the melting point.

In the pressure sensitive adhesive layer 11 having such a configuration, as described above, the surface roughness Ra of the surface on the resin substrate 21 side, which is measured in accordance with JIS B 0601, is set to 0.20 μm or less, and is preferably 0.16 μm or less and more preferably in a range of 0.01 μm or more and 0.12 μm or less. In this manner, as shown in FIG. 3B, in a case where the peeled protective film 10 is re-attached to the resin substrate 21 (see FIG. 3C), the protective film 10 once peeled off can exhibit excellent re-adhesion to the resin substrate 21.

In addition, an average thickness of the pressure sensitive adhesive layer 11 is preferably in a range of 5 μm or more and 40 μm or less, and more preferably in a range of 10 μm or more and 20 μm or less. In this manner, the above-described functions as the pressure sensitive adhesive layer 11 can be reliably exhibited.

<<Base Material Layer 15>>

The base material layer 15 is bonded to the resin substrate 21 (coating layer 24) through the pressure sensitive adhesive layer 11, thereby functioning as a functional layer (protective layer) that protects (masks) the resin substrate 21 during the punching and heat bending of the resin substrate 21 in the above-described step [2] and the above-described step [3] and as a protective layer (functional layer) for peeling off (releasing) the resin substrate 21 (protective film 10) from a mold used for heat bending after the heat bending in the above-described step [3].

In addition, in the above-described step [4], in a case of peeling off the protective film 10 from the heat-bended resin substrate 21, excellent adhesion to the pressure sensitive adhesive layer 11 is exhibited without peeling between the base material layer 15 and the pressure sensitive adhesive layer 11.

In the present embodiment, as illustrated in FIG. 2, in order to allow the base material layer 15 to exhibit these functions, the base material layer 15 is composed of a laminate having the first layer 16 which is positioned on the side opposite to the pressure sensitive adhesive layer 11, that is, on a molding die side and the second layer 17 which is positioned on the pressure sensitive adhesive layer 11 side, that is, on the resin substrate 21 side.

Hereinafter, the first layer 16 and the second layer 17 will be described.

<<First Layer 16>>

The first layer 16 is positioned on the side opposite to the pressure sensitive adhesive layer 11, and functions as an outermost layer for protecting (masking) the resin substrate 21 in a case of the punching and heat bending of the resin substrate 21 in the above-described step [2] and the above-described step [3].

In the first layer 16, for the purpose of maintaining excellent releasability from the molding die after the heat bending in the above-described step [3], that is, allowing the first layer 16 not to adhere to the molding die (mold), a melting point of the first layer 16 is preferably 150° C. or higher and more preferably in a range of approximately 155° C. or higher and 170° C. or lower. Here, as described above, the heating temperature of the coating layer 24 (resin substrate 21) in a case of the heat bending in the step [3] is set to be preferably in a range of approximately 110° C. or higher and 160° C. or lower. Therefore, by setting the melting point of the first layer 16 as described above, it is possible to reliably prevent the first layer 16 from being melted or softened in a case of the heat bending in the above-described step [3]. Accordingly, it is possible to reliably release the laminate 100 from the molding die after the heat bending in the above-described step [3].

The first layer 16 contains, as a main material, preferably a thermoplastic resin having a melting point of 150° C. or higher, and more preferably a thermoplastic resin having a melting point in a range of approximately 155° C. or higher and 170° C. or lower. In this manner, the melting point of the first layer 16 can relatively easily be set to 150° C. or higher. Accordingly, it is possible to maintain excellent releasability of the laminate 100 from the molding die after the heat bending in the above-described step [3].

In addition, in a case where the second layer 17 described later is also configured to contain a thermoplastic resin of 150° C. or higher, adhesion between the first layer 16 and the second layer 17 can be further improved. Accordingly, in the above-described step [4], in a case of peeling off the protective film 10 from the heat-bended resin substrate 21, it is possible to accurately suppress or prevent peeling between the first layer 16 and the second layer 17.

Furthermore, the first layer 16 preferably has a configuration in which, as the thermoplastic resin of 150° C. or higher, the first layer 16 contains only a polyolefin-based resin of 150° C. or higher. The polyolefin-based resin of 150° C. or higher can be obtained relatively easily and inexpensively as the thermoplastic resin of 150° C. or higher.

In addition, the polyolefin-based resin having a melting point of 150° C. or higher is not particularly limited, and examples thereof include resins of a homopolymer of polypropylene, a homopolymer of polyethylene, a propylene-ethyl acrylate copolymer, an ethylene-vinyl acetate copolymer, an ethylene-ethyl acrylate copolymer, and an ethylene-methyl methacrylate copolymer, which have a melting point of 150° C. or higher, and these may be used alone or in a combination of two or more kinds thereof. Among these, a homopolymer of polyethylene having a melting point of 150° C. or higher is preferable. In this manner, it is possible to easily and inexpensively obtain a polyolefin-based resin having a melting point of 150° C. or higher. In addition, it is possible to impart transparency to the first layer 16. Therefore, in a case where the second layer 17 and the pressure sensitive adhesive layer 11 also have transparency, the protective film 10 has transparency. Therefore, in a case of, in the above-described step [1], attaching the protective film 10 to the resin substrate 21, and in a case of re-attaching the protective film 10 to the resin substrate 21 prior to the above-described step [2], it is possible to visually confirm whether or not dirt such as dust is present between the protective film 10 and the resin substrate 21. Accordingly, it is possible to reliably prevent a laminate 100 having dirt therebetween from being transitioned to the steps subsequent to the above-described step [2], and as the result, the yield of the lens 200 for sunglasses to be obtained can be improved.

The above-described copolymer may be either a block copolymer or a random copolymer.

In addition, an average thickness of the first layer 16 is preferably in a range of 2 μm or more and 40 μm or less, and more preferably in a range of 5 μm or more 25 μm or less. In this manner, the above-described functions as the first layer 16 can be reliably exhibited.

<<Second Layer 17>>

Since the second layer 17 is positioned on the side of the pressure sensitive adhesive layer 11, that is, the resin substrate 21 side, the second layer 17 is positioned between the pressure sensitive adhesive layer 11 and the first layer 16, and functions as an intermediate layer for bonding these layers.

The second layer 17 contains, as a main material, a thermoplastic resin having adhesiveness (pressure sensitive adhesiveness) in order to exhibit the above-described functions, and as a result, the pressure sensitive adhesive layer 11 and the first layer 16 can be bonded with exhibit adhesion through the second layer 17. Accordingly, in the above-described step [4], in a case of peeling off the protective film 10 from the resin substrate 21, peeling between the pressure sensitive adhesive layer 11 and the second layer 17 and between the first layer 16 and the second layer 17 is accurately suppressed or prevented. As a result, in the punching of the resin substrate 21 in the above-described step [2], even in a case where the pressure sensitive adhesive layer 11 has whiskers extending toward the resin substrate 21 on the cut surface of the resin substrate 21 formed by the punching, the protective film 10 (pressure sensitive adhesive layer 11) can be peeled off from the resin substrate 21 in a state in which the whiskers are accurately suppressed or prevented from remaining on the cut surface of the resin substrate 21.

The thermoplastic resin having adhesiveness (adhesive resin) is not particularly limited, examples thereof include a polyolefin-based resin, an elastomer, an acrylic resin, and a polyurethane-based resin, and these may be used alone or in a combination of two or more kinds thereof. Among these, a polyolefin-based resin or an elastomer, which has adhesiveness, is preferable. In addition, in a case where the pressure sensitive adhesive layer 11 contains an elastomer, it is particularly preferable to use a combination of a polyolefin-based resin and an elastomer. In this manner, adhesion between the pressure sensitive adhesive layer 11 and the second layer 17 can be improved, and it is possible to accurately suppress or prevent peeling between the pressure sensitive adhesive layer 11 and the second layer 17.

In addition, examples of the polyolefin-based resin include an ethylene-vinyl acetate copolymer (EVA), an ethylene-maleic acid anhydride copolymer, an ethylene-methyl methacrylate copolymer (EMMA), an ethylene-methyl acrylate copolymer (EMA), an ethylene-methacrylic acid copolymer (EMAA), an ethylene-acrylic acid copolymer (EAA), an ethylene-ethylacrylic acid copolymer (EEA), and an ethylene-methacrylate-glycidyl acrylate terpolymer, and include grafted products obtained by grafting, onto various polyolefin-based resins, a monobasic unsaturated fatty acid such as acrylic acid and methacrylic acid, a dibasic unsaturated fatty acid such as maleic acid, fumaric acid, and itaconic acid, or an anhydride thereof, and functional group-introduced products obtained by introducing, into various polyolefin-based resins, a functional group such as a carboxylic acid group, a hydroxyl group, an amino group, an acid anhydride group, an oxazoline group, and an epoxy group, and these may be used alone or in a combination of two or more kinds thereof. Examples of the above-described grafted product include a maleic acid-grafted EVA and a maleic acid-grafted ethylene-α-polyolefin-based resin copolymer.

As the elastomer, the same materials as those described as the elastomer contained in the pressure sensitive adhesive layer 11 can be used, and among these, a styrene block elastomer is preferable, and a styrene-olefin-styrene block copolymer elastomer is particularly preferable. In this way, in a case where the elastomer includes styrene as a monomer component, since the adhesion of the second layer 17 to the pressure sensitive adhesive layer 11 is improved, it is possible to accurately suppress or prevent adhesive residues from being generated on the resin substrate 21 in the above-described step [4].

In addition, the second layer 17 may contain, as a constituent material, a thermoplastic resin having no adhesiveness (non-adhesive resin) in addition to the thermoplastic resin having adhesiveness. Since the thermoplastic resin having no adhesiveness exhibits excellent affinity with the polyolefin-based resin contained in the first layer 16 and having a melting point of 150° C. or higher, the adhesion between the first layer 16 and the second layer 17 can be improved. Accordingly, in the above-described step [4], in a case of peeling off the protective film 10 from the resin substrate 21, it is possible to accurately suppress or prevent peeling between the first layer 16 and the second layer 17.

Examples of the thermoplastic resin having no adhesiveness include a polyolefin-based resin, polyesters, polyurethanes, silicone resins, polyamides, polyimides, polyvinyl chlorides, and polycarbonates, and these may be used alone or in a combination of two or more kinds thereof. Among these, a polyolefin-based resin is preferable, and a polyolefin-based resin having a melting point of 150° C. or higher is more preferable. In this manner, the above-described effects can be exhibited more significantly.

In addition, the polyolefin-based resin is not particularly limited, and examples thereof include a homopolymer of polypropylene, a homopolymer of polyethylene, a propylene-ethyl acrylate copolymer, an ethylene-vinyl acetate copolymer, an ethylene-ethyl acrylate copolymer, and an ethylene-methyl methacrylate copolymer, and these may be used alone or in a combination of two or more kinds thereof. Among these, a homopolymer of polyethylene is preferable. In this manner, it is possible to easily and inexpensively obtain the polyolefin-based resin. In addition, it is possible to impart transparency to the second layer 17. Therefore, in a case where the first layer 16 and the pressure sensitive adhesive layer 11 also have transparency, the protective film 10 has transparency. Therefore, in a case of, in the above-described step [1], attaching the protective film 10 to the resin substrate 21, and in a case of re-attaching the protective film 10 to the resin substrate 21 prior to the above-described step [2], it is possible to visually confirm whether or not dirt such as dust is present between the protective film 10 and the resin substrate 21. Accordingly, it is possible to reliably prevent a laminate 100 having dirt therebetween from being transitioned to the steps subsequent to the above-described step [2], and as the result, the yield of the lens 200 for sunglasses to be obtained can be improved.

Furthermore, a melting point of the polyolefin-based resin having a melting point of 150° or higher is preferably in a range of 155° C. or higher and 170° C. or lower.

The above-described copolymer may be either a block copolymer or a random copolymer. Here, since the polyolefin-based resin having a melting point of 150° C. or higher alone does not have adhesiveness, the polyolefin-based resin having a melting point of 150° C. or higher alone is generally used as the thermoplastic resin having no adhesiveness. However, for example, a propylene-ethylene random copolymer (melting point: 151° C.) has adhesiveness so as to be used as the thermoplastic resin having adhesiveness.

From the above, in a case where the second layer 17 contains the thermoplastic resin having no adhesiveness, the thermoplastic resin having adhesiveness and the thermoplastic resin having no adhesiveness are preferably a combination of the elastomer and the polyolefin-based resin having a melting point of 150° C. or higher. With such a combination, it is possible to accurately suppress or prevent peeling between the pressure sensitive adhesive layer 11 and the second layer 17 and between the first layer 16 and the second layer 17.

The melting point of the second layer 17 having the above-described configuration is preferably 120° C. or higher. Here, as described above, the heating temperature of the coating layer 24 (resin substrate 21) in a case of the heat bending in the step [3] is set to be preferably in a range of approximately 110° C. or higher and 160° C. or lower. Therefore, in a case where the melting point of the second layer 17 is set to in a range of 120° C. or higher and lower than 150° C., it is possible to relatively easily melt or soften the second layer 17 during the heat bending in the above-described step [3]. As a result, in the above-described step [3], since the second layer 17 exhibits the function as the intermediate layer in a molten or softened state, and the first layer 16 can be shifted in a surface direction of the resin substrate 21, a gripping part formed of the first layer 16 can be reliably formed on the edge of the laminate 100. Accordingly, since the peeling of the protective film 10 in the above-described step [4] can be performed by gripping the gripping part, the peeling can be easily performed. In addition, in the above-described step [3], since the second layer 17 exhibits the function as the intermediate layer in a molten or softened state, it is possible to improve cushioning property of the second layer 17 during molding with a mold. As a result, unevenness of the mold or unevenness of contaminants unintentionally mixed between the mold and the protective film 10 can be effectively absorbed, so that the heat-bended resin substrate 21 has an excellent appearance.

In addition, in a case where the melting point of the second layer 17 is set to 150° C. or higher, it is possible to suppress or prevent the second layer 17 from being melted or softened during the heat bending in the above-described step [3]. Therefore, it is possible to accurately suppress or prevent a decrease in adhesive force between the first layer 16 and the second layer 17. Accordingly, in the above-described step [4], in a case of peeling off the protective film 10 from the heat-bended resin substrate 21, peeling between the first layer 16 and the second layer 17 is reliably prevented.

In addition, an average thickness of the second layer 17 is preferably in a range of 10 μm or more and 60 μm or less, and more preferably in a range of 10 μm or more 40 μm or less. In this manner, the above-described functions as the second layer 17 can be reliably exhibited.

In the protective film 10 including the pressure sensitive adhesive layer 11 and the base material layer 15 with the above configuration, an elastic modulus at 25° C. is preferably in a range of 300 MPa or more and 600 MPa or less, more preferably in a range of 300 MPa or more and 500 MPa or less, still more preferably in a range of 300 MPa or more and 450 MPa or less, and particularly preferably in a range of 300 MPa or more and 400 MPa or less. As a result, since the pressure sensitive adhesive layer 11 can be said to have excellent flexibility in a low temperature region such as room temperature, the effect obtained by setting the surface roughness Ra of the surface of the pressure sensitive adhesive layer 11 on the resin substrate 21 side to 0.2 μm or less, that is, the effect that the protective film 10 once peeled off can re-attached to the resin substrate 21 with excellent re-adhesion can be more remarkably exhibited.

With regard to the re-adhesion of the protective film 10, specifically, in a case where the protective film 10 having a width of 25 mm and a length of 200 mm is attached to a polycarbonate substrate, and in an environment of 25° C., one end of the protective film 10 is held and the protective film 10 is peeled off in a direction of 90° to a position of a length of 100 mm, and then the one end of the protective film 10 is released to re-attach the protective film 10 to the polycarbonate substrate, after 1 minute from the re-attachment, the total area in a plan view of a region where the polycarbonate substrate and the protective film are not bonded to each other is preferably less than 1,250 $mm^2$, more preferably less than 750 $mm^2$, and still more preferably less than 125 $mm^2$. By setting the above-described total area to the above-described upper limit value or less, it can be said that the protective film 10 has excellent re-adhesion, and the protective film 10 once peeled off can be reliably re-attached to the resin substrate 21. Therefore, it is possible to accurately suppress or prevent the waste of the protective film 10 and the resin substrate 21. Accordingly, the lens 200 for sunglasses can be manufactured with high yield.

In addition, in this case, the number of regions where the above-described polycarbonate substrate and the protective film are not bonded is preferably 20 or less, more preferably 10 or less, and still more preferably 3 or less. By setting the above-described number to the above-described upper limit value or less, it can be said that the protective film 10 has more excellent re-adhesion.

Each layer of the pressure sensitive adhesive layer 11 and the base material layer 15 (the first layer 16 and the second layer 17) in the above-described protective film 10 may contain various additives such as an antiblocking agent, an antioxidant, a light stabilizer, and an antistatic agent, in addition to the above-described constituent materials. A content of the above-described additive can be 10% by weight or less or 8% by weight or less, and can be 0.001% by weight or more or 0.1% by weight or more.

In particular, the first layer 16 preferably contains an antiblocking agent. As a result, the function of the first layer 16, which enables maintaining excellent releasability from the molding die, can be exhibited more reliably.

In addition, as the antiblocking agent, for example, inorganic particles, organic particles, or the like can be used, and these may be used alone or in a combination of two or more kinds thereof. The inorganic particles are not particularly limited, and examples thereof include particles such as silica, zeolites, smectites, mica, vermiculite, and talc; and the organic particles are not particularly limited, and examples thereof particles of acrylic resins, polyolefin-based resins, polyester-based resins, polyurethane-based resins, polystyrene-based resins, silicone-based resins, and fluorine-based resins.

In a case where the first layer 16 contains the antiblocking agent, a content of the antiblocking agent in the first layer 16 is not particularly limited, but is preferably in a range of 0.5% by weight or more and 10% by weight or less, and more preferably in a range of 1% by weight or more and 9% by weight or less. In this manner, the above-described functions of the first layer 16 can be exhibited more significantly.

In addition, an intermediate layer containing the above-described additives may be formed between these layers.

Furthermore, the above-described protective film 10 may be manufactured using any method, and for example, the protective film 10 can be manufactured using a co-extrusion method.

Specifically, three extruders are prepared, and after containing the constituent materials of the pressure sensitive adhesive layer 11, the first layer 16, and the second layer 17, respectively, the constituent materials in a melted or softened state are extruded. In this manner, from a co-extrusion T die, a laminate in which the layers are laminated in a molten or softened state is supplied to a sheet molding unit configured of a plurality of cooling rolls, and then is cooled in this sheet supplying unit, thereby manufacturing the protective film 10.

The surface roughness Ra of the pressure sensitive adhesive layer on a side opposite to the second layer is adjusted to a desired degree by, for example, using a cooling roll with different surface roughness (for example, a metal mirror surface roll) as the cooling roll included in the sheet molding unit, configuring the sheet molding unit with an air chamber or an air knife to blow air onto the surface of the pressure sensitive adhesive layer, and the like.

Third Embodiment

Next, a third embodiment of the protective film according to the present invention will be described.

Hereinafter, the third embodiment of the protective film according to the present invention will be described, but the differences from the above-described first embodiment will be mainly described, and the same matters will be omitted.

The protective film according to the present embodiment is a protective film which is used by being attached to a resin substrate in a case of performing heat bending on the resin substrate while heating the resin substrate, the protective film including a base material layer and a pressure sensitive adhesive layer which is positioned between the base material layer and the resin substrate, and is adhered to the resin substrate, in which the base material layer is composed of a laminate including a first layer which is positioned on a side opposite to the pressure sensitive adhesive layer and a second layer which is positioned on a side of the pressure sensitive adhesive layer, and the protective film is configured such that, in a case where the protective film is peeled off from the resin substrate, a surface of the pressure sensitive adhesive layer on a side of the resin substrate is charged with a negative charge, and by the negative charge, a surface of the resin substrate on a side of the pressure sensitive adhesive layer is charged with a positive charge.

In the present embodiment, the protective film is configured such that, in a case where the protective film is peeled off from the resin substrate, a surface of the pressure sensitive adhesive layer on a side of the resin substrate is charged with a negative charge, and by the negative charge, a surface of the resin substrate on a side of the pressure sensitive adhesive layer is charged with a positive charge. Here, most of the environmental foreign matter such as dust, scattered in the air, are generally charged with a positive charge. Therefore, as described above, in a case where the protective film is peeled off from the resin substrate, static electricity due to this peeling causes a surface of the resin substrate on the pressure sensitive adhesive layer side to be charged with a positive charge, thereby exerting a repulsive force between the environmental foreign matter and the resin substrate. As a result, it is possible to accurately suppress or prevent the environmental foreign matter from adhering to the surface of the resin substrate, from which the protective film has been peeled off. Accordingly, in a case where the resin substrate is applied to, for example, a resin substrate of a lens for sunglasses, the lens for sunglasses can be manufactured with high yield.

Hereinafter, the protective film, the resin substrate, and the laminate of a protective film and a resin substrate according to the present embodiment will be described.

In the method of manufacturing a lens for sunglasses described above, particularly, in the above-described step [4], in a case where the protective film 10 is peeled off from the heat-bended resin substrate 21, a surface of the resin substrate 21, from which the protective film 10 has been peeled off, is charged by static electricity caused by this peeling. As a result, since environmental foreign matter such as dust, scattered in the air, is also charged in the air, the environmental foreign matter adheres to the surface of the resin substrate 21.

Therefore, in this state, in a case where the polycarbonate layer 30 is formed on the resin substrate 21 to manufacture a lens 200 for sunglasses in the above-described step [4], there is a problem that the yield of the lens 200 for sunglasses is lowered.

As a result of studies on the problem, the present inventor has found that the environmental foreign matter adhering to the surface of the resin substrate 21 is mainly composed of dust originating from fibers which make up a cloth portion of clothing or the like, and the environmental foreign matter such as the dust are generally charged with a positive charge in majority. In addition, it has been found that, in the resin substrate 21 where the adhesion of the environmental foreign matter is recognized, the surface of the resin substrate 21 is charged with a negative charge due to static electricity caused by the peeling of the protective film 10 from the resin substrate 21.

In response to such a situation, in the present embodiment, it is configured that, in a case where, in the above-described step [4], the protective film 10 (protective film according to the present embodiment) is peeled off from the resin substrate 21 in the laminate 100 (the laminate of a protective film and a resin substrate according to the present embodiment), in the protective film 10, the surface of the pressure sensitive adhesive layer 11 on the resin substrate 21 side is charged with a negative charge (negatively charged) due to static electricity caused by this peeling, and as a result, the surface of the resin substrate 21 (the resin substrate in the present embodiment) on the pressure sensitive adhesive layer 11 side is charged with a positive charge (positively charged).

As described above, in the present embodiment, since the surface of the resin substrate 21 on the pressure sensitive adhesive layer 11 side is intentionally charged with a positive charge, a repulsive force can be applied between the surface of the resin substrate 21 on the pressure sensitive adhesive layer 11 side and the environmental foreign matter which is also charged with a positive charge. Therefore, it is possible to accurately suppress or prevent the environmental foreign matter from adhering to the surface of the resin substrate 21, from which the protective film 10 has been peeled off.

By intentionally charging the surface of the resin substrate 21 on the pressure sensitive adhesive layer 11 side with a positive charge in this way, in a case where the protective film 10 is peeled off from the heat-bended resin substrate 21 in the above-described step [4], the adhering of the environmental foreign matter to the surface of the resin substrate 21 can be accurately suppressed or prevented. Accordingly, the lens 200 for sunglasses can be manufactured with high yield. Hereinafter, the protective film 10 (protective film according to the present embodiment) will be described in detail.

<Protective Film 10>

Figure 4A:
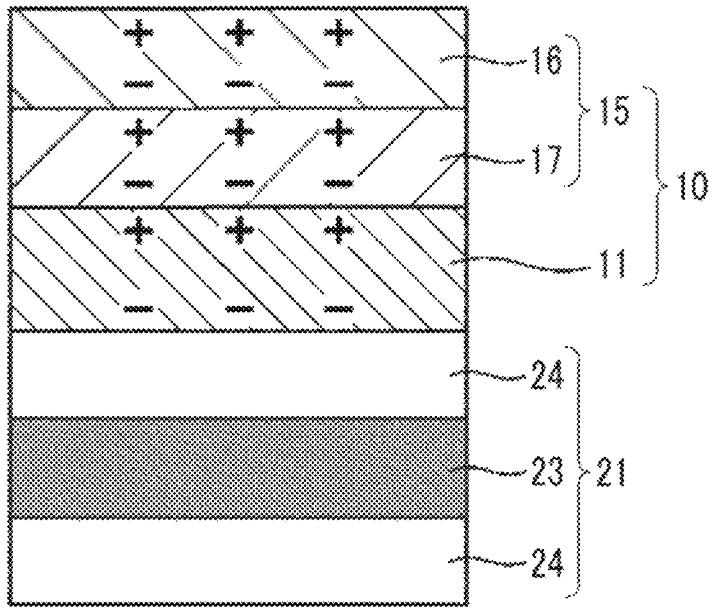
FIGS. 4A and 4B show a longitudinal cross-sectional view for describing a state in which the protective film shown in FIG. 2 is peeled off from a resin substrate.
Figure 4B:
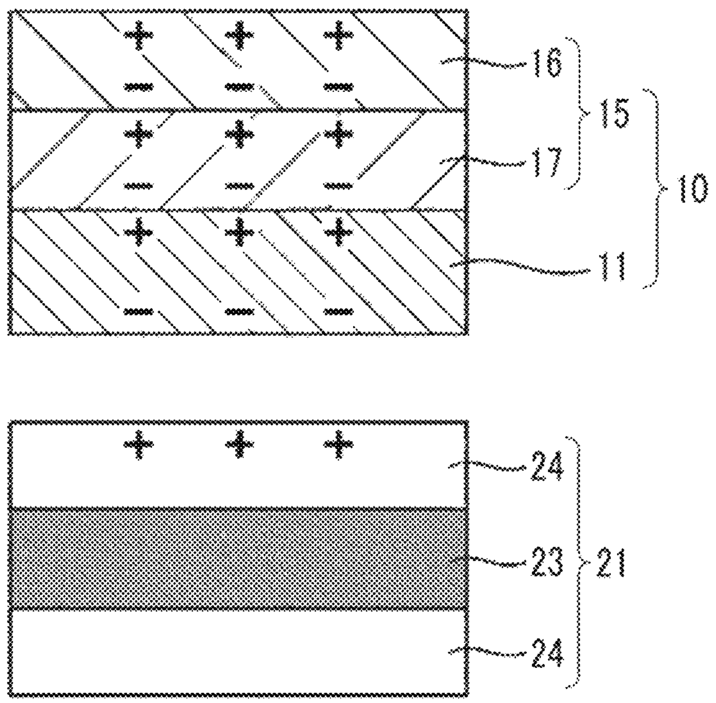

FIGS. 4A and 4B show longitudinal cross-sectional views for describing a state in which the protective film shown in FIG. 2 is peeled off from a resin substrate. The longitudinal cross-sectional views of the protective film according to the present embodiment are the same as the longitudinal cross-sectional view of the protective film according to the first embodiment, shown in FIG. 2. Hereinafter, for convenience of description, the upper side of FIGS. 4A and 4B will be referred to as "upper" and the lower side thereof will be referred to as "lower".

The protective film 10 includes a base material layer 15 and a pressure sensitive adhesive layer 11 which is positioned between this base material layer 15 and the resin substrate 21 and is adhered (bonded) to the resin substrate 21. Furthermore, as illustrated in FIG. 2, the base material layer 15 includes a first layer 16 which is positioned on the opposite side of the pressure sensitive adhesive layer 11, that is, on a molding die side and a second layer 17 which is positioned on the pressure sensitive adhesive layer 11 side, that is, on the resin substrate 21 side.

Hereinafter, each of these layers will be described in detail.

<<Pressure Sensitive Adhesive Layer 11>>

The pressure sensitive adhesive layer 11 is positioned (interposed) between the base material layer 15 and the resin substrate 21, and is a layer for bonding the base material layer 15 to the resin substrate 21 by adhering to the resin substrate 21.

As the pressure sensitive adhesive layer 11, a layer which enables the punching and heat bending of the resin substrate 21 in the above-described step [2] and the above-described step [3] without peeling off the protective film 10 from the resin substrate 21 and enables peeling of the protective film 10 off from the resin substrate 21 in the above-described step [4] is preferably used.

In the pressure sensitive adhesive layer 11, as a thermoplastic resin, a configuration in which a polyolefin-based resin alone is contained in the pressure sensitive adhesive layer 11 or a configuration in which a combination of a polyolefin-based resin and an elastomer is contained in the pressure sensitive adhesive layer 11 is preferable. By configuring the pressure sensitive adhesive layer 11 to contain such a resin as the thermoplastic resin, functions as the pressure sensitive adhesive layer 11 can be reliably exhibited.

In addition, a polyolefin-based resin having pressure sensitive adhesiveness is not particularly limited. Examples thereof include a homopolymer of polypropylene, a homopolymer of polyethylene, a propylene-ethylene block copolymer having an EPR phase (rubber phase), an ethylene-vinyl acetate block copolymer, an ethylene-ethyl acrylate block copolymer, and an ethylene-methyl methacrylate block copolymer, and these may be used alone or in a combination of two or more kinds thereof. Among these, a homopolymer of polyethylene is preferable. The homopolymer of polyethylene is available at a relatively low cost. Transparency can be imparted to the pressure sensitive adhesive layer 11 in a case where the pressure sensitive adhesive layer 11 contains the homopolymer of polyethylene. Accordingly, in a case where the base material layer 15 also has transparency, the protective film 10 can have transparency. Therefore, in a case of, in the above-described step [1], attaching the protective film 10 to the resin substrate 21, it is possible to visually confirm whether or not dirt such as dust is present between the protective film 10 and the resin substrate 21. Accordingly, it is possible to reliably prevent a laminate 100 having dirt therebetween from being transitioned to the steps subsequent to the above-described step [2], and as the result, the yield of the lens 200 for sunglasses to be obtained can be improved.

The homopolymer of polyethylene is not particularly limited, and examples thereof low density polyethylene (LDPE), linear low density polyethylene (LLDPE), high density polyethylene (HDPE), and very low density polyethylene (VLDPE). One or a combination of two or more of these polyethylenes can be used.

In addition, the elastomer is not particularly limited, and examples thereof include an α-polyolefin-based resin/polyethylene copolymer elastomer, an α-polyolefin-based resin/polypropylene copolymer elastomer, and a styrene block elastomer. Among these, a styrene block elastomer is preferable, and a styrene-olefin-styrene block copolymer elastomer is particularly preferable. In a case where the elastomer is further contained in addition to the polyolefin-based resin as described above, it is possible to accurately suppress or prevent the pressure sensitive adhesive layer 11 from remaining on the resin substrate 21 during the peeling of the protective film 10 off from the resin substrate 21 in the above-described step [4], that is, accurately suppress or prevent adhesive residues from being generated on the resin substrate 21. Therefore, the protective film 10 can be more smoothly peeled off from the resin substrate 21. In a case where the elastomer includes styrene as a monomer component, it is possible to accurately suppress or prevent adhesive residues from being generated on the resin substrate 21 in the above-described step [4].

Examples of the α-polyolefin-based resin include 1-hexene, 4-methyl-1-pentene, 1-octene, 1-butene, 1-pentene, and 1-heptene.

In addition, in a case where the styrene-olefin-styrene block copolymer elastomer is used as the elastomer, a content of styrene in the elastomer is preferably 25 wt % or less, and more preferably in a range of 10 wt % or more and 18 wt % or less. In this manner, it is possible to accurately suppress or prevent an increase in hardness of the pressure sensitive adhesive layer 11 caused by an increase in content of styrene. Accordingly, it is possible to more accurately suppress or prevent adhesive residues from being generated on the resin substrate 21 while reliably maintaining adhesive force of the pressure sensitive adhesive layer 11 against the resin substrate 21 (coating layer 24).

Furthermore, examples of the styrene-olefin-styrene block copolymer include a styrene-isobutylene-styrene block copolymer (SIBS), a styrene-ethylene-butylene-styrene block copolymer (SEBS), a styrene-butadiene-styrene block copolymer (SBS), a styrene-isoprene-styrene copolymer (SIS), and a styrene-ethylene-propylene-styrene block copolymer (SEPS). Among these, a styrene-ethylene-butylene-styrene block copolymer (SEBS) is preferable. In a case where SEBS is selected as the styrene-olefin-styrene block copolymer, a content of styrene in the elastomer can be easily set to be 25 wt % or less, and the above-described effects can be reliably obtained.

In addition, in a case where the pressure sensitive adhesive layer 11 contains the elastomer, a content of the elastomer in the pressure sensitive adhesive layer 11 is not particularly limited, but is preferably set to in a range of 2 wt % or more and 60 wt % or less, and more preferably set to in a range of 4 wt % or more and 40 wt % or less. In this manner, the effects obtained by containing the elastomer in the pressure sensitive adhesive layer 11 can be exhibited more significantly.

In addition, an average thickness of the pressure sensitive adhesive layer 11 is preferably in a range of 5 μm or more and 40 μm or less, and more preferably in a range of 10 μm or more and 20 μm or less. In this manner, the above-described functions as the pressure sensitive adhesive layer 11 can be reliably exhibited.

<<Base Material Layer 15>>

The base material layer 15 is bonded to the resin substrate 21 (coating layer 24) through the pressure sensitive adhesive layer 11, thereby functioning as a functional layer (protective layer) that protects (masks) the resin substrate 21 during the punching and heat bending of the resin substrate 21 in the above-described step [2] and the above-described step [3] and as a protective layer (functional layer) for peeling off (releasing) the resin substrate 21 (protective film 10) from a mold used for heat bending after the heat bending in the above-described step [3].

In addition, in the above-described step [4], in a case of peeling off the protective film 10 from the heat-bended resin substrate 21, excellent adhesion to the pressure sensitive adhesive layer 11 is exhibited without peeling between the base material layer 15 and the pressure sensitive adhesive layer 11.

In the present embodiment, as illustrated in FIG. 2, in order to allow the base material layer 15 to exhibit these functions, the base material layer 15 is composed of a laminate having the first layer 16 which is positioned on the side opposite to the pressure sensitive adhesive layer 11, that is, on a molding die side and the second layer 17 which is positioned on the pressure sensitive adhesive layer 11 side, that is, on the resin substrate 21 side.

Hereinafter, the first layer 16 and the second layer 17 will be described.

<<First Layer 16>>

The first layer 16 is positioned on the side opposite to the pressure sensitive adhesive layer 11, and functions as an outermost layer for protecting (masking) the resin substrate 21 in a case of the punching and heat bending of the resin substrate 21 in the above-described step [2] and the above-described step [3].

In the first layer 16, for the purpose of maintaining excellent releasability from the molding die after the heat bending in the above-described step [3], that is, allowing the first layer 16 not to adhere to the molding die (mold), a melting point of the first layer 16 is preferably 150° C. or higher and more preferably in a range of approximately 155° C. or higher and 170° C. or lower. Here, as described above, the heating temperature of the coating layer 24 (resin substrate 21) in a case of the heat bending in the step [3] is set to be preferably in a range of approximately 110° C. or higher and 160° C. or lower. Therefore, by setting the melting point of the first layer 16 as described above, it is possible to reliably prevent the first layer 16 from being melted or softened in a case of the heat bending in the above-described step [3]. Accordingly, it is possible to reliably release the laminate 100 from the molding die after the heat bending in the above-described step [3].

The first layer 16 contains, as a main material, preferably a thermoplastic resin having a melting point of 150° C. or higher, and more preferably a thermoplastic resin having a melting point in a range of approximately 155° C. or higher and 170° C. or lower. In this manner, the melting point of the first layer 16 can relatively easily be set to 150° C. or higher. Accordingly, it is possible to maintain excellent releasability of the laminate 100 from the molding die after the heat bending in the above-described step [3].

In the present specification, the melting point of each layer which constitutes the protective film 10 including the first layer 16 is acquired by multiplying, by the ratio of each constituent material, the melting point (the peak temperature obtained by DSC measurement) of each constituent material contained in each layer and summing the obtained values, and the acquired value is defined as the melting point.

In addition, in a case where the second layer 17 described later is also configured to contain a thermoplastic resin of 150° C. or higher, adhesion between the first layer 16 and the second layer 17 is further improved. Accordingly, in the above-described step [4], in a case of peeling off the protective film 10 from the heat-bended resin substrate 21, it is possible to accurately suppress or prevent peeling between the first layer 16 and the second layer 17.

Furthermore, the first layer 16 preferably has a configuration in which, as the thermoplastic resin of 150° C. or higher, the first layer 16 contains only a polyolefin-based resin of 150° C. or higher. The polyolefin-based resin of 150° C. or higher can be obtained relatively easily and inexpensively as the thermoplastic resin of 150° C. or higher.

In addition, the polyolefin-based resin having a melting point of 150° C. or higher is not particularly limited, and examples thereof include resins of a homopolymer of polypropylene, a homopolymer of polyethylene, a propylene-ethyl acrylate copolymer, an ethylene-vinyl acetate copolymer, an ethylene-ethyl acrylate copolymer, and an ethylene-methyl methacrylate copolymer, which have a melting point of 150° C. or higher, and these may be used alone or in a combination of two or more kinds thereof. Among these, a homopolymer of polyethylene having a melting point of 150° C. or higher is preferable. In this manner, it is possible to easily and inexpensively obtain a polyolefin-based resin having a melting point of 150° C. or higher. In addition, it is possible to impart transparency to the first layer 16. Therefore, in a case where the second layer 17 and the pressure sensitive adhesive layer 11 also have transparency, the protective film 10 has transparency. Therefore, in a case of, in the above-described step [1], attaching the protective film 10 to the resin substrate 21, it is possible to visually confirm whether or not dirt such as dust is present between the protective film 10 and the resin substrate 21. Accordingly, it is possible to reliably prevent a laminate 100 having dirt therebetween from being transitioned to the steps subsequent to the above-described step [2], and as the result, the yield of the lens 200 for sunglasses to be obtained can be improved.

The above-described copolymer may be either a block copolymer or a random copolymer.

In addition, an average thickness of the first layer 16 is preferably in a range of 2 μm or more and 40 μm or less, and more preferably in a range of 5 μm or more 25 μm or less. In this manner, the above-described functions as the first layer 16 can be reliably exhibited.

<<Second Layer 17>>

Since the second layer 17 is positioned on the side of the pressure sensitive adhesive layer 11, that is, the resin substrate 21 side, the second layer 17 is positioned between the pressure sensitive adhesive layer 11 and the first layer 16, and functions as an intermediate layer for bonding these layers.

The second layer 17 contains, as a main material, a thermoplastic resin having adhesiveness (pressure sensitive adhesiveness) in order to exhibit the above-described functions, and as a result, the pressure sensitive adhesive layer 11 and the first layer 16 can be bonded with exhibit adhesion through the second layer 17. Accordingly, in the above-described step [4], in a case of peeling off the protective film 10 from the resin substrate 21, peeling between the pressure sensitive adhesive layer 11 and the second layer 17 and between the first layer 16 and the second layer 17 is accurately suppressed or prevented.

The thermoplastic resin having adhesiveness (adhesive resin) is not particularly limited, examples thereof include a polyolefin-based resin, an elastomer, an acrylic resin, and a polyurethane-based resin, and these may be used alone or in a combination of two or more kinds thereof. Among these, a polyolefin-based resin or an elastomer, which has adhesiveness, is preferable. In addition, in a case where the pressure sensitive adhesive layer 11 contains an elastomer, it is particularly preferable to use a combination of a polyolefin-based resin and an elastomer. In this manner, adhesion between the pressure sensitive adhesive layer 11 and the second layer 17 can be improved, and it is possible to accurately suppress or prevent peeling between the pressure sensitive adhesive layer 11 and the second layer 17.

In addition, examples of the polyolefin-based resin include an ethylene-vinyl acetate copolymer (EVA), an ethylene-maleic acid anhydride copolymer, an ethylene-methyl methacrylate copolymer (EMMA), an ethylene-methyl acrylate copolymer (EMA), an ethylene-methacrylic acid copolymer (EMAA), an ethylene-acrylic acid copolymer (EAA), an ethylene-ethylacrylic acid copolymer (EEA), and an ethylene-methacrylate-glycidyl acrylate terpolymer, and include grafted products obtained by grafting, onto various polyolefin-based resins, a monobasic unsaturated fatty acid such as acrylic acid and methacrylic acid, a dibasic unsaturated fatty acid such as maleic acid, fumaric acid, and itaconic acid, or an anhydride thereof, and functional group-introduced products obtained by introducing, into various polyolefin-based resins, a functional group such as a carboxylic acid group, a hydroxyl group, an amino group, an acid anhydride group, an oxazoline group, and an epoxy group, and these may be used alone or in a combination of two or more kinds thereof. Examples of the above-described grafted product include a maleic acid-grafted EVA and a maleic acid-grafted ethylene-α-polyolefin-based resin copolymer.

As the elastomer, the same materials as those described as the elastomer contained in the pressure sensitive adhesive layer 11 can be used, and among these, a styrene block elastomer is preferable, and a styrene-olefin-styrene block copolymer elastomer is particularly preferable. In this way, in a case where the elastomer includes styrene as a monomer component, since the adhesion of the second layer 17 to the pressure sensitive adhesive layer 11 is improved, it is possible to accurately suppress or prevent adhesive residues from being generated on the resin substrate 21 in the above-described step [4].

In addition, in a case where the second layer 17 contains the elastomer, a content of the elastomer in the second layer 17 is not particularly limited, but is preferably set to in a range of 0.5 wt % or more and 40 wt % or less, and more preferably set to in a range of 1 wt % or more and 25 wt % or less. In this manner, the effects obtained by containing the elastomer in the second layer 17 can be exhibited more significantly.

In addition, the second layer 17 may contain, as a constituent material, a thermoplastic resin having no adhesiveness (non-adhesive resin) in addition to the thermoplastic resin having adhesiveness. Since the thermoplastic resin having no adhesiveness exhibits excellent affinity with the polyolefin-based resin contained in the first layer 16 and having a melting point of 150° C. or higher, the adhesion between the first layer 16 and the second layer 17 can be improved. Accordingly, in the above-described step [4], in a case of peeling off the protective film 10 from the resin substrate 21, it is possible to accurately suppress or prevent peeling between the first layer 16 and the second layer 17.

Examples of the thermoplastic resin having no adhesiveness include a polyolefin-based resin, polyesters, polyurethanes, silicone resins, polyamides, polyimides, polyvinyl chlorides, and polycarbonates, and these may be used alone or in a combination of two or more kinds thereof. Among these, a polyolefin-based resin is preferable, and a polyolefin-based resin having a melting point of 150° C. or higher is more preferable. In this manner, the above-described effects can be exhibited more significantly.

In addition, the polyolefin-based resin is not particularly limited, and examples thereof include a homopolymer of polypropylene, a homopolymer of polyethylene, a propylene-ethyl acrylate copolymer, an ethylene-vinyl acetate copolymer, an ethylene-ethyl acrylate copolymer, and an ethylene-methyl methacrylate copolymer, and these may be used alone or in a combination of two or more kinds thereof. Among these, a homopolymer of polyethylene is preferable. In this manner, it is possible to easily and inexpensively obtain the polyolefin-based resin. In addition, it is possible to impart transparency to the second layer 17. Therefore, in a case where the first layer 16 and the pressure sensitive adhesive layer 11 also have transparency, the protective film 10 has transparency. Therefore, in a case of, in the above-described step [1], attaching the protective film 10 to the resin substrate 21, it is possible to visually confirm whether or not dirt such as dust is present between the protective film 10 and the resin substrate 21. Accordingly, it is possible to reliably prevent a laminate 100 having dirt therebetween from being transitioned to the steps subsequent to the above-described step [2], and as the result, the yield of the lens 200 for sunglasses to be obtained can be improved.

Furthermore, a melting point of the polyolefin-based resin having a melting point of 150° or higher is preferably in a range of 155° C. or higher and 170° C. or lower.

The above-described copolymer may be either a block copolymer or a random copolymer. Here, since the polyolefin-based resin having a melting point of 150° C. or higher alone does not have adhesiveness, the polyolefin-based resin having a melting point of 150° C. or higher alone is generally used as the thermoplastic resin having no adhesiveness. However, for example, a propylene-ethylene random copolymer (melting point: 151° C.) has adhesiveness so as to be used as the thermoplastic resin having adhesiveness.

From the above, in a case where the second layer 17 contains the thermoplastic resin having no adhesiveness, the thermoplastic resin having adhesiveness and the thermoplastic resin having no adhesiveness are preferably a combination of the elastomer and the polyolefin-based resin having a melting point of 150° C. or higher. With such a combination, it is possible to accurately suppress or prevent peeling between the pressure sensitive adhesive layer 11 and the second layer 17 and between the first layer 16 and the second layer 17.

The melting point of the second layer 17 having the above-described configuration is preferably 120° C. or higher. Here, as described above, the heating temperature of the coating layer 24 (resin substrate 21) in a case of the heat bending in the step [3] is set to be preferably in a range of approximately 110° C. or higher and 160° C. or lower. Therefore, in a case where the melting point of the second layer 17 is set to in a range of 120° C. or higher and lower than 150° C., it is possible to relatively easily melt or soften the second layer 17 during the heat bending in the above-described step [3]. As a result, in the above-described step [3], since the second layer 17 exhibits the function as the intermediate layer in a molten or softened state, and the first layer 16 can be shifted in a surface direction of the resin substrate 21, a gripping part formed of the first layer 16 can be reliably formed on the edge of the laminate 100. Accordingly, since the peeling of the protective film 10 in the above-described step [4] can be performed by gripping the gripping part, the peeling can be easily performed. In addition, in the above-described step [3], since the second layer 17 exhibits the function as the intermediate layer in a molten or softened state, it is possible to improve cushioning property of the second layer 17 during molding with a mold. As a result, unevenness of the mold or unevenness of contaminants unintentionally mixed between the mold and the protective film 10 can be effectively absorbed, so that the heat-bended resin substrate 21 has an excellent appearance.

In addition, in a case where the melting point of the second layer 17 is set to 150° C. or higher, it is possible to suppress or prevent the second layer 17 from being melted or softened during the heat bending in the above-described step [3]. Therefore, it is possible to accurately suppress or prevent a decrease in adhesive force between the first layer 16 and the second layer 17. Accordingly, in the above-described step [4], in a case of peeling off the protective film 10 from the heat-bended resin substrate 21, peeling between the first layer 16 and the second layer 17 is reliably prevented.

In addition, an average thickness of the second layer 17 is preferably in a range of 10 μm or more and 60 μm or less, and more preferably in a range of 10 μm or more 40 μm or less. In this manner, the above-described functions as the second layer 17 can be reliably exhibited.

As described above, in a case where the protective film 10 which includes, as the above configuration, the pressure sensitive adhesive layer 11 and the base material layer 15 having the first layer 16 and the second layer 17 is peeled off from the resin substrate 21, the surface of the pressure sensitive adhesive layer 11 on the resin substrate 21 side is charged with a negative charge (negatively charged), so that the surface of the resin substrate 21 on the pressure sensitive adhesive layer 11 side is charged with a positive charge (see FIGS. 4A and 4B).

In this way, from a state in which the protective film 10 is attached to the resin substrate 21 as shown in FIG. 4A, by peeling off the protective film 10 from the resin substrate 21 as shown in FIG. 4B, electrification series in each layer of the protective film 10 which includes the pressure sensitive adhesive layer 11 and the base material layer 15 having the first layer 16 and the second layer 17 is adjusted so that the surface of the pressure sensitive adhesive layer 11 on the resin substrate 21 side is charged with a negative charge.

That is, by peeling off the protective film 10 from the resin substrate 21, specifically, the electrification series in each layer is adjusted such that the pressure sensitive adhesive layer 11 is charged with a positive charge on the surface on the second layer 17 side; the second layer 17 is charged with a negative charge on the surface on the pressure sensitive adhesive layer 11 side, and is charged with a positive charge on the first layer 16 side; and the first layer 16 is charged with a negative charge on the surface on the second layer 17 side, and is charged with a positive charge on a surface opposite to the second layer 17 side. A combination of constituent materials contained in each layer of the pressure sensitive adhesive layer 11, the first layer 16, and the second layer 17 described above is adjusted so as to achieve this electrification series.

Specifically, the combination of constituent materials contained in each layer of the pressure sensitive adhesive layer 11, the first layer 16, and the second layer 17 is not particularly limited, and examples thereof include the following combinations. That is, examples thereof include a combination of LLDPE contained in the pressure sensitive adhesive layer 11, h-PP contained in the first layer 16, and h-PP and SEPS contained in the second layer 17, a combination of LLDPE contained in the pressure sensitive adhesive layer 11, h-PP contained in the first layer 16, and h-PP and SEBS contained in the second layer 17, and a combination of LLDPE contained in the pressure sensitive adhesive layer 11, h-PP contained in the first layer 16, and b-PP contained in the second layer 17. With the combination of the constituent materials contained in each layer as described above, by peeling off the protective film 10 from the resin substrate 21 as shown in FIG. 4B, the protective film 10 is charged with a negative charge as a whole, so that the surface of the pressure sensitive adhesive layer 11 on the resin substrate 21 is charged with a negative charge (negatively charged). The surface of the pressure sensitive adhesive layer 11 on the resin substrate 21 side is charged with a negative charge, so that the surface of the resin substrate 21 on the pressure sensitive adhesive layer 11 side is charged with a positive charge.

Each layer of the pressure sensitive adhesive layer 11 and the base material layer 15 (the first layer 16 and the second layer 17) in the above-described protective film 10 may contain various additives such as an antioxidant, a light stabilizer, and an antistatic agent, in addition to the above-described constituent materials.

In addition, an intermediate layer containing the above-described additives may be formed between these layers.

Furthermore, the above-described protective film 10 may be manufactured using any method, and for example, the protective film 10 can be manufactured using a co-extrusion method.

Specifically, three extruders are prepared, and after containing the constituent materials of the pressure sensitive adhesive layer 11, the first layer 16, and the second layer 17, respectively, the constituent materials in a melted or softened state are extruded. In this manner, from a co-extrusion T die, a laminate in which the layers are laminated in a molten or softened state is supplied to a sheet molding unit configured of a plurality of cooling rolls, and then is cooled in this sheet supplying unit, thereby manufacturing the protective film 10.

Fourth Embodiment

Next, a fourth embodiment of the protective film according to the present invention will be described.

Hereinafter, the fourth embodiment of the protective film according to the present invention will be described, but the differences from the above-described first embodiment will be mainly described, and the same matters will be omitted.

The protective film according to the present embodiment is a protective film which is used by being attached to a resin substrate in a case of performing heat bending on the resin substrate while heating the resin substrate, the protective film including a base material layer and a pressure sensitive adhesive layer which is positioned between the base material layer and the resin substrate, and is adhered to the resin substrate, in which the base material layer is composed of a laminate including a first layer which is positioned on a side opposite to the pressure sensitive adhesive layer and a second layer which is positioned on a side of the pressure sensitive adhesive layer, and the pressure sensitive adhesive layer contains polyolefin having pressure sensitive adhesiveness as a main material and has two or more different melting points.

By configuring the protective film as described above, that is, by making the pressure sensitive adhesive layer included in the protective film have two or more different melting points, it is possible to obtain a protective film in which a degree of adhesive force to the resin substrate can be selected according to a type of processing applied to the resin substrate.

Here, in the method of manufacturing a lens for sunglasses described above, the punching of the resin substrate 21 in the thickness direction in the above-described step [2] and the heat bending of the resin substrate 21 in the above-described step [3] are performed in a state of the laminate 100 in which the protective films 10 are attached to the both surfaces of the resin substrate 21.

During the processings in the above-described steps (2) and [3], the protective film 10 is required to stably maintain the state in which the laminate 100 is formed without peeling off the protective film 10 from the resin substrate 21, but since conditions and the like during each processing of the above-described steps [2] and [3] differ, naturally, the degree of adhesive force required between the protective film 10 and the resin substrate 21 also differs.

On the other hand, in the present embodiment, the protective film 10 includes, as the pressure sensitive adhesive layer 11, a material which contains a polyolefin having pressure sensitive adhesiveness as a main material and has two or more different melting points.

In this manner, since the pressure sensitive adhesive layer 11 has two or more different melting points, by appropriately selecting the heating temperature of the heat treatment performed during or before the processings in the above-described steps [2] and [3], it is possible to select the degree of adhesive force to the resin substrate during each processing of the above-described steps [2] and [3]. Hereinafter, the protective film 10 (protective film according to the present embodiment) will be described in detail.

<Protective Film 10>

A longitudinal cross-sectional view of the protective film according to the present embodiment is the same as the longitudinal cross-sectional view of the protective film according to the first embodiment, shown in FIG. 2.

The protective film 10 includes a base material layer 15 and a pressure sensitive adhesive layer 11 which is positioned between this base material layer 15 and the resin substrate 21 and is adhered (bonded) to the resin substrate 21. Furthermore, as illustrated in FIG. 2, the base material layer 15 includes a first layer 16 which is positioned on the opposite side of the pressure sensitive adhesive layer 11, that is, on a molding die side and a second layer 17 which is positioned on the pressure sensitive adhesive layer 11 side, that is, on the resin substrate 21 side.

Hereinafter, each of these layers will be described in detail.

<<Pressure Sensitive Adhesive Layer 11>>

The pressure sensitive adhesive layer 11 is positioned (interposed) between the base material layer 15 and the resin substrate 21, and is a layer for bonding the base material layer 15 to the resin substrate 21 by adhering to the resin substrate 21.

As the pressure sensitive adhesive layer 11, a layer which enables the punching and heat bending of the resin substrate 21 in the above-described step [2] and the above-described step [3] without peeling off the protective film 10 from the resin substrate 21 and enables peeling of the protective film 10 off from the resin substrate 21 in the above-described step [4] is preferably used.

In the present embodiment, the pressure sensitive adhesive layer 11 is a layer containing a polyolefin-based resin having pressure sensitive adhesiveness as a main material, and for example, a configuration in which a polyolefin-based resin alone is contained in the pressure sensitive adhesive layer 11 or a configuration in which a combination of a polyolefin-based resin and an elastomer is contained in the pressure sensitive adhesive layer 11 is preferable. In a case where the pressure sensitive adhesive layer 11 has such a configuration, functions as the pressure sensitive adhesive layer 11 can be reliably exhibited.

In addition, a polyolefin-based resin having pressure sensitive adhesiveness is not particularly limited. Examples thereof include a homopolymer of polypropylene, a homopolymer of polyethylene, a propylene-ethylene block copolymer having an EPR phase (rubber phase), an ethylene-vinyl acetate block copolymer, an ethylene-ethyl acrylate block copolymer, and an ethylene-methyl methacrylate block copolymer, and these may be used alone or in a combination of two or more kinds thereof. Among these, a homopolymer of polyethylene is preferable. The homopolymer of polyethylene is available at a relatively low cost. Transparency can be imparted to the pressure sensitive adhesive layer 11 in a case where the pressure sensitive adhesive layer 11 contains the homopolymer of polyethylene. Accordingly, in a case where the base material layer 15 also has transparency, the protective film 10 can have transparency. Therefore, in a case of, in the above-described step [1], attaching the protective film 10 to the resin substrate 21, it is possible to visually confirm whether or not dirt such as dust is present between the protective film 10 and the resin substrate 21. Accordingly, it is possible to reliably prevent a laminate 100 having dirt therebetween from being transitioned to the steps subsequent to the above-described step [2], and as the result, the yield of the lens 200 for sunglasses to be obtained can be improved.

The homopolymer of polyethylene is not particularly limited, and examples thereof low density polyethylene (LDPE), linear low density polyethylene (LLDPE), high density polyethylene (HDPE), and very low density polyethylene (VLDPE). One or a combination of two or more of these polyethylenes can be used. Examples of the linear low density polyethylene resin suitable for use in the present embodiment include "UMERIT®" manufactured by Ube-Maruzen Polyethylene Co., Ltd., such as UMERIT 2525F and UMERIT 1520F, and "Sumikathene®" manufactured by Sumitomo Chemical Co., Ltd.

In addition, the elastomer is not particularly limited, and examples thereof include an α-polyolefin-based resin/polyethylene copolymer elastomer, an α-polyolefin-based resin/polypropylene copolymer elastomer, an α-polyolefin-based resin/polybutene copolymer elastomer, and a styrene block elastomer. Among these, a styrene block elastomer is preferable, and a styrene-olefin-styrene block copolymer elastomer is particularly preferable. In a case where the elastomer is further contained in addition to the polyolefin-based resin as described above, it is possible to accurately suppress or prevent the pressure sensitive adhesive layer 11 from remaining on the resin substrate 21 during the peeling of the protective film 10 off from the resin substrate 21 in the above-described step [4], that is, accurately suppress or prevent adhesive residues from being generated on the resin substrate 21. Therefore, the protective film 10 can be more smoothly peeled off from the resin substrate 21. In a case where the elastomer includes styrene as a monomer component, it is possible to accurately suppress or prevent adhesive residues from being generated on the resin substrate 21 in the above-described step [4].

Examples of the α-polyolefin-based resin include 1-hexene, 4-methyl-1-pentene, 1-octene, 1-butene, 1-pentene, and 1-heptene.

In addition, in a case where the styrene-olefin-styrene block copolymer elastomer is used as the elastomer, a content of styrene in the elastomer is preferably 25% by weight or less, and more preferably in a range of 10% by weight or more and 18% by weight or less. In this manner, it is possible to accurately suppress or prevent an increase in hardness of the pressure sensitive adhesive layer 11 caused by an increase in content of styrene. Accordingly, it is possible to more accurately suppress or prevent adhesive residues from being generated on the resin substrate 21 while reliably maintaining adhesive force of the pressure sensitive adhesive layer 11 against the resin substrate 21 (coating layer 24).

Furthermore, examples of the styrene-olefin-styrene block copolymer include a styrene-isobutylene-styrene block copolymer (SIBS), a styrene-ethylene-butylene-styrene block copolymer (SEBS), a styrene-butadiene-styrene block copolymer (SBS), and a styrene-isoprene-styrene copolymer (SIS). Among these, a styrene-ethylene-butylene-styrene block copolymer (SEBS) is preferable. In a case where SEBS is selected as the styrene-olefin-styrene block copolymer, a content of styrene in the elastomer can be easily set to be 25% by mass or less, and the above-described effects can be reliably obtained.

In addition, in a case where the pressure sensitive adhesive layer 11 contains the elastomer, a content of the elastomer in the pressure sensitive adhesive layer 11 is not particularly limited, but is preferably set to in a range of 1% by weight or more and 30% by weight or less, and more preferably set to in a range of 5% by weight or more and 15% by weight or less. In this manner, the effects obtained by containing the elastomer in the pressure sensitive adhesive layer 11 can be exhibited more significantly.

In addition, in a case where the pressure sensitive adhesive layer 11 contains the elastomer, a melting point of the elastomer is not particularly limited, but is set to preferably 150° C. or lower, more preferably 120° C. or lower, and still more preferably in a range of 40° C. or higher and 100° C. or lower. In this manner, the effects obtained by containing the elastomer in the pressure sensitive adhesive layer 11 can be exhibited more significantly.

In the present specification, with regard to the pressure sensitive adhesive layer 11 having such a configuration, the melting point of the pressure sensitive adhesive layer 11 is determined according to the melting point of each constituent material contained in the pressure sensitive adhesive layer 11, and for example, in a case of containing two constituent materials having different melting points (peak temperatures by DSC measurement), it can be said that the pressure sensitive adhesive layer 11 has two different melting points, and in a case of containing three constituent materials having different melting points, it can be said that the pressure sensitive adhesive layer 11 has three different melting points. That is, in a case of containing two or more constituent materials having different melting points, it can be said that the pressure sensitive adhesive layer 11 has two or more different melting points.

In the present embodiment, the pressure sensitive adhesive layer 11 has two or more peaks having different heights as the melting points determined as described above. Therefore, by appropriately selecting the heating temperature of the heat treatment performed during or before the processings in the above-described steps [2] and [3], it is possible to select the degree of adhesive force of the pressure sensitive adhesive layer 11 (protective film 10) to the resin substrate 21 during each processing of the above-described steps [2] and [3]. Accordingly, during each processing such as the punching in the above-described step [2] and the heat bending in the above-described step [3], strength can be set according to the degree of adhesive force required between the protective film 10 and the resin substrate 21.

As described above, the pressure sensitive adhesive layer 11 can have at least two or more different melting points by containing at least two or more materials having different melting points as constituent materials, and in this case, a difference between a melting point of a constituent material having the highest melting point and a melting point of a constituent material having the lowest melting point is preferably in a range of 5° C. or higher and 80° C. or lower, and more preferably in a range of 15° C. or higher and 60° C. or lower.

In addition, in this case, the melting point of the constituent material having the lowest melting point is preferably in a range of 60° C. or higher and 130° C. or lower, and more preferably in a range of 70° C. or higher and 110° C. or lower. Furthermore, the melting point of the constituent material having the highest melting point is preferably in a range of 80° C. or higher and 160° C. or lower, and more preferably in a range of 90° C. or higher and 135° C. or lower.

By setting each of the difference between the melting point of the constituent material having the highest melting point and the melting point of the constituent material having the lowest melting point, the melting point of the constituent material having the highest melting point, and the melting point of the constituent material having the lowest melting point to be within the above-described range, the effects obtained by making the pressure sensitive adhesive layer 11 have at least two or more different melting points can be exhibited more significantly.

In addition, in a case where the pressure sensitive adhesive layer 11 has at least two or more different melting points by containing at least two or more materials having different melting points as constituent materials, a combination of the constituent materials is not particularly limited, and specific examples thereof include a combination of a polyolefin-based resin and an elastomer, and a combination of polyolefin-based resins. In addition, in a case of using the homopolymer of polyethylene as the polyolefin-based resin, examples of the combination of polyolefin-based resins include a combination of low density polyethylenes (LDPE), a combination of linear low density polyethylenes (LLDPE), and a combination of low density polyethylene (LDPE) and linear low density polyethylene (LLDPE), and in a case where one homopolymer of polyethylene is included as the polyolefin-based resin, examples thereof include a combination of linear low density polyethylene (LLDPE) and ethylene-methacrylic acid copolymer (EMAA), a combination of linear low density polyethylene (LLDPE) and ethylene-methyl acrylate copolymer (EMA), and a combination of high density polyethylene (HDPE) and ethylene-methyl acrylate copolymer (EMA). Furthermore, examples of the combination of a polyolefin-based resin and an elastomer include a combination of linear low density polyethylene (LLDPE) and one of an α-polyolefin-based resin/polyethylene copolymer elastomer, an α-polyolefin-based resin/polypropylene copolymer elastomer, and an α-polyolefin-based resin/polybutene copolymer elastomer.

Furthermore, in addition to the case where the pressure sensitive adhesive layer 11 has at least two or more different melting points by containing at least two or more materials having different melting points as constituent materials, the pressure sensitive adhesive layer 11 can also have at least two or more melting points by containing at least one constituent material having two different melting points in the pressure sensitive adhesive layer 11.

Examples of the one constituent material having two different melting points as described above include, as a homopolymer of polyethylene, linear low density polyethylene (LLDPE) having melting points of 99° C. and 114° C., linear low density polyethylene (LLDPE) having melting points of 97° C. and 113° C., linear low density polyethylene (LLDPE) having melting points of 99° C. and 114° C., very low density polyethylene (VLDPE) having melting points of 87° C. and 111° C., VLDPE having melting points of 97° C. and 113° C., and VLDPE having melting points of 99° C. and 114° C.

In the protective film 10 including the pressure sensitive adhesive layer 11 having such a configuration, in a case where, in accordance with JIS Z 0273:2009, the protective film 10 is attached to a polycarbonate substrate by pressure-bonding the protective film with a rubber roll at a speed of 2 m/min with a pressure of 5880 N/m, and after heating the protective film under conditions of 100° C. for 30 minutes and then cooling the heated protective film to 23° C., the protective film 10 is cut into a size of 100 mm in length and 25 mm in width, and then one end of the cut protective film 10 is held and the protective film is peeled off in a direction of 90° at a speed of 200 mm/min, a peel strength $T_1$ measured is preferably in a range of 0.05 N/25 mm or more and 0.6 N/25 mm or less, and more preferably in a range of 0.1 N/25 mm or more and 0.5 N/25 mm or less. Here, in the above-described step [2], the resin substrate 21 is punched out to form the laminate 100 under temperature conditions of approximately normal temperature to 100° C. Therefore, by setting the above-described peel strength $T_1$ after heating at 100° C. to be within the above-described range, in the above-described step [2], it is possible to accurately suppress or prevent the peeling of the protective film 10 from the resin substrate 21 (laminate 100) and wrinkling of the protective film 10 in the laminate 100.

In addition, in the protective film 10, in a case where, in accordance with JIS Z 0273:2009, the protective film 10 is attached to a polycarbonate substrate by pressure-bonding the protective film with a rubber roll at a speed of 2 m/min with a pressure of 5880 N/m, and after heating the protective film 10 under conditions of 145° C. for 30 minutes and then cooling the heated protective film to 23° C., the protective film 10 is cut into a size of 100 mm in length and 25 mm in width, and then one end of the cut protective film 10 is held and the protective film 10 is peeled off in a direction of 90° at a speed of 200 mm/min, a peel strength $T_2$ measured is preferably in a range of 0.15 N/25 mm or more and 1.5 N/25 mm or less, and more preferably in a range of 0.3 N/25 mm or more and 1.0 N/25 mm or less. Here, in the above-described step [3], as described above, the heat bending of the resin substrate 21 is performed in a state of forming the laminate 100 under temperature conditions of approximately 110° C. to 160° C. Therefore, by setting the above-described peel strength $T_2$ after heating at 145° C. to be within the above-described range, in the above-described step [3], it is possible to accurately suppress or prevent the peeling of the protective film 10 from the resin substrate 21 (laminate 100) and wrinkling of the protective film 10 in the laminate 100. In addition, by setting the peel strength to the above-described upper limit value or less, in the above-described step [4] after performing the above-described step [3], it is possible to peel off the protective film 10 from the resin substrate 21 relatively easily while accurately suppressing or preventing adhesive residues of the pressure sensitive adhesive layer 11 on the surface of the resin substrate 21.

As described above, in the protective film 10, by heat-treating the pressure sensitive adhesive layer 11 at a relatively low heating temperature such as 100° C., compared to a case where the pressure sensitive adhesive layer 11 is heat-treated at a relatively high heating temperature such as 145° C., the degree of adhesive force of the pressure sensitive adhesive layer 11 (protective film 10) to the resin substrate 21 can be set to be lower. That is, by appropriately selecting the heating temperature applied to the pressure sensitive adhesive layer 11, the degree of adhesive force of the pressure sensitive adhesive layer 11 (protective film 10) to the resin substrate 21 can be selected.

As for the difference in degree of adhesive force, for example, in a case of being represented by a degree of a ratio ($T_2/T_1$) of the peel strength $T_1$ as the adhesion force of the protective film 10 at a heating temperature of 100° C. and the peel strength $T_2$ as the adhesion force of the protective film 10 at a heating temperature of 145° C., the ratio ($T_2/T_1$) is preferably in a range of approximately 2.0 or more and 4.5 or less, and more preferably in a range of approximately 3.0 or more and 4.5 or less. As a result, by appropriately selecting the heating temperature applied to the pressure sensitive adhesive layer 11, the degree of adhesive force of the pressure sensitive adhesive layer 11 (protective film 10) to the resin substrate 21 can be selected relatively easily.

In addition, an average thickness of the pressure sensitive adhesive layer 11 is preferably in a range of 5 μm or more and 40 μm or less, and more preferably in a range of 10 μm or more and 20 μm or less. In this manner, the above-described functions as the pressure sensitive adhesive layer 11 can be reliably exhibited.

<<Base Material Layer 15>>

The base material layer 15 is bonded to the resin substrate 21 (coating layer 24) through the pressure sensitive adhesive layer 11, thereby functioning as a functional layer (protective layer) that protects (masks) the resin substrate 21 during the punching and heat bending of the resin substrate 21 in the above-described step [2] and the above-described step [3] and as a protective layer (functional layer) for peeling off (releasing) the resin substrate 21 (protective film 10) from a mold used for heat bending after the heat bending in the above-described step [3].

In addition, in the above-described step [4], in a case of peeling off the protective film 10 from the heat-bended resin substrate 21, excellent adhesion to the pressure sensitive adhesive layer 11 is exhibited without peeling between the base material layer 15 and the pressure sensitive adhesive layer 11.

In the present embodiment, as illustrated in FIG. 2, in order to allow the base material layer 15 to exhibit these functions, the base material layer 15 is composed of a laminate having the first layer 16 which is positioned on the side opposite to the pressure sensitive adhesive layer 11, that is, on a molding die side and the second layer 17 which is positioned on the pressure sensitive adhesive layer 11 side, that is, on the resin substrate 21 side.

Hereinafter, the first layer 16 and the second layer 17 will be described.

<<First Layer 16>

The first layer 16 is positioned on the side opposite to the pressure sensitive adhesive layer 11, and functions as an outermost layer for protecting (masking) the resin substrate 21 in a case of the punching and heat bending of the resin substrate 21 in the above-described step [2] and the above-described step [3].

In the first layer 16, for the purpose of maintaining excellent releasability from the molding die after the heat bending in the above-described step [3], that is, allowing the first layer 16 not to adhere to the molding die (mold), a melting point of the first layer 16 is preferably 150° C. or higher and more preferably in a range of approximately 155° C. or higher and 170° C. or lower. Here, as described above, the heating temperature of the coating layer 24 (resin substrate 21) in a case of the heat bending in the step [3] is set to be preferably in a range of approximately 110° C. or higher and 160° C. or lower. Therefore, by setting the melting point of the first layer 16 as described above, it is possible to reliably prevent the first layer 16 from being melted or softened in a case of the heat bending in the above-described step [3]. Accordingly, it is possible to reliably release the laminate 100 from the molding die after the heat bending in the above-described step [3].

The first layer 16 contains, as a main material, preferably a thermoplastic resin having a melting point of 150° C. or higher, and more preferably a thermoplastic resin having a melting point in a range of approximately 155° C. or higher and 170° C. or lower. In this manner, the melting point of the first layer 16 can relatively easily be set to 150° C. or higher. Accordingly, it is possible to maintain excellent releasability of the laminate 100 from the molding die after the heat bending in the above-described step [3].

In the present specification, the melting point of each layer of the first layer 16 and the second layer 17 constituting the base material layer 15 is acquired by multiplying, by the ratio of each constituent material, the melting point (the peak temperature obtained by DSC measurement) of each constituent material contained in each layer and summing the obtained values, and the acquired value is defined as the melting point.

In addition, in a case where the second layer 17 described later is also configured to contain a thermoplastic resin of 150° C. or higher, adhesion between the first layer 16 and the second layer 17 can be further improved. Accordingly, in the above-described step [4], in a case of peeling off the protective film 10 from the heat-bended resin substrate 21, it is possible to accurately suppress or prevent peeling between the first layer 16 and the second layer 17.

Furthermore, the first layer 16 preferably has a configuration in which, as the thermoplastic resin of 150° C. or higher, the first layer 16 contains only a polyolefin-based resin of 150° C. or higher. The polyolefin-based resin of 150° C. or higher can be obtained relatively easily and inexpensively as the thermoplastic resin of 150° C. or higher.

In addition, the polyolefin-based resin having a melting point of 150° C. or higher is not particularly limited, and examples thereof include resins of a homopolymer of polypropylene, a homopolymer of polyethylene, a propylene-ethyl acrylate copolymer, an ethylene-vinyl acetate copolymer, an ethylene-ethyl acrylate copolymer, and an ethylene-methyl methacrylate copolymer, which have a melting point of 150° C. or higher, and these may be used alone or in a combination of two or more kinds thereof. Among these, a homopolymer of polyethylene having a melting point of 150° C. or higher is preferable. In this manner, it is possible to easily and inexpensively obtain a polyolefin-based resin having a melting point of 150° C. or higher. In addition, it is possible to impart transparency to the first layer 16. Therefore, in a case where the second layer 17 and the pressure sensitive adhesive layer 11 also have transparency, the protective film 10 has transparency. Therefore, in a case of, in the above-described step [1], attaching the protective film 10 to the resin substrate 21, and in a case of re-attaching the protective film 10 to the resin substrate 21 prior to the above-described step [2], it is possible to visually confirm whether or not dirt such as dust is present between the protective film 10 and the resin substrate 21. Accordingly, it is possible to reliably prevent a laminate 100 having dirt therebetween from being transitioned to the steps subsequent to the above-described step [2], and as the result, the yield of the lens 200 for sunglasses to be obtained can be improved.

The above-described copolymer may be either a block copolymer or a random copolymer.

In addition, an average thickness of the first layer 16 is preferably in a range of 2 μm or more and 40 μm or less, and more preferably in a range of 5 μm or more 25 μm or less. In this manner, the above-described functions as the first layer 16 can be reliably exhibited.

<<Second Layer 17>>

Since the second layer 17 is positioned on the side of the pressure sensitive adhesive layer 11, that is, the resin substrate 21 side, the second layer 17 is positioned between the pressure sensitive adhesive layer 11 and the first layer 16, and functions as an intermediate layer for bonding these layers.

The second layer 17 contains, as a main material, a thermoplastic resin having adhesiveness (pressure sensitive adhesiveness) in order to exhibit the above-described functions, and as a result, the pressure sensitive adhesive layer 11 and the first layer 16 can be bonded with exhibit adhesion through the second layer 17. Accordingly, in the above-described step [4], in a case of peeling off the protective film 10 from the resin substrate 21, peeling between the pressure sensitive adhesive layer 11 and the second layer 17 and between the first layer 16 and the second layer 17 is accurately suppressed or prevented. As a result, in the punching of the resin substrate 21 in the above-described step [2], even in a case where the pressure sensitive adhesive layer 11 has whiskers extending toward the resin substrate 21 on the cut surface of the resin substrate 21 formed by the punching, the protective film 10 (pressure sensitive adhesive layer 11) can be peeled off from the resin substrate 21 in a state in which the whiskers are accurately suppressed or prevented from remaining on the cut surface of the resin substrate 21.

The thermoplastic resin having adhesiveness (adhesive resin) is not particularly limited, examples thereof include a polyolefin-based resin, an elastomer, an acrylic resin, and a polyurethane-based resin, and these may be used alone or in a combination of two or more kinds thereof. Among these, a polyolefin-based resin or an elastomer, which has adhesiveness, is preferable. In addition, in a case where the pressure sensitive adhesive layer 11 contains an elastomer, it is particularly preferable to use a combination of a polyolefin-based resin and an elastomer. In this manner, adhesion between the pressure sensitive adhesive layer 11 and the second layer 17 can be improved, and it is possible to accurately suppress or prevent peeling between the pressure sensitive adhesive layer 11 and the second layer 17.

In addition, examples of the polyolefin-based resin include an ethylene-vinyl acetate copolymer (EVA), an ethylene-maleic acid anhydride copolymer, an ethylene-methyl methacrylate copolymer (EMMA), an ethylene-methyl acrylate copolymer (EMA), an ethylene-methacrylic acid copolymer (EMAA), an ethylene-acrylic acid copolymer (EAA), an ethylene-ethylacrylic acid copolymer (EEA), and an ethylene-methacrylate-glycidyl acrylate terpolymer, and include grafted products obtained by grafting, onto various polyolefin-based resins, a monobasic unsaturated fatty acid such as acrylic acid and methacrylic acid, a dibasic unsaturated fatty acid such as maleic acid, fumaric acid, and itaconic acid, or an anhydride thereof, and functional group-introduced products obtained by introducing, into various polyolefin-based resins, a functional group such as a carboxylic acid group, a hydroxyl group, an amino group, an acid anhydride group, an oxazoline group, and an epoxy group, and these may be used alone or in a combination of two or more kinds thereof. Examples of the above-described grafted product include a maleic acid-grafted EVA and a maleic acid-grafted ethylene-α-polyolefin-based resin copolymer.

As the elastomer, the same materials as those described as the elastomer contained in the pressure sensitive adhesive layer 11 can be used, and among these, a styrene block elastomer is preferable, and a styrene-olefin-styrene block copolymer elastomer is particularly preferable. In this way, in a case where the elastomer includes styrene as a monomer component, since the adhesion of the second layer 17 to the pressure sensitive adhesive layer 11 is improved, it is possible to accurately suppress or prevent adhesive residues from being generated on the resin substrate 21 in the above-described step [4].

In addition, the second layer 17 may contain, as a constituent material, a thermoplastic resin having no adhesiveness (non-adhesive resin) in addition to the thermoplastic resin having adhesiveness. Since the thermoplastic resin having no adhesiveness exhibits excellent affinity with the polyolefin-based resin contained in the first layer 16 and having a melting point of 150° C. or higher, the adhesion between the first layer 16 and the second layer 17 can be improved. Accordingly, in the above-described step [4], in a case of peeling off the protective film 10 from the resin substrate 21, it is possible to accurately suppress or prevent peeling between the first layer 16 and the second layer 17.

Examples of the thermoplastic resin having no adhesiveness include a polyolefin-based resin, polyesters, polyurethanes, silicone resins, polyamides, polyimides, polyvinyl chlorides, and polycarbonates, and these may be used alone or in a combination of two or more kinds thereof. Among these, a polyolefin-based resin is preferable, and a polyolefin-based resin having a melting point of 150° C. or higher is more preferable. In this manner, the above-described effects can be exhibited more significantly.

In addition, the polyolefin-based resin is not particularly limited, and examples thereof include a homopolymer of polypropylene, a homopolymer of polyethylene, a propylene-ethyl acrylate copolymer, an ethylene-vinyl acetate copolymer, an ethylene-ethyl acrylate copolymer, and an ethylene-methyl methacrylate copolymer, and these may be used alone or in a combination of two or more kinds thereof. Among these, a homopolymer of polyethylene is preferable. In this manner, it is possible to easily and inexpensively obtain the polyolefin-based resin. In addition, it is possible to impart transparency to the second layer 17. Therefore, in a case where the first layer 16 and the pressure sensitive adhesive layer 11 also have transparency, the protective film 10 has transparency. Therefore, in a case of, in the above-described step [1], attaching the protective film 10 to the resin substrate 21, and in a case of re-attaching the protective film 10 to the resin substrate 21 prior to the above-described step [2], it is possible to visually confirm whether or not dirt such as dust is present between the protective film 10 and the resin substrate 21. Accordingly, it is possible to reliably prevent a laminate 100 having dirt therebetween from being transitioned to the steps subsequent to the above-described step [2], and as the result, the yield of the lens 200 for sunglasses to be obtained can be improved.

Furthermore, a melting point of the polyolefin-based resin having a melting point of 150° or higher is preferably in a range of 155° C. or higher and 170° C. or lower.

The above-described copolymer may be either a block copolymer or a random copolymer. Here, since the polyolefin-based resin having a melting point of 150° C. or higher alone does not have adhesiveness, the polyolefin-based resin having a melting point of 150° C. or higher alone is generally used as the thermoplastic resin having no adhesiveness. However, for example, a propylene-ethylene random copolymer (melting point: 151° C.) has adhesiveness so as to be used as the thermoplastic resin having adhesiveness.

From the above, in a case where the second layer 17 contains the thermoplastic resin having no adhesiveness, the thermoplastic resin having adhesiveness and the thermoplastic resin having no adhesiveness are preferably a combination of the elastomer and the polyolefin-based resin having a melting point of 150° C. or higher. With such a combination, it is possible to accurately suppress or prevent peeling between the pressure sensitive adhesive layer 11 and the second layer 17 and between the first layer 16 and the second layer 17.

The melting point of the second layer 17 having the above-described configuration is preferably 120° C. or higher. Here, as described above, the heating temperature of the coating layer 24 (resin substrate 21) in a case of the heat bending in the step [3] is set to be preferably in a range of approximately 110° C. or higher and 160° C. or lower. Therefore, in a case where the melting point of the second layer 17 is set to in a range of 120° C. or higher and lower than 150° C., it is possible to relatively easily melt or soften the second layer 17 during the heat bending in the above-described step [3]. As a result, in the above-described step [3], since the second layer 17 exhibits the function as the intermediate layer in a molten or softened state, and the first layer 16 can be shifted in a surface direction of the resin substrate 21, a gripping part formed of the first layer 16 can be reliably formed on the edge of the laminate 100. Accordingly, since the peeling of the protective film 10 in the above-described step [4] can be performed by gripping the gripping part, the peeling can be easily performed. In addition, in the above-described step [3], since the second layer 17 exhibits the function as the intermediate layer in a molten or softened state, it is possible to improve cushioning property of the second layer 17 during molding with a mold. As a result, unevenness of the mold or unevenness of contaminants unintentionally mixed between the mold and the protective film 10 can be effectively absorbed, so that the heat-bended resin substrate 21 can have an excellent appearance.

In addition, in a case where the melting point of the second layer 17 is set to 150° C. or higher, it is possible to suppress or prevent the second layer 17 from being melted or softened during the heat bending in the above-described step [3]. Therefore, it is possible to accurately suppress or prevent a decrease in adhesive force between the first layer 16 and the second layer 17. Accordingly, in the above-described step [4], in a case of peeling off the protective film 10 from the heat-bended resin substrate 21, peeling between the first layer 16 and the second layer 17 is reliably prevented.

In addition, an average thickness of the second layer 17 is preferably in a range of 10 μm or more and 60 μm or less, and more preferably in a range of 10 μm or more 40 μm or less. In this manner, the above-described functions as the second layer 17 can be reliably exhibited.

Each layer of the pressure sensitive adhesive layer 11 and the base material layer 15 (the first layer 16 and the second layer 17) in the above-described protective film 10 may contain various additives such as an antiblocking agent, an antioxidant, a light stabilizer, and an antistatic agent, in addition to the above-described constituent materials. A content of the above-described additive can be 10% by weight or less or 8% by weight or less, and can be 0.001% by weight or more or 0.1% by weight or more.

In particular, the first layer 16 preferably contains an antiblocking agent. As a result, the function of the first layer 16, which enables maintaining excellent releasability from the molding die, can be exhibited more reliably.

In addition, as the antiblocking agent, for example, inorganic particles, organic particles, or the like can be used, and these may be used alone or in a combination of two or more kinds thereof. The inorganic particles are not particularly limited, and examples thereof include particles such as silica, zeolites, smectites, mica, vermiculite, and talc; and the organic particles are not particularly limited, and examples thereof particles of acrylic resins, polyolefin-based resins, polyester-based resins, polyurethane-based resins, polystyrene-based resins, silicone-based resins, and fluorine-based resins.

In a case where the first layer 16 contains the antiblocking agent, a content of the antiblocking agent in the first layer 16 is not particularly limited, but is preferably in a range of 0.5% by weight or more and 10% by weight or less, and more preferably in a range of 1% by weight or more and 9% by weight or less. In this manner, the above-described functions of the first layer 16 can be exhibited more significantly.

In addition, an intermediate layer containing the above-described additives may be formed between these layers.

Furthermore, the above-described protective film 10 may be manufactured using any method, and for example, the protective film 10 can be manufactured using a co-extrusion method.

Specifically, three extruders are prepared, and after containing the constituent materials of the pressure sensitive adhesive layer 11, the first layer 16, and the second layer 17, respectively, the constituent materials in a melted or softened state are extruded. In this manner, from a co-extrusion T die, a laminate in which the layers are laminated in a molten or softened state is supplied to a sheet molding unit configured of a plurality of cooling rolls, and then is cooled in this sheet supplying unit, thereby manufacturing the protective film 10.

Fifth Embodiment

Next, the resin sheet laminate and protective film set according to the present invention will be described in detail based on suitable embodiments illustrated in the accompanying drawings.

First, prior to describing the resin sheet laminate and protective film set according to the embodiment of the present invention, eyeglasses (eyewear) including, as a light-transmitting cover member, a light-transmitting resin sheet included in the resin sheet laminate according to the embodiment of the present invention, which is attached to lenses, will be described.

<Eyeglasses>

Figure 5:
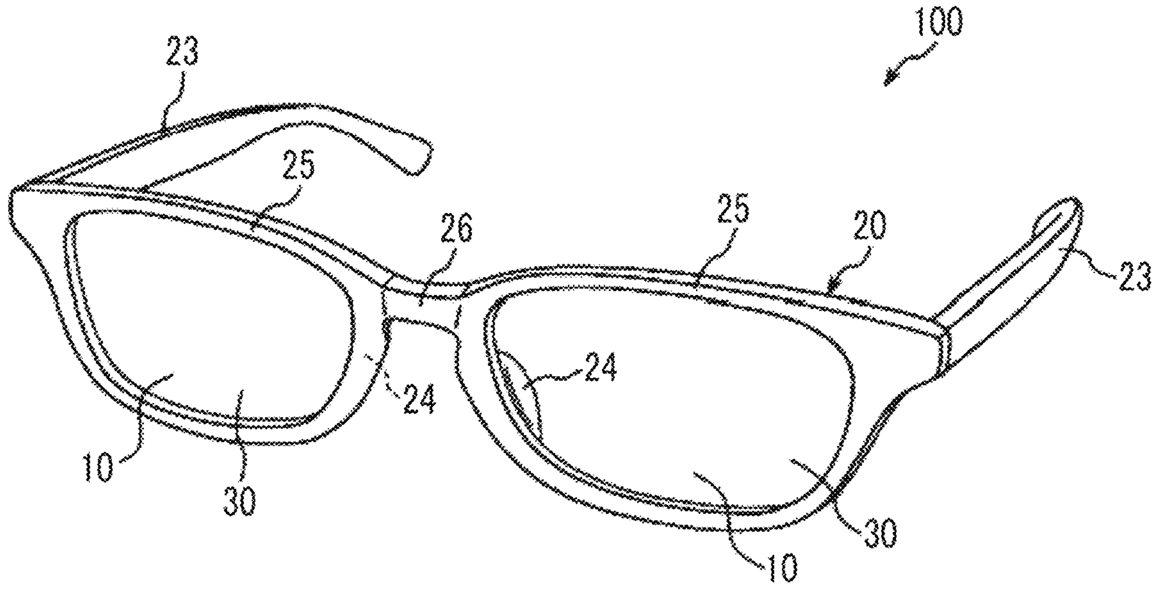
FIG. 5 shows a perspective view of eyeglasses including a light-transmitting resin sheet of a resin sheet laminate according to the present invention, attached to a lens.
Figure 6:
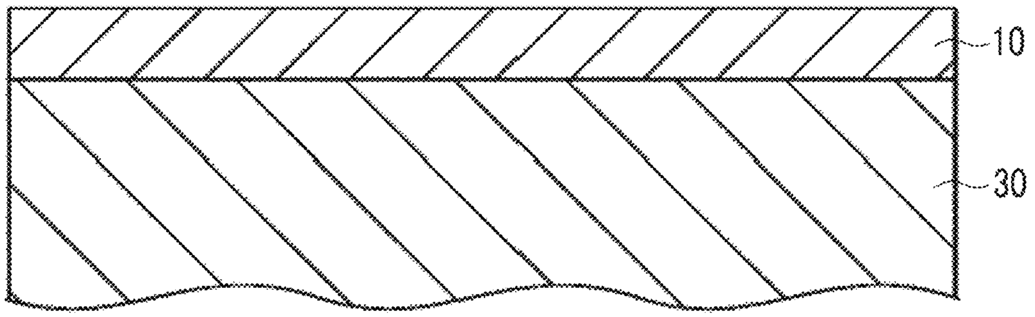
FIG. 6 shows a partially enlarged longitudinal cross-sectional view illustrating an embodiment of the lens to which the light-transmitting resin sheet, which is included in the eyeglasses shown in FIG. 5.
Figure 7:
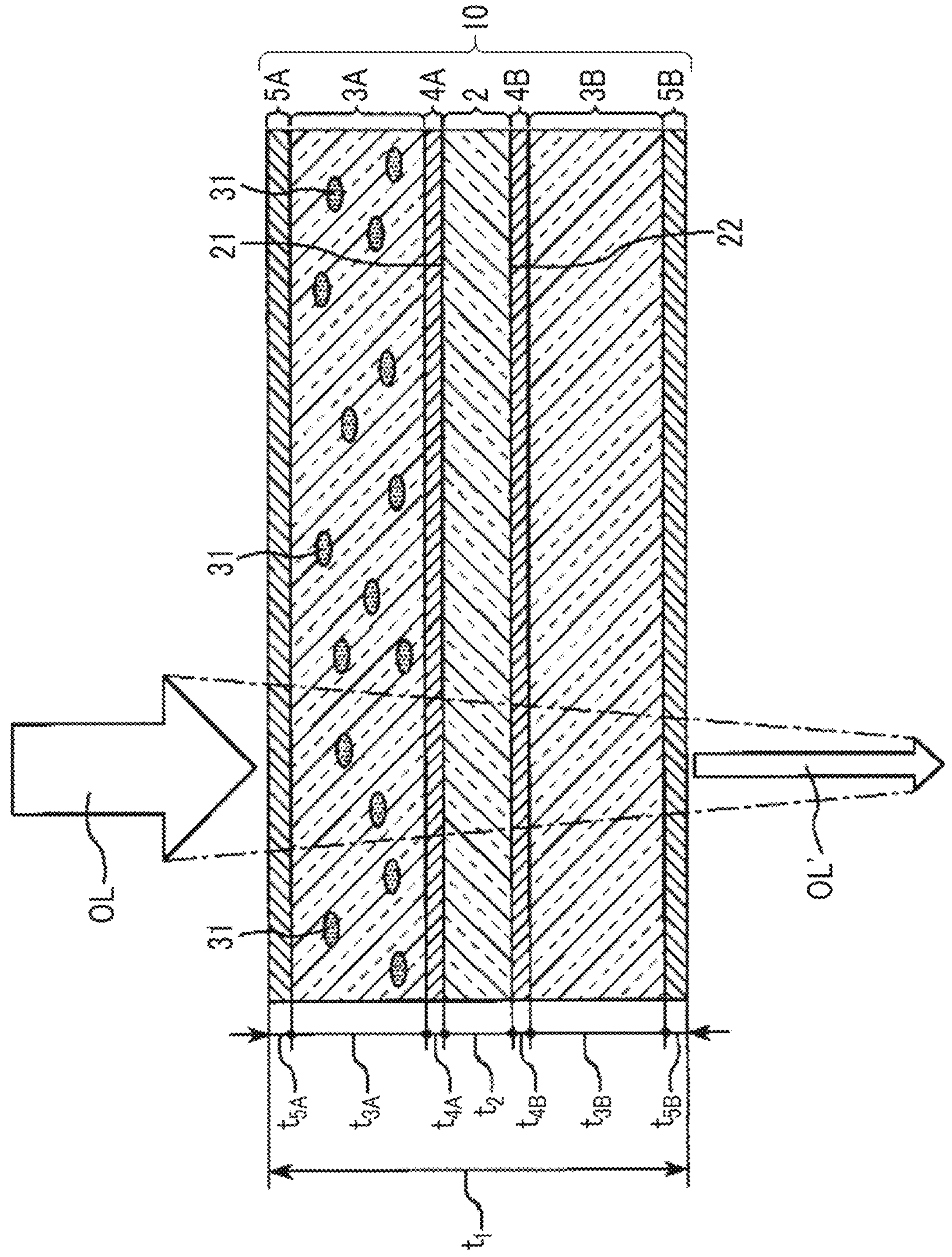
FIG. 7 shows an enlarged cross-sectional view of the light-transmitting resin sheet in FIG. 6.
Figure 8:
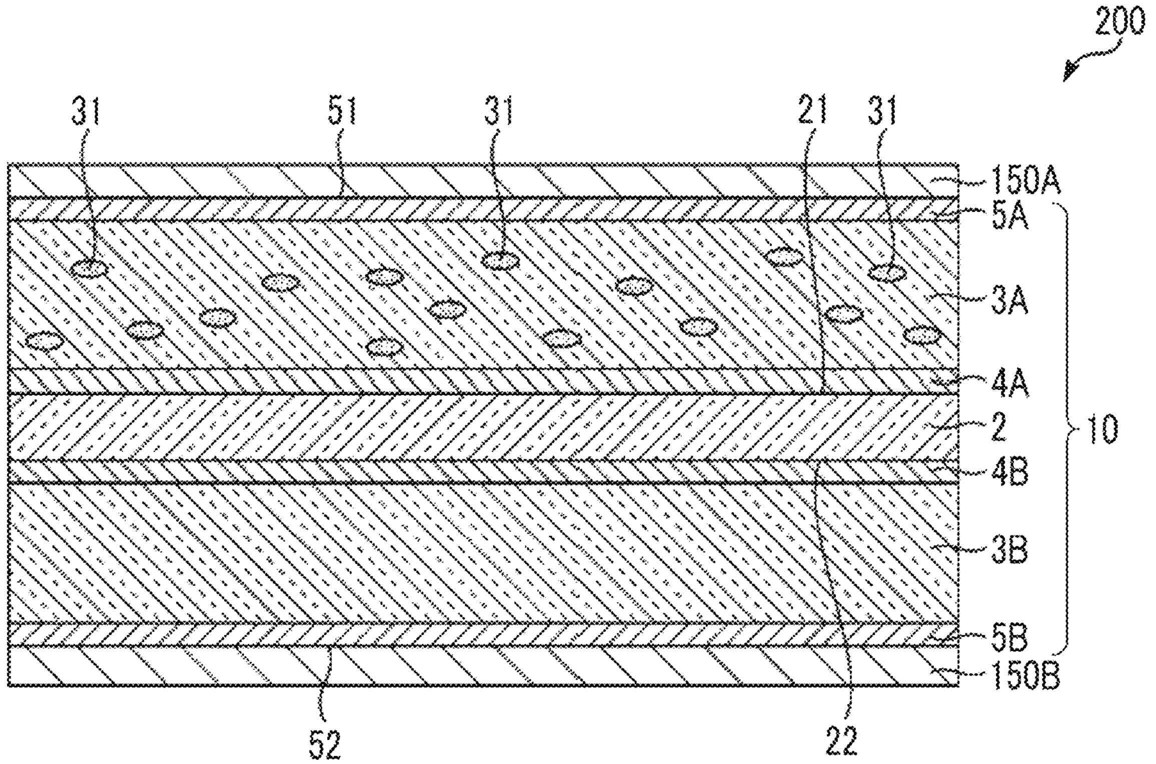
FIG. 8 shows an enlarged cross-sectional view illustrating a resin sheet laminate in which a protective film is laminated on the light-transmitting resin sheet shown in FIG. 7.

FIG. 5 is a perspective view of eyeglasses including a light-transmitting resin sheet of a resin sheet laminate according to the present invention, attached to a lens. FIG. 6 is a partially enlarged longitudinal cross-sectional view illustrating an embodiment of the lens to which the light-transmitting resin sheet, which is included in the eyeglasses shown in FIG. 5. FIG. 7 is an enlarged cross-sectional view of the light-transmitting resin sheet in FIG. 6, and FIG. 8 is an enlarged cross-sectional view illustrating a resin sheet laminate in which a protective film is laminated on the light-transmitting resin sheet shown in FIG. 7. In the following, for convenience of description, in FIG. 5, when the eyeglasses are worn on a head portion of a wearer, a surface on an eye-side of the wearer of the lens is referred to as a back side surface, and a surface on an opposite side thereof is referred to as a front side surface. In addition, In FIGS. 6 to 8, the upper side is referred to as "upper" or "upward", and the lower side is also referred to as "lower" or "downward". In addition, in FIGS. 7 and 8, for ease of understanding, a cover member is shown in a flat state, and a thickness direction is exaggerated and schematically shown.

As shown in FIG. 5, eyeglasses 100 include a frame 20, a lens 30, and a light-transmitting resin sheet 10.

In the present specification, the term "lens" includes both one having a light-collecting function and one not having the light-collecting function.

The frame 20 is worn on the head portion of the wearer so that the lens 30 is disposed in the vicinity of the front of eyes of the wearer.

The frame 20 has a rim portion 25, a bridge portion 26, a temple portion 23, and a nose pad portion 24.

The rim portion 25 has a ring shape, and one rim portion is provided for each of the right eye and the left eye to correspond thereto, and the lens 30 is installed inside. As a result, the wearer can visually recognize external information through the lens 30.

In addition, the bridge portion 26 has a rod shape, and is located in front of an upper part of a nose of the wearer when worn on the head portion of the wearer to connect the pair of the rim portions 25.

The temple portion 23 has a bow shape, and is connected to an edge portion on a side opposite to a location of each of the rim portions 25 to which the bridge portion 26 is connected. The temple portion 23 is hung on an ear of the wearer when worn on the head portion of the wearer.

The nose pad portion 24 is provided on an edge portion of each of the rim portions 25 corresponding to the nose of the wearer when the eyeglasses 100 are worn on the head portion of the wearer, abuts the nose of the wearer, and has a shape corresponding to an abutting portion of the nose. As a result, the worn state can be stably maintained.

A constituent material of each part constituting the frame 20 is not particularly limited, and various metal materials, various resin materials, and the like can be used, for example. The shape of the frame 20 is not limited to the one shown in the drawing as long as it can be worn on the head portion of the wearer.

The lens 30 is installed to each of the rim portions 25. The lens 30 is a member having a light-transmitting property and forming a plate shape curved toward the outside.

A constituent material of the lens 30 is not particularly limited as long as it has the light-transmitting property, and examples thereof include various resin materials such as various curable resins such as various thermoplastic resins, thermosetting resins, and photocurable resins, various glass materials, various crystal materials, and the like, and one or two or more kinds thereof can be used in combination.

Examples of the resin material include polyolefins such as polyethylene, polypropylene, and an ethylene-propylene copolymer, polyvinyl chloride, polystyrene, polyamides, polyimides, polycarbonate, poly-(4-methylpentene-1), ionomer, acrylic resin, polymethyl methacrylate, an acrylonitrile-butadiene-styrene copolymer (ABS resin), an acrylonitrile-styrene copolymer (AS resin), a butadiene-styrene copolymer, polyesters such as polyethylene terephthalate (PET) and polybutylene terephthalate (PBT), polyether, polyetherketone (PEK), polyetheretherketone (PEEK), polyetherimide, polyacetal (POM), polyphenylene oxide, polysulfone, polyethersulfon, polyphenylene sulfide, polyarylate, aromatic polyester (liquid crystal polymer), polytetrafluoroethylene, polyvinylidene fluoride, other fluororesins, epoxy resins, phenolic resins, urea resins, melamine resins, silicone resins, polyurethanes, and the like, or copolymers, blends, polymer alloys, and the like mainly containing these, and one or two or more kinds thereof can be used in combination.

In addition, examples of the glass material include soda glass, crystalline glass, quartz glass, lead glass, potassium glass, borosilicate glass, and non-alkali glass, and one or two or more kinds thereof can be used in combination.

In addition, examples of the crystal material include sapphire, quartz, and the like, and one or two or more kinds thereof can be used in combination.

A thickness of the lens 30 is not particularly limited, and is preferably 0.5 mm or more and 5.0 mm or less, and more preferably 1.0 mm or more and 3.0 mm or less, for example. As a result, compatibility between relatively high strength and weight reduction is possible.

In the present embodiment, as shown in FIG. 6, the light-transmitting resin sheet 10 has a curved shape corresponding to an outer surface, that is, a curved convex surface of the lens 30, and the light-transmitting resin sheet 10 is attached as a light-transmitting cover member covering the curved convex surface. Although the lens 30 is actually a curved plate-like member, the lens 30 is illustrated as a flat plate-like member in FIG. 6.

The lens 30 to which the light-transmitting resin sheet 10 is attached is not limited to the eyeglasses 100, and by appropriately changing the shape and the like, it can be applied to a light-transmitting cover member attached to lenses of various types of eyewear such as sunglasses and sun visors.

As shown in FIG. 7, the light-transmitting resin sheet 10 is composed of a laminated plate including a first resin layer 2, a second resin layer 3A and a second resin layer 3B, a bonding layer 4A and a bonding layer 4B, and a hardcoat layer 5A and a hardcoat layer 5B. Each layer will be described below.

The first resin layer 2 is an intermediate layer located in a center of the light-transmitting resin sheet 10 in the thickness direction, and is a portion with a constant thickness to in a surface direction of the light-transmitting resin sheet 10.

The first resin layer 2 is mainly composed of a polyvinyl alcohol (PVA) resin.

In the present embodiment, the first resin layer 2 is a polyvinyl alcohol resin dyed with a dichroic coloring agent such as iodine and dichroic dye and then crosslinked with a boron compound or the like. In this case, a content of the polyvinyl alcohol resin in the first resin layer 2 is preferably in a range of 1% or more and 8% or less, and more preferably in a range of 2% or more and 5% or less.

In addition, the first resin layer 2 is formed by processing a sheet material (film) made of the above-described constituent material. That is, the sheet material is a sheet material having a thickness larger than the thickness $t_2$ of the first resin layer 2 in the light-transmitting resin sheet 10, and the first resin layer 2 is obtained by stretching the sheet material in one direction until it reaches the thickness $t_2$. As a result, the first resin layer 2 is to be a polarizing layer functioning as a polarizer because the polyvinyl alcohol resin (polymer) is aligned along one direction in which the polyvinyl alcohol resin is stretched.

The thickness $t_2$ is not particularly limited, and for example, it is preferably in a range of 0.01 mm or more and 0.03 mm or less. In a case where the thickness $t_2$ is less than 0.01 mm, the first resin layer 2 may not sufficiently exhibit its function as the polarizer, and in a case where the thickness $t_2$ is more than 0.03 mm, the function as the polarizer cannot be expected to improve any further.

A refractive index of the first resin layer 2 is not particularly limited, and for example, it is preferably in a range of 1.52 or more and 1.67 or less, and more preferably in a range of 1.54 or more and 1.60 or less.

As shown in FIG. 7, the second resin layer 3A is disposed on an upper surface 21 side of the first resin layer 2, and the second resin layer 3B is disposed on a lower surface 22 side.

Since the second resin layer 3A and the second resin layer 3B have the same configuration except that the second resin layer 3A and the second resin layer 3B are arranged at different locations and that the second resin layer 3A contains particles 31 composed of a metal oxide, the second resin layer 3A will be representatively described below.

The second resin layer 3A is mainly made of a polycarbonate resin. A weight-average molecular weight of the polycarbonate resin is preferably in a range of 19,000 or more and 40,000 or less, and more preferably in a range of 19,500 or more and 35,000 or less. As a result, the second resin layer 3A has, for example, sufficient impact resistance.

In addition, the second resin layer 3A is obtained by processing a sheet material of the polycarbonate resin, containing the particles 31 of a metal oxide. That is, the sheet material is a sheet material having a thickness larger than a thickness $t_{3A}$ of the second resin layer 3A in the light-transmitting resin sheet 10, and the second resin layer 3A is obtained by stretching the sheet material in one direction until it reaches the thickness $t_{3A}$. As a result, the second resin layer 3A is aligned along one direction in which the polycarbonate resin (polymer) is stretched in the layer. Therefore, the second resin layer 3A has a retardation (birefringence× thickness) and a retardation in thickness direction (Rth). For example, the retardation is preferably in a range of 2,400 nm or more and 6,000 nm or less, and more preferably in a range of 3,000 nm or more and 5,600 nm or less.

The thickness $t_{3A}$ of the second resin layer 3A (the same applies to a thickness $t_{3B}$ of the second resin layer 3B) is preferably in a range of 0.2 mm or more and 0.35 mm or less, and more preferably in a range of 0.23 mm or more and 0.30 mm or less. In a case where the thickness $t_{3A}$ is less than the above-described lower limit value, it may not be possible to expect the second resin layer 3A to have the above-described retardation, and in a case where the thickness $t_{3A}$ is more than the above-described upper limit value, there is a possibility that the function cannot be improved any further. In addition, the thickness $t_{3A}$ and the thickness $t_{3B}$ may be different from each other, but are preferably the same. In a case where the thickness $t_{3A}$ and the thickness $t_{3B}$ are the same, there is an advantage that warping is less likely to occur when exposed to high temperatures.

Each of the second resin layer 3A having such a configuration and the second resin layer 3B having a configuration in which the particles 31 are omitted from the second resin layer 3A is disposed such that a slow axis of the layer is in the same direction as an absorption axis of the first resin layer 2. That is, the second resin layer 3A (second resin layer 3B) is disposed with respect to the first resin layer 2 such that a direction in which the polycarbonate resin (polymer) is aligned along one direction in the second resin layer 3A (second resin layer 3B) is the same as a direction in which the polyvinyl alcohol resin is aligned in one direction in the first resin layer 2.

The "slow axis" is an orientation in which light passing through the second resin layer 3A or the second resin layer 3B travels slower (phase is delayed), and conversely, an orientation in which the light travels faster (the phase advances) is called as "fast axis" of the retarder. A deviation between the slow axis and the absorption axis is allowed within ±5 degrees.

In used aspect in which the light-transmitting resin sheet 10 is used for the eyeglasses 100, as shown in FIG. 7, in a case where external light emitted from the outside of the eyeglasses 100, that is, sunlight (natural light) OL passes through the light-transmitting resin sheet 10, light in a predetermined polarization direction is absorbed by the light-transmitting resin sheet 10, and the remaining light OL' reaches the eyes of the wearer. As a result, the sunlight OL is prevented from entering the eyes of the wearer, so that it is possible to improve visibility of the scenery visibility recognized by the wearer and to reduce damage to the eyes of the wearer. Therefore, the light-transmitting resin sheet 10 functions as a polarizing plate in the eyeglasses 100.

In addition, as described above, each of the second resin layer 3A and the second resin layer 3B is provided on both surface sides of the first resin layer 2. This configuration contributes to increasing the effect of absorbing the sunlight OL compared to a case where the second resin layer 3A or the second resin layer 3B is provided on one side of the first resin layer 2.

A refractive index of the second resin layer 3A and the second resin layer 3B is not particularly limited, and for example, it is preferably in a range of 1.58 or more and 1.60 or less, and more preferably in a range of 1.585 or more and 1.595 or less.

Various additives may be added to the second resin layer 3A and the second resin layer 3B. The additive is not particularly limited, examples thereof include a colorant such as a pigment and a dye, a plasticizer, an antioxidant, an antistatic agent, and a retardant, and one or two or more kinds thereof can be used in combination.

In addition, as shown in FIG. 7, the second resin layer 3A contains dispersed particles 31 made of a metal oxide. The particles 31 having such a configuration function as an infrared ray (IR) cutting material capable of absorbing infrared rays in the sunlight OL. As a result, for example, it is possible to suppress infrared rays from penetrating into the eyes of the wearer under the scorching sun, so that damage to the eyes of the wearer due to the infrared rays can be accurately suppressed or prevented.

In a case where the absorption of infrared rays by the particles 31 (the second resin layer 3A) is not required, the addition of the particles 31 to the second resin layer 3B may be omitted.

In addition, in the present embodiment, the first resin layer 2 and the second resin layer 3A are bonded through the bonding layer 4A, and the first resin layer 2 and the second resin layer 3B are bonded through the bonding layer 4B.

The bonding layer 4A and the bonding layer 4B are various adhesives or pressure sensitive adhesives such as urethane adhesives, epoxy adhesives, acrylic adhesives, and acrylic pressure sensitive adhesives. As a resin, the layers can be reliably bonded together, and the light-transmitting resin sheet 10 can withstand long-term use.

A thickness $t_{4A}$ of the bonding layer 4A and a thickness $t_{4B}$ of the bonding layer 4B are not particularly limited, but for example, they are preferably in a range of 0.005 mm or more and 0.02 mm or less, and more preferably in a range of 0.006 mm or more and 0.015 mm or less. In a case where the thickness $t_{4A}$ and the thickness $t_{4B}$ are less than the above-described lower limit value, the adhesive force may be lowered, and in a case where the thickness $t_{4A}$ and the thickness $t_{4B}$ are more than the above-described upper limit value, no further improvement in adhesive force can be expected. In addition, the thickness $t_{4A}$ and the thickness $t_{4B}$ may be different from each other, but are preferably the same.

A refractive index of the bonding layer 4A or the bonding layer 4B is not particularly limited, and for example, it is preferably in a range of 1.46 or more and 1.55 or less, and more preferably in a range of 1.461 or more and 1.545 or less.

Furthermore, the hardcoat layer 5A is provided on the second resin layer 3A. As a result, the second resin layer 3A which is relatively easily damaged can be protected. The hardcoat layer 5A is made of an ultraviolet curable resin, and is obtained by applying a varnish-like material to be the hardcoat layer 5A onto the second resin layer 3A, and curing the applied material by irradiating it with ultraviolet rays.

Similarly, the hardcoat layer 5B is also provided on the second resin layer 3B. As a result, the second resin layer 3B which is relatively easily damaged can be protected. The hardcoat layer 5B is also made of an ultraviolet curable resin, and is obtained by applying a varnish-like material to be the hardcoat layer 5B onto the second resin layer 3B, and curing the applied material by irradiating it with ultraviolet rays. The hardcoat layer 5B may be omitted from the light-transmitting resin sheet 10.

Examples of the ultraviolet curable resin constituting the hardcoat layer 5A and the hardcoat layer 5B include ultraviolet curable resins containing an acrylic compound as a main component, ultraviolet curable resin containing an urethane acrylate oligomer or a polyester urethane acrylate oligomer as a main component, and ultraviolet curable resins containing, as a main component, at least one selected from the group consisting of epoxy-based resins and vinylphenol-based resins. Among these, an ultraviolet curable resin containing an acrylic compound as a main component is preferable. As a result, adhesion between each of the resin layers can be improved.

A thickness $t_{5A}$ of the hardcoat layer 5A and a thickness $t_{5B}$ of the hardcoat layer 5B are not particularly limited, but for example, they are preferably in a range of 0.002 mm or more and 0.020 mm or less, and more preferably in a range of 0.003 mm or more and 0.015 mm or less. In addition, the thickness $t_{5A}$ and the thickness $t_{5B}$ may be different from each other, but are preferably the same.

A refractive index of the hardcoat layer 5A or the hardcoat layer 5B is not particularly limited, and for example, it is preferably in a range of 1.40 or more and 1.60 or less, and more preferably in a range of 1.450 or more and 1.595 or less.

A total thickness $t_1$ of the light-transmitting resin sheet 10 having the above configuration is, for example, preferably in a range of 0.4 mm or more and 1.0 mm or less, and more preferably in a range of 0.4 mm or more and 0.8 mm or less. As a result, the light-transmitting resin sheet 10 can be made as thin as possible, and can be made rigid enough to withstand normal use of the eyeglasses 100.

In addition, the light-transmitting resin sheet 10 has a rectangular shape in a plan view, and a length thereof is preferably in a range of 50 mm or more and 200 mm or less and more preferably in a range of 60 mm or more and 190 mm or less, and a width thereof is preferably in a range of 100 mm or more and 400 mm or less and more preferably in a range of 130 mm or more and 380 mm or less.

In the light-transmitting resin sheet 10 composed of the laminated plate in which each of the layers is laminated as described above, at least one of the first resin layer 2, the second resin layer 3A, and the second resin layer 3B contains a colorant or the like, so that the light-transmitting resin sheet 10 can be colored to such an extent that the wearer or the like can visually recognize the light-transmitting resin sheet 10. That is, the light-transmitting resin sheet 10 is selected from being colored or uncolored depending the application of the eyeglasses 100 including the light-transmitting resin sheet 10.

Now, in the light-transmitting resin sheet 10 having such a configuration, as described above, each of the first resin layer 2, the second resin layer 3A, and the second resin layer 3B is formed by being stretched in one direction. Therefore, the polyvinyl alcohol resin and the polycarbonate resin (polymer) are aligned along one stretched direction (stretching direction) in these layers, respectively. Each layer is disposed such that the slow axis of the first resin layer 2 and the absorption axis of the second resin layer 3A and the second resin layer 3B, which are formed due to the alignment of the polymer along the stretching direction, are arranged in the same direction. Accordingly, it is required that the light-transmitting resin sheet 10 is attached to the lens 30 of the eyeglasses 100 without fail in the vertical and horizontal directions.

Furthermore, for example, in the second resin layers 3A and 3B, the polycarbonate resin in the layers is aligned along the stretching direction while maintaining orientation in the thickness direction, and the retardation in thickness direction (Rth) is set according to a degree of the orientation in the thickness direction. In addition, in the present embodiment, the second resin layer 3A is configured to contain the particles 31 and the second resin layer 3B is configured not to contain the particles 31. For this reason, it is required that the light-transmitting resin sheet 10 is attached to the lens 30 without fail even in the upper and lower (front and back) directions in order to keep the visual quality of the eyeglasses 100 constant. Even in a case where the second resin layer 3A is configured not to contain the particles 31, from the viewpoint of keeping the visual quality of the eyeglasses 100 constant due to the retardation in thickness direction (Rth), it is required to prevent failure attachment in the upper and lower directions.

Therefore, before the light-transmitting resin sheet 10 is cut according to the shape of the lens 30 included in the eyeglasses 100, that is, during storage and transportation of the light-transmitting resin sheet 10, the light-transmitting resin sheet 10 is configured as a long sheet with a long shape so that the vertical and horizontal directions can be distinguished, and further, each of a protective film 150A and a protective film 150B, which can be peeled off, is laminated on an upper surface 51 (front surface) and a lower surface 52 (back surface) of the light-transmitting resin sheet 10 (long sheet) so that the upper and lower (front and back) directions can be distinguished (see FIG. 8). That is, before being cut, the light-transmitting resin sheet 10 (light-transmitting resin sheet) is stored and/or transported as a resin sheet laminate 200 in which the protective films 150A and 150B are formed (laminated), and after cutting, the protective films 150A and 150B are peeled off from the resin sheet laminate 200 to be the light-transmitting resin sheet 10.

Here, each of the protective film 150A and the protective film 150B is laminated on each of the upper surface 51 (front surface) and the lower surface 52 (back surface) of the light-transmitting resin sheet 10, and as a method for distinguishing the upper and lower directions of the light-transmitting resin sheet 10, for example, a method in which the protective film 150A and the protective film 150B have different reflectances is conceivable. However, in such a method, it is necessary to distinguish the upper and lower directions by reflecting light on each of the protective film 150A and the protective film 150B laminated on the upper surface and the lower surface, and it takes some time to distinguish the upper and lower directions.

Furthermore, as the method for distinguishing the upper and lower directions, a method of applying different markings such as top (back) and bottom (front) to the protective film 150A and the protective film 150B respectively is conceivable. However, in such a method, depending on the size of the light-transmitting resin sheet 10 (resin sheet laminate 200) to be cut, it is necessary to change the marking position, which requires time and effort. In addition, after laminating the protective film 150A and the protective film 150B on the upper surface 51 and the lower surface 52, respectively, in a case where the markings are applied to the protective films 150A and 150B, marking traces are transferred to the upper surface 51 and the lower surface 52, which is a problem.

On the other hand, in the present invention, as another method for distinguishing the upper and lower directions, a method of a resin sheet laminate 200 in which the protective film 150A (one protective film) has light-shielding property and at least one of the protective film 150B (the other protective film) and the light-transmitting resin sheet 10 (light-transmitting resin sheet) is colored is used.

That is, a method in which the resin sheet laminate 200 (protective film set according to the embodiment of the present invention) includes the light-transmitting resin sheet 10, and the protective film 150A and the protective film 150B which are peelably laminated on both surfaces (upper surface 51 and lower surface 52) of the light-transmitting resin sheet 10, in which, among the protective films 150A and 150B on the both surfaces, the protective film 150A (one protective film) has light-shielding property, and the protective film 150B (the other protective film) has light-transmitting properties and is colored in a case of being laminated on an uncolored light-transmitting resin sheet 10 is used. In a case where the light-transmitting resin sheet 10 is colored, the protective film 150B may or may not be colored.

By adopting such a method, in a case where the resin sheet laminate 200 is viewed from the protective film 150A side, reflected light reflected by light-shielding property of the protective film 150A can be visually recognized. In addition, in a case of being viewed from the protective film 150B side, transmitted light transmitted from the protective film 150A side can be visually recognized in a color obtained by coloring at least one of the light-transmitting resin sheet 10 and the protective film 150B. That is, in a case where the resin sheet laminate 200 is viewed from the protective film 150A side, it can be visually recognized in a different color tone as compared with the case of being viewed from the protective film 150B side. Therefore, based on this difference in color tone, the protective film 150A side and the protective film 150B side of the resin sheet laminate 200 can be reliably distinguished from each other. Accordingly, it is possible to more easily distinguish between the upper and lower sides of the resin sheet laminate 200 (light-transmitting resin sheet 10) as compared with the case where the upper and lower sides are distinguished by reflecting light on the protective film 150A and on the protective film 150B. In addition, according to such a method, since it is not necessary to mark the protective films 150A and 150B, it does not take much time and effort to form the mark, and the marking traces are not transferred to the upper surface 51 and the lower surface 52.

Among the protective films 150A and 150B, the protective film 150A (one protective film) has light-shielding property as described above.

As a result, on the protective film 150A side of the resin sheet laminate 200, reflected light can be reflected due to the light-shielding property of the protective film 150A while shielding transmitted light transmitted from the protective film 150B side to the protective film 150A side. Therefore, in a case where the resin sheet laminate 200 is viewed from the protective film 150A side, it is possible to accurately suppress or prevent mixing of the transmitted light transmitted from the protective film 150B side to the protective film 150A side, and the reflected light reflected by the light-shielding property of the protective film 150A can be visually recognized.

The light-shielding property of the protective film 150A is preferably imparted by containing a light-shielding material in the protective film 150A. In this way, by containing a light-shielding material in the protective film 150A, it is possible to reliably exhibit the above-described function of the protective film 150A having light-shielding property.

In addition, a total light transmittance of the protective film 150A is preferably 80% or less and more preferably 70% or less. Since the protective film 150A exhibits such light-shielding property, it is possible to more reliably exhibit the above-described function of the protective film 150A having light-shielding property. In addition, from the viewpoint of confirming the presence or absence of defects in the resin sheet laminate 200 when inspecting the resin sheet laminate 200, the total light transmittance of the protective film 150A is preferably 20% or more and more preferably 35% or more. As a result, surface properties of the resin sheet laminate 200 can be confirmed through the protective film 150A. Therefore, the presence or absence of defects in the resin sheet laminate 200 can be reliably confirmed through the protective film 150A.

In addition, it is preferable that the protective film 150A contains a white light-shielding material as the light-shielding material. The white light-shielding material is a material with high visible light reflectance. Therefore, since light incident from the protective film 150A side can be reflected with a high reflectance, the reflected light of this light can be visually recognized on the protective film 150A side. Accordingly, even in a case where the transmitted light on the protective film 150B side passes through the protective film 150A, it is possible to accurately suppress or prevent the transmitted light from being viewed on the protective film 150A side. That is, white reflected light can be visually recognized on the protective film 150A side.

Examples of the white light-shielding material include white pigments such as aluminum oxide, titanium oxide, calcium oxide, zinc white, lead white, zinc sulfide, antimony white, lithopone (a mixture of barium sulfate and zinc sulfide), calcium carbonate, talc, and mica, and these may be used alone or in a combination of two or more kinds thereof. Among these, titanium oxide, aluminum oxide, calcium oxide, zinc white, lead white, zinc sulfide, antimony white, or lithopone is preferable, and titanium oxide is more preferable. These materials have a higher visible light reflectance, and particularly, titanium oxide is preferably selected as the white light-shielding material because it is excellent in light-shielding property and chemical resistance.

Although the titanium oxide is not particularly limited, a rutile types is preferable among three crystal types of anatase type, brookite type, and rutile type. The rutile type titanium oxide is also excellent in weather resistance, and thus can be used more preferably as the white light-shielding material.

The light-shielding material is in a form of particles, and an average particle diameter thereof is set to, for example, preferably in a range of 0.1 μm or more and 0.4 μm or less, and more preferably in a range of 0.2 μm or more and 0.3 μm or less. By setting the average particle diameter of the light-shielding material to be within the above-described range, the total light transmittance of the protective film 150A can be relatively easily set within the above-described range.

In addition, a content of the light-shielding material in a resin composition for forming the protective film 150A is set to preferably in a range of 0.05% by weight or more and 30% by weight or less, and more preferably in a range of 0.10% by weight or more and 10% by weight or less. As a result, the total light transmittance of the protective film 150A can be relatively easily set within the above-described range.

Furthermore, with regard to the content of the light-shielding material, considering an average thickness of the protective film 150A, a product of the content of the light-shielding material and the average thickness of the protective film 150A {(Content of light-shielding material)×(Average thickness of protective film 150A)} [% by weight·μm] is preferably in a range of 6.0 or more and 40.0 or less, and more preferably in a range of 15.0 or more and 30.0 or less. As a result, the total light transmittance of the protective film 150A can be more easily set within the above-described range.

Among the protective films 150A and 150B, as described above, the protective film 150B (the other protective film) has light-transmitting properties, and is colored in a case of being laminated on an uncolored light-transmitting resin sheet 10. In a case where the light-transmitting resin sheet 10 is colored, the protective film 150B may or may not be colored, and hereinafter, a case where the protective film 150B is colored will be described.

Accordingly, on the protective film 150B side of the resin sheet laminate 200, reflected light reflected by the protective film 150B or the light-transmitting resin sheet 10 can be visually recognized as colored light.

The protective film 150B is colored in a different color from the light-shielding material contained in the protective film 150A. As a result, since a color tone visually recognized from the protective film 150A side and a color tone visually recognized from the protective film 150B side can be different, based on this difference in color tone, it is possible to reliably distinguish the protective film 150A side and the protective film 150B side in the resin sheet laminate 200.

It is preferable that the protective film 150B contains a colorant such as a pigment and a dye alone or in combination to be colored. Accordingly, since the protective film 150B can be colored in a desired color, the color tone visually recognized from the protective film 150B side can be different from the color tone visually recognized from the protective film 150A side.

The pigment is not particularly limited, and examples thereof include phthalocyanine-based pigments such as phthalocyanine green and phthalocyanine blue, azo-based pigments such as fast yellow, disazo yellow, condensed azo yellow, penzoimidazolone yellow, dinitroaniline orange, penzimidazolone orange, toluidine red, permanent carmine, permanent red, naphthol red, condensed azo red, benzimidazolone carmine, and benzimidazolone brown, anthraquinone-based pigments such as anthrapyrimidine yellow and anthraquinonyl red, azomethine-based pigments such as copper azomethine yellow, quinophthalone-based pigments such as quinophthalone yellow, isoindoline-based pigments such as isoindoline yellow, nitroso-based pigments such as nickel dioxime yellow, perinone-based pigments such as perinone orange, quinacridone-based pigments such as quinacridone magenta, quinacridone maroon, quinacridone scarlet, and quinacridone red, perylene red, perylene-based pigments such as perylene maroon, pyrrolopyrrole-based pigments such as diketopyrrolopyrrole red, organic pigments such as dioxazine-based pigments such as dioxazine violet, carbon-based pigments such as carbon black, lamp black, furnace black, ivory black, graphite, and fullerene, chromate-based pigments such as chrome yellow and molybdate orange, sulfide-based pigments such as cadmium yellow, cadmium lithopone yellow, cadmium orange, cadmium lithopone orange, silver vermilion, cadmium red, cadmium lithopone red, and sulfidation, oxide-based pigments such as ocher, titanium yellow, titanium barium nickel yellow, red iron, lead red, amber, brown iron oxide, zinc iron chrome brown, chromium oxide, cobalt green, cobalt chrome green, titanium cobalt green, cobalt blue, cerulean blue, cobalt aluminum chrome blue, and iron black, manganese ferrite black, cobalt ferrite black, copper chromium black, and copper chromium manganese black, hydroxide-based pigments such as viridian, ferrocyanide-based pigments such as Prussian blue, silicate-based pigments such as ultramarine blue, phosphate-based pigments such as cobalt violet and mineral violet, and inorganic pigments such as others (for example, cadmium sulfide, cadmium selenide, and the like), and the like, and one or two or more of these can be used in combination.

The dye is not particularly limited, and examples thereof include metal complex coloring agent, cyan-based coloring agent, xanthene-based coloring agent, merocyanine-based coloring agent, phthalocyanine-based coloring agent, azo-based coloring agent, hibiscus coloring agent, blackberry coloring agent, raspberry coloring agent, pomegranate juice coloring agent, chlorophyll coloring agent, porphyrin-based compounds such as tetraazoporphyrin compound, and the like, and one or two or more of these can be used in combination.

The colorant is in a form of particles, and an average particle diameter thereof is set to, for example, preferably in a range of 0.05 μm or more and 0.2 μm or less, and more preferably in a range of 0.1 μm or more and 0.15 μm or less. By setting the average particle diameter of the colorant to be within the above-described range, the protective film 150B can be reliably colored while imparting the light-transmitting properties to the protective film 150B.

In addition, a content of the colorant in a resin composition for forming the protective film 150B is set to preferably in a range of 0.01% by weight or more and 3% by weight, and more preferably in a range of 0.1% by weight or more and 1% by weight or less. As a result, the protective film 150B can be reliably colored while imparting the light-transmitting properties to the protective film 150B.

Each of the protective film 150A and the protective film 150B as described above is composed of, for example, a single layer or a laminate containing, as a main material, at least one of a (meth)acrylic resin and an olefin-based resin. The protective film 150A is made of a binder resin as the main material, and is made of a solidified product of a resin composition containing the light-shielding material, thereby imparting the light-shielding property; and the protective film 150B is made of a binder resin as the main material, and is colored by using a solidified product of a resin composition containing the colorant.

In the present specification, the (meth)acrylic resin means a polymer of (meth)acrylic acid or a derivative thereof, or a copolymer of (meth)acrylic acid or a derivative thereof and other monomers. Here, the (meth)acrylic acid or the like means acrylic acid or methacrylic acid.

Examples of the (meth)acrylic resin include polyacrylic acid esters such as polyacrylic acid, polymethacrylic acid, polymethyl acrylate, polyethyl acrylate, polybutyl acrylate, and poly-2-ethylhexyl acrylate, polymethacrylates such as polymethyl methacrylate, polyethyl methacrylate, and polybutyl methacrylate, polyacrylonitrile, polymethacrylonitrile, polyacrylamide, a butyl acrylate-ethyl acrylate-acrylonitrile copolymer, an acrylonitrile-styrene copolymer, a methyl methacrylate-styrene copolymer, a methyl methacrylate-acrylonitrile copolymer, a methyl methacrylate-α-methyl-styrene copolymer, a butyl acrylate-ethyl acrylate-acrylonitrile-2-hydroxyethyl methacrylate-methacrylic acid copolymer, a butyl acrylate-ethyl acrylate-acrylonitrile-2-hydroxyethyl methacrylate-acrylic acid copolymer, a butyl acrylate-acrylonitrile-2-hydroxyethyl methacrylate copolymer, a butyl acrylate-acrylonitrile-acrylic acid copolymer, and an ethyl acrylate-acrylonitrile-N,N-dimethylacrylamide copolymer.

In addition, examples of the olefin-based resin include homopolymers of α-olefin and copolymers of α-olefin with other copolymerizable monomers, such as polyethylene (PE), polypropylene (PP), polybutene, 1,2-polybutadiene, an ethylene-propylene copolymer, an ethylene-butene copolymer, an ethylene-4-methyl-1-pentene copolymer, an ethylene-vinyl acetate copolymer (EVA), and an ethylene-maleic acid anhydride copolymer.

The above-described copolymer may be either a block copolymer or a random copolymer.

In addition, an average thickness of the protective films 150A and 150B is preferably in a range of 20 μm or more and 100 μm or less, and more preferably in a range of 30 μm or more 80 μm or less. In this manner, the above-described functions as the protective films 150A and 150B can be reliably exhibited.

Each of the resin compositions for forming the protective films 150A and 150B may contain additives such as an inorganic filler, an organic filler, a coupling agent, and a leveling agent as necessary.

In addition, each of the protective film 150A and the protective film 150B includes a pressure sensitive adhesive layer as an outermost layer on a side to be attached to the light-transmitting resin sheet 10, and further, a protective layer (back layer) may be provided as an outermost layer on a surface opposite to the side attached to the light-transmitting resin sheet 10, or an intermediate layer may be provided inside these outermost layer.

In a case where the above-described additive is contained in one layer or two or more layers among the pressure sensitive adhesive layer, the protective layer (back layer), and the intermediate layer described above, a content thereof can be 10% by weight or less or 8% by weight or less, and can be 0.001% by weight or more or 0.1% by weight or more.

In particular, in a case of including a protective layer (back layer), the protective layer contains the antiblocking agent in which a content thereof is set to preferably 0.5% by weight or more and 10% by weight or less and more preferably 1% by weight or more and 9% by weight or less. As a result, the function obtained by providing the protective layer as the back layer can be exhibited more remarkably.

In addition, as the antiblocking agent, for example, inorganic particles, organic particles, or the like can be used, and these may be used alone or in a combination of two or more kinds thereof. The inorganic particles are not particularly limited, and examples thereof include particles such as silica, zeolites, smectites, mica, vermiculite, and talc; and the organic particles are not particularly limited, and examples thereof particles of acrylic resins, polyolefin-based resins, polyester-based resins, polyurethane-based resins, polystyrene-based resins, silicone-based resins, and fluorine-based resins.

Furthermore, in the present embodiment, the case where the protective film 150A is attached on the second resin layer 3A side of the light-transmitting resin sheet 10 and the protective film 150B is attached on the second resin layer 3B side of the light-transmitting resin sheet 10 has been described, but the present invention is not limited to this case. The protective film 150A may be attached on the second resin layer 3B side of the light-transmitting resin sheet 10, and the protective film 150B may be attached on the second resin layer 3A side of the light-transmitting resin sheet 10.

Furthermore, the light-transmitting resin sheet 10 to which the protective film 150A and the protective film 150B are attached is not limited to the configuration exemplified in the present embodiment, and it may be of any configuration as long as it is required to be identifiable in the upper and lower (front and back) directions. For example, a stretched resin layer and an unstretched resin layer may be laminated on the upper and lower surfaces of the first resin layer 2 as a polarizer, respectively.

Hereinbefore, the protective film, the resin substrate, the laminate of a protective film and a resin substrate, the resin sheet laminate, and the protective film set according to the embodiment of the present invention have been described, but the present invention is not limited thereto. Each layer constituting the protective film, the resin substrate, the laminate of a protective film and a resin substrate, the resin sheet laminate, and the protective film set can be replaced with any configuration which can perform the same function.

In addition, in the above-described first embodiment, in a case where the resin substrate is punched out to have a circular shape in a plan view, that is, in a case where the resin substrate 21 is viewed in a plan view, the case where the punching is performed so that all sides forming the edge form a curved convex curve has been described, but the present invention is not limited thereto. One side (a part) of the above-described sides forming the edge may be punched out so as to form a curved convex curve.

In addition, in the above-described second embodiment, in FIGS. 3A to 3C, the case where the protective film is re-attached to the resin substrate after a part of the protective film is peeled off from the resin substrate has been described, but the present invention is not limited thereto. The re-attachment of the protective film can also be carried out after the entire protective film has been peeled off from the resin substrate.

Furthermore, in the above-described first to fourth embodiments, the case where the protective film according to the present invention is used by being attached to the resin substrate at the time of performing heat bending of the resin substrate of a lens for sunglasses has been described. However, the protective film according to the present invention can be applied to the heat bending of the resin substrate in a lens for sunglasses, and can also be used for heat bending of the resin substrate in a lens of goggles, a visor of helmets, and the like.

Furthermore, in the above-described fifth embodiment, the case where the above-described light-transmitting resin sheet in which the protective film set according to the embodiment of the present invention is laminated on the light-transmitting resin sheet (the resin sheet laminate according to the embodiment of the present invention) is used by being attached to a lens of eyeglasses, but the above-described light-transmitting resin sheet is not limited to such a case. For example, the above-described light-transmitting resin sheet can also be used as an emission window provided in head-up display devices, or a display portion included in smartphones, PC displays, car navigation systems, center information displays, and the like.

EXAMPLES

Hereinafter, the present invention will be described in detail based on examples. The present invention is not limited to these examples.

1. Preparation of Raw Materials

First, raw materials used for production of the protective film of each of Examples and Comparative Examples are as follows.

<<Thermoplastic Resin Having No Adhesiveness>>

<Polyolefin-Based Resin Having Melting Point of 150° C. Or Higher>

Homo polypropylene having melting point of 167° C. (h-PP, manufactured by Japan Polypropylene Corporation, "NOVATEC EA9FTD", MFR=0.4 g/10 min)

Homo polypropylene having melting point of 158° C. (h-PP, manufactured by Sumitomo Chemical Co., Ltd., "NOBLEN FS2011DG2", MFR=2.5 g/10 min)

<Polyolefin-Based Resin Having Melting Point of 120° C. Or Higher and Lower than 150° C.>

Linear low-density polyethylene having melting point of 121° C. (LLDPE, manufactured by Ube-Maruzen Polyethylene Co., Ltd., "UMERIT 2525F", MFR=2.5 g/10 min)

Linear low-density polyethylene having melting point of 121° C. (LLDPE, manufactured by Prime Polymer Co., Ltd., "NEO-ZEX 2015M", MFR=1.2 g/10 min)

High-density polyethylene having melting point of 132° C. (HDPE, manufactured by Prime Polymer Co., Ltd., "HI-ZEX 3300F", MFR=1.1 g/10 min)

<Polyolefin-Based Resin Having Melting Point of Lower than 120° C.>

Linear low-density polyethylene having melting point of 114° C. (LLDPE, manufactured by Ube-Maruzen Polyethylene Co., Ltd., "UMERIT 1520F", MFR=2.0 g/10 min)

Linear low-density polyethylene having melting points of 114° C. and 99° C. (LLDPE, manufactured by Ube-Maruzen Polyethylene Co., Ltd., "UMERIT 165HK", MFR=2.0 g/10 min)

<Polyolefin-Based Resin Having Melting Point of Lower than 110° C.>

Linear low-density polyethylene having melting point of 93° C. (LLDPE, manufactured by TOSOH CORPORATION, "NIPOLON-Z HF212R", MFR=2.0 g/10 min)

Linear low-density polyethylene having melting point of 106° C. (LLDPE, manufactured by TOSOH CORPORATION, "NIPOLON-Z HF211R", MFR=2.0 g/10 min)

<<Thermoplastic Resin Having Adhesiveness>>

<Elastomer>

Styrene-ethylene-butylene-styrene block copolymer (SEBS, manufactured by Asahi Kasei Corporation, "TUFTEC H1221")

Hydrogenated styrene-butadiene random copolymer (HSBR, manufactured by JSR Corporation, "DYNARON 1320P")

Styrene-ethylene-propylene-styrene block copolymer (SEPS, manufactured by KURARAY CO., LTD., "HYBRAR 7125")

α-Polyolefin-based resin/polyethylene copolymer elastomer having melting point of 66° C. (Elastomer A, manufactured by Mitsui Chemicals, Inc., "TAFMER A-1085S")

α-Polyolefin-based resin/polyethylene copolymer elastomer having melting point of 77° C. (Elastomer B, manufactured by Mitsui Chemicals, Inc., "TAFMER A-4090S")

α-Polyolefin-based resin/polypropylene copolymer elastomer having melting point of 83° C. (Elastomer C, manufactured by Mitsui Chemicals, Inc., "TAFMER XM-7080")

α-Polyolefin-based resin/polypropylene copolymer elastomer having melting point of 98° C. (Elastomer D, manufactured by Mitsui Chemicals, Inc., "TAFMER XM-7090")

α-Polyolefin-based resin/polybutene copolymer elastomer having melting point of 110° C. (Elastomer E, manufactured by Mitsui Chemicals, Inc., "TAFMER BL-311M")

α-Polyolefin-based resin/polypropylene copolymer elastomer having melting point of 140° C. (Elastomer F, manufactured by Mitsui Chemicals, Inc., "TAFMER PN-2070")

<Polyolefin-Based Resin>

Ethylene-methyl acrylate copolymer having melting point of 90° C. (EMA, manufactured by Japan Polyethylene Corporation, "REXPEARL EB330H")

Block polypropylene having melting point of 165° C. (propylene-ethylene block copolymer) (b-PP, manufactured by Sumitomo Chemical Co., Ltd., "NOBLEN KS23F8", MFR=2.1 g/10 min)

Ethylene-methacrylic acid copolymer having melting point of 106° C. (EMAA, manufactured by DOW-MITSUI POLYCHEMICALS, "NUCREL AN4214C")

<Polyolefin-Based Resin Having Melting Point of 120° C. Or Higher and Lower than 150° C.>

Random polypropylene copolymer having melting point of 131° C. (r-PP, manufactured by Sumitomo Chemical Co., Ltd., "NOBLEN S131", MFR=1.3 g/10 min)

<Crystal Nucleating Agent>

Sorbitol-based crystal nucleating agent (IRGACLEAR, manufactured by BASF, "XT 386")

<Antiblocking Agent>

Antiblocking agent (KINOPLUS FPP-AB05A, manufactured by SUMIKA COLOR CO., LTD.)

2. Production of Protective Film

Example 1A

[1] First, in a case of formation of a pressure sensitive adhesive layer (innermost layer), LLDPE having a melting point of 121° C., as a polyolefin-based resin, and SEBS as an elastomer were kneaded such that the content of the SEBS was set to 10% by weight, thereby preparing a pressure sensitive adhesive layer forming material (resin composition).

[2] Next, in a case of formation of a second layer (intermediate layer) including a base material layer, SEBS as a thermoplastic resin having adhesiveness and h-PP having a melting point of 167° C., as a thermoplastic resin having no adhesiveness, were kneaded such that the content of the SEBS was set to 20% by weight, thereby preparing a second layer forming material (resin composition).

[3] Next, the prepared pressure sensitive adhesive layer forming material, the prepared second layer forming material, and h-PP having a melting point of 167° C., as a polyolefin-based resin for forming a first layer (outermost layer) and having a melting point of 150° C. or higher, were respectively stored in three extruders.

[4] Next, after obtaining a laminate in a molten state, which was obtained by extruding each material in a molten state from the three extruders from a co-extrusion T-die, and then laminating these materials in layers, this laminate was cooled with a cooling roll at 40° C. with a line speed of 40 m/min (cooling condition A), thereby obtaining a protective film of Example 1, in which average thicknesses of the first layer, the second layer, and the pressure sensitive adhesive layer were each 10 μm, 30 μm, and 10 μm.

In a case where a trouser elongation strain A at break in a direction inclined at 45° to both MD and TD of the protective film was measured in accordance with JIS K 7128-1 (1998) by preparing, as a test piece, a protective film having a length of 100 mm, a width of 50 mm, a thickness of 50 μm, and a cut of 50 mm, and then using a precision universal testing machine (manufactured by Shimadzu Corporation, "AG-X plus"), tearing this test piece with the MD and TD inclined at 45°, in which a distance between grips of the test piece was 50 mm and a tensile speed was 200 mm/min, the trouser elongation strain A at break was 245%.

In addition, in the protective film, in a case where, using a precision universal testing machine (manufactured by Shimadzu Corporation, "AG-X plus"), a trouser elongation strain B at break in the directions inclined at 45° to both MD and TD of the protective film was measured in accordance with JIS K 7128-1 (1998) after heating the protective film at 145° C. for 30 minutes and cooling the heated protective film at 25° C. for 30 minutes, the trouser elongation strain B at break was 132%.

Furthermore, in a case where, using an autograph manufactured by Shimadzu Corporation (precision universal testing machine, "AG-X plus"), a nominal tensile strain at break of the protective film at 25° C. was measured in accordance with JIS K 7127 using a test piece (No. 1 dumbbell) obtained from the protective film, in which the MD direction of the protective film was a longitudinal direction of the dumbbell, under an atmosphere of 23° C. and 60% RH and a tensile speed of 500 mm/min, the nominal tensile strain at break was 630%.

In addition, a degree [%] of crystallinity of the protective film was measured with a wide-angle X-ray diffractometer (manufactured by Rigaku Corporation, "Ultima IV") using a CuKα ray as a radiation source and a focusing method as an optical system, in which a beam width was set to 10 mm. A scanning speed was set to 0.5 degree/min for 2θ=5 to 35 degrees, a sample rotation was set to 60 rpm, and a crystal peak area ratio to the total area was calculated.

$$\text{Degree of crystallinity [\%]}=(\Sigma \text{ crystal peak area})\div(\text{total area})\times 100$$

Examples 2A to 12A and Comparative Example 1A

Protective films of Examples 2A to 12A and Comparative Example 1A were obtained in the same manner as in Example 1A described above, except that at least one of the type of the polyolefin-based resin, the presence or absence of the elastomer, and the presence or absence of the crystal nucleating agent, which were used in the above-described step [1], the type of the thermoplastic resin having adhesiveness, the presence or absence of the thermoplastic resin having no adhesiveness, the presence or absence of the crystal nucleating agent, and the presence or absence of the antiblocking agent, which were used in the above-described step [2], and the cooling conditions of the laminate for the above-described step [4] was changed as shown in Tables 1-1, 1-2 and 1-3, respectively.

Cooling conditions A to E for cooling the laminate in the above-described step [4], which is listed in Tables 1-1, 1-2 and 1-3, were conditions shown below.

<Cooling Conditions>

A: cooling the laminate with a cooling roll at 40° C. with a line speed of 40 m/min B: cooling the laminate with a cooling roll at 40° C. with a line speed of 20 m/min C: after cooling under the cooling condition B, heating the laminate at 100° C. for 30 minutes, and then cooling the laminate in the atmosphere D: after cooling under the cooling condition B, heating the laminate at 120° C. for 30 minutes, and then cooling the laminate in the atmosphere E: cooling the laminate with a cooling roll at 40° C. with a line speed of 80 m/min 3. Evaluation The protective film of each of Examples and Comparative Examples was evaluated according to the following method.

<1> Evaluation of Presence or Absence of Whiskers Attached on Resin Substrate

First, resin substrates (manufactured by Sumitomo Bakelite Co., Ltd.) formed by holding a polarizer with two polycarbonate substrates (polycarbonate layers) were respectively prepared for the protective film of each of Examples and Comparative Examples. Both surfaces of the resin substrate were pressure-bonded under a condition of a load of 0.5 kg/cm$^2$ using a roll so that the protective films were attached thereto, thereby obtaining a laminate.

Next, after storing the laminate under conditions of a temperature of 50° C. and a time of 12 hr, the laminate, that is, the resin substrate having the protective film attached on both surfaces was punched in a thickness direction, thereby forming the laminate into a circular shape in a plan view.

Next, after peeling off the two protective films from the laminate, and the presence or absence of whiskers (pressure sensitive adhesive layer) remained on the punched surface (cut surface) of the resin substrate 21 was visually observed, and a case where no residual whiskers was observed was evaluated as A, a case where residual whiskers were slightly observed was evaluated as B, a case where residual whiskers were definitely observed was evaluated as C, and a case where residual whiskers were more clearly observed was evaluated as D.

<2> Evaluation of Presence or Absence of Orange Peel Formed on Surface of Resin Substrate First, resin substrates (manufactured by Sumitomo Bakelite Co., Ltd.) formed by holding a polarizer with two polycarbonate substrates (polycarbonate layers) were respectively prepared for the protective film of each of Examples and Comparative Examples. Both surfaces of the resin substrate were pressure-bonded under a condition of a load of 0.5 kg/cm$^2$ using a roll so that the protective films were attached thereto, thereby obtaining a laminate.

Next, after storing the laminate under conditions of a temperature of 50° C. and a time of 12 hr, the laminate, that is, the resin substrate having the protective film attached on both surfaces was punched in a thickness direction, thereby forming the laminate into a circular shape in a plan view.

Next, using a REMA molding machine with a mold (manufactured by REMA, "CR-32 type"), the laminate which had been formed into a circular shape was subjected to heat bending while being heated.

Next, after peeling off the two protective films from the laminate, the presence or absence of formation of orange peel (unevenness) on the attached surface (peeled surface) of the resin substrate 21 was visually observed, and a case where the formation of orange peel was not observed was evaluated as A, a case where the formation of orange peel was slightly observed was evaluated as B, a case where the formation of orange peel was definitely observed was evaluated as C, and a case where the formation of orange peel was more clearly observed was evaluated as D.

The evaluation results of the protective film of each of Examples and Comparative Examples, which had been obtained in the above-described manner, are listed in Table 0.1.

The evaluation results of the protective film of each of Examples and Comparative Examples, which had been obtained in the above-described manner, are listed in Tables 1-1, 1-2 and 1-3.

TABLE 1-1

| | | | Example | | | |
|---|---|---|---|---|---|---|
| | | | 1A | 2A | 3A | 4A |
| Base material layer | First layer (outermost layer) | Polyolefin having melting point of 150 °C or higher | h-PP | h-PP | h-PP | h-PP |
| | | Melting point of polyolefin [°C] | 167 | 167 | 167 | 167 |
| | | Antiblocking agent (KINOPLUS FPP-AB05A) | | | | |
| | | Component ratio of polyolefin:antiblocking agent [% by weight] | 100:0 | 100:0 | 100:0 | 100:0 |
| | | Average thickness [μm] | 10 | 10 | 10 | 10 |
| | Second layer (intermediate layer) | Adhesive resin A | SEBS | SEBS | SEBS | SEBS |
| | | Non-adhesive resin B | h-PP | h-PP | h-PP | h-PP |
| | | Melting point of non-adhesive main resin [°C] | 167 | 167 | 167 | 167 |
| | | Crystal nucleating agent E | | | | |
| | | Component ratio of A:B or A:E [% by weight] | 20:80 | 20:80 | 20:80 | 20:80 |
| | | Average thickness [μm] | 30 | 30 | 30 | 30 |
| Pressure sensitive adhesive layer (innermost layer) | | Polyolefin C | LLDPE | LLDPE | LLDPE | LLDPE |
| | | Melting point of polyolefin [°C] | 121 | 121 | 121 | 121 |
| | | Elastomer D | SEBS | SEBS | SEBS | SEBS |
| | | Component ratio of C:D [% by mass] | 90:10 | 90:10 | 90:10 | 90:10 |
| | | Average thickness [μm] | 10 | 10 | 10 | 10 |
| Cooling condition during molding protective film by extrusion molding | | | A | B | C | D |
| Evaluation | Trouser elongation strain A at break of protective film [%] | | 245 | 217 | 160 | 138 |
| | Trouser elongation strain B at break of protective film after heating [%] | | 132 | 126 | 119 | 116 |
| | Nominal tensile strain at break of protective film [%] | | 630 | 577 | 520 | 432 |
| | Degree of crystallinity of protective film [%] | | 14 | 21 | 42 | 67 |
| | Presence or absence of whiskers on punched surface | | B | A | A | A |
| | Presence or absence of orange peel formation on peeled surface | | A | A | A | B |

TABLE 1-2

| | | | Example | | | |
|---|---|---|---|---|---|---|
| | | | 5A | 6A | 7A | 8A |
| Base material layer | First layer (outermost layer) | Polyolefin having melting point of 150 °C or higher | h-PP | h-PP | h-PP | h-PP |
| | | Melting point of polyolefin [°C] | 167 | 167 | 167 | 167 |
| | | Antiblocking agent (KINOPLUS FPP-AB05A) | | | | |
| | | Component ratio of polyolefin:antiblocking agent [% by weight] | 100:0 | 100:0 | 100:0 | 100:0 |
| | | Average thickness [μm] | 10 | 10 | 10 | 10 |
| | Second layer (intermediate layer) | Adhesive resin A | b-PP | b-PP | b-PP | b-PP |
| | | Non-adhesive resin B | | | | |
| | | Melting point of non-adhesive main resin [°C] | 165 | 165 | 165 | 165 |
| | | Crystal nucleating agent E | | | | |

TABLE 1-2-continued

| | | | Example | | | |
|---|---|---|---|---|---|---|
| | | | 5A | 6A | 7A | 8A |
| | | Component ratio of A:B or A:E [% by weight] | 100:0 | 100:0 | 100:0 | 100:0 |
| | | Average thickness [µm] | 30 | 30 | 30 | 30 |
| Pressure sensitive adhesive layer(innermost layer) | | Polyolefin C | LLDPE | LLDPE | LLDPE | LLDPE |
| | | Melting point of polyolefin [°C] | 114 | 114 | 114 | 114 |
| | | Elastomer D | | | | |
| | | Component ratio of C:D [% by mass] | 100:0 | 100:0 | 100:0 | 100:0 |
| | | Average thickness [µm] | 10 | 10 | 10 | 10 |
| Cooling condition during molding protective film by extrusion molding | | | A | B | C | D |
| Evaluation | Trouser elongation strain A at break of protective film [%] | | 222 | 180 | 146 | 133 |
| | Trouser elongation strain B at break of protective film after heating [%] | | 132 | 129 | 129 | 127 |
| | Nominal tensile strain at break of protective film [%] | | 640 | 590 | 520 | 442 |
| | Degree of crystallinity of protective film [%] | | 15 | 24 | 50 | 72 |
| | Presence or absence of whiskers on punched surface | | B | A | A | A |
| | Presence or absence of orange peel formation on peeled surface | | A | A | A | B |

*: for Examples 5A to 11A, the addition of the non-adhesive resin is omitted, and the melting point of the adhesive resin is indicated.

TABLE 1-3

| | | | Example | | | | Comparative Example |
|---|---|---|---|---|---|---|---|
| | | | 9A | 10A | 11A | 12A | 1A |
| Base material layer | First layer (outermost layer) | Polyolefin having melting point of 150 °C or higher | h-PP | h-PP | h-PP | h-PP | h-PP |
| | | Melting point of polyolefin [°C] | 167 | 167 | 167 | 167 | 167 |
| | | Antiblocking agent (KINOPLUS FPP-AB05A) | | | | ○ | |
| | | Component ratio of polyolefin:antiblocking agent [% by weight] | 100:0 | 100:0 | 100:0 | 95:5 | |
| | | Average thickness [µm] | 10 | 10 | 10 | 10 | 10 |
| | Second layer (intermediate layer) | Adhesive resin A | b-PP | b-PP | b-PP | b-PP | b-PP |
| | | Non-adhesive resin B | | | | | |
| | | Melting point of non-adhesive main resin [°C] | 165 | 165 | 165 | 165 | 165 |
| | | Crystal nucleating agent E | XT386 | XT386 | XT386 | | |
| | | Component ratio of A:B or A:E [% by weight] | 99.925:0.075 | 99.985:0.015 | 99.975:0.025 | 100:0 | 100:0 |
| | | Average thickness [µm] | 30 | 30 | 30 | 30 | 30 |
| Pressure sensitive adhesive layer(innermost layer) | | Polyolefin C | LLDPE | LLDPE | LLDPE | LLDPE | LLDPE |
| | | Melting point of polyolefin [°C] | 114 | 114 | 114 | 114 | 114 |
| | | Elastomer D | | | | | SEBS |
| | | Component ratio of C:D [% by mass] | 100:0 | 100:0 | 100:0 | 100:0 | 90:10 |
| | | Average thickness [µm] | 10 | 10 | 10 | 10 | 10 |
| Cooling condition during molding protective film by extrusion molding | | | A | A | A | B | E |
| Evaluation | Trouser elongation strain A at break of protective film [%] | | 192 | 158 | 122 | 180 | 310 |
| | Trouser elongation strain B at break of protective film after heating [%] | | 125 | 123 | 116 | 129 | 131 |
| | Nominal tensile strain at break of protective film [%] | | 573 | 456 | 421 | 590 | 710 |
| | Degree of crystallinity of protective film [%] | | 24 | 48 | 63 | 24 | 9 |

TABLE 1-3-continued

| | Example | | | | Comparative Example |
|---|---|---|---|---|---|
| | 9A | 10A | 11A | 12A | 1A |
| Presence or absence of whiskers on punched surface | A | A | A | A | D |
| Presence or absence of orange peel formation on peeled surface | A | A | B | A | A |

*: for Examples 5A to 11A, the addition of the non-adhesive resin is omitted, and the melting point of the adhesive resin is indicated.

As shown in Tables 1-1, 1-2 and 1-3, the protective film in each of Examples satisfied that the trouser elongation strain A at break was 300% or less, so that it was clarified that, in a case where the resin substrate was punched in the above-described step [2], it was possible to accurately suppress or prevent the remaining of whiskers caused by the extension of the pressure sensitive adhesive layer on the cut surface of the resin substrate, which was a curved convex surface.

On the other hand, in the protective films of Comparative Example, the trouser elongation strain A at break could not be set to 300% or less, and as a result, in the punching of the resin substrate in the above-described step [2], the result that the whiskers remained on the cut surface of the resin substrate, which was a curved convex surface, was observed.

4. Production of Protective Film

Example 1B

[1] First, in a case of formation of a pressure sensitive adhesive layer (innermost layer), LLDPE having a melting point of 121° C., as a polyolefin-based resin, and SEBS as an elastomer were kneaded such that the content of the SEBS was set to 10% by weight, thereby preparing a pressure sensitive adhesive layer forming material (resin composition).

[2] Next, in a case of formation of a second layer (intermediate layer) including a base material layer, SEBS as a thermoplastic resin having adhesiveness and h-PP having a melting point of 167° C., as a thermoplastic resin having no adhesiveness, were kneaded such that the content of the SEBS was set to 20% by weight, thereby preparing a second layer forming material (resin composition).

[3] Next, the prepared pressure sensitive adhesive layer forming material, the prepared second layer forming material, and h-PP having a melting point of 167° C., as a polyolefin-based resin for forming a first layer (outermost layer) and having a melting point of 150° C. or higher, were respectively stored in three extruders.

[4] Next, after obtaining a laminate in a molten state, which was obtained by extruding each material in a molten state from the three extruders from a co-extrusion T-die, laminating these materials in layers, and then pressing a metal mirror surface roll against the pressure sensitive adhesive layer, the pressure sensitive adhesive layer was formed with a mirror surface on the surface of the pressure sensitive adhesive layer, and the laminate was cooled to obtain a protective film of Example 1B, in which average thicknesses of the first layer, the second layer, and the pressure sensitive adhesive layer were each 10 μm, 30 μm, and 10 μm.

In a case where a surface roughness Ra of the pressure sensitive adhesive layer opposite to the second layer was measured using a laser microscope (manufactured by Keyence Corporation, "VK9700") in accordance with JIS B 0601, the surface roughness was 0.05 μm.

Furthermore, in a case where, using an autograph manufactured by Shimadzu Corporation (tensile speed: 500 mm/min), a test piece (No. 1 dumbbell) obtained from the protective film was measured in accordance with JIS K 7127 under an atmosphere of 23° C. and 60% RH, it was 475 MPa.

Examples 2B and 3B

Protective films of Examples 2B and 3B were obtained in the same manner as in Example 1B described above, except that, in the above-described step [4], the molding of the pressure sensitive adhesive layer was carried out by blowing air to the surface of the pressure sensitive adhesive layer using an air chamber or an air knife.

Comparative Example 1B

A protective film of Comparative Example 1B was obtained in the same manner as in Example 1B described above, except that, in the above-described step [4], the molding of the pressure sensitive adhesive layer was carried out pressing a metal roll with no mirror surface formation against the pressure sensitive adhesive layer.

Comparative Examples 2B and 3B

Protective films of Comparative Examples 2B and 3B were obtained in the same manner as in Comparative Example 1B described above, except that the type of the polyolefin-based resin used in the above-described step [1] was changed as shown in Tables 2-1, 2-2, 2-3 and 2-4.

Example 4B

A protective film of Example 4B was obtained in the same manner as in Example 1B described above, except that the type of the polyolefin-based resin the type of the elastomer used in the above-described step [1] were each changed as shown in Tables 2-1, 2-2, 2-3 and 2-4.

Examples 5B and 6B

Protective films of Examples 5B and 6B were obtained in the same manner as in Example 4B described above, except that, in the above-described step [4], the molding of the pressure sensitive adhesive layer was carried out by blowing air to the surface of the pressure sensitive adhesive layer using an air chamber or an air knife.

Example 7B

A protective film of Example 7B was obtained in the same manner as in Example 1B described above, except that the type of the polyolefin-based resin used in the above-described step [1] was changed as shown in Tables 2-1, 2-2, 2-3 and 2-4.

Examples 8B and 9B

Protective films of Examples 8B and 9B were obtained in the same manner as in Example 7B described above, except that, in the above-described step [4], the molding of the pressure sensitive adhesive layer was carried out by blowing air to the surface of the pressure sensitive adhesive layer using an air chamber or an air knife.

Example 10B

A protective film of Example 10B was obtained in the same manner as in Example 1B described above, except that the type of the polyolefin-based resin used in the above-described step [1] was changed as shown in Tables 2-1, 2-2, 2-3 and 2-4.

Examples 11B and 12B

Protective films of Examples 11B and 12B were obtained in the same manner as in Example 10B described above, except that, in the above-described step [4], the molding of the pressure sensitive adhesive layer was carried out by blowing air to the surface of the pressure sensitive adhesive layer using an air chamber or an air knife.

Example 13B

[1] First, in a case of formation of a pressure sensitive adhesive layer (innermost layer), LLDPE having a melting point of 93° C., as a polyolefin-based resin, was prepared as a pressure sensitive adhesive layer forming material.

[2] Next, in a case of formation of a second layer (intermediate layer) including a base material layer, b-PP having a melting point of 158° C., as a thermoplastic resin having adhesiveness, was prepared.

[3] Next, the pressure sensitive adhesive layer forming material, the second layer forming material, and h-PP having a melting point of 167° C., as a polyolefin-based resin for forming a first layer (outermost layer) and having a melting point of 150° C. or higher, were respectively stored in three extruders.

[4] Next, after obtaining a laminate in a molten state, which was obtained by extruding each material in a molten state from the three extruders from a co-extrusion T-die, laminating these materials in layers, and then pressing a metal mirror surface roll against the pressure sensitive adhesive layer, the pressure sensitive adhesive layer was formed with a mirror surface on the surface of the pressure sensitive adhesive layer, and the laminate was cooled to obtain a protective film of Example 13B, in which average thicknesses of the first layer, the second layer, and the pressure sensitive adhesive layer were each 10 μm, 30 μm, and 10 μm. In a case where a surface roughness Ra of the pressure sensitive adhesive layer opposite to the second layer was measured, the surface roughness was 0.06 μm.

Example 14B

A protective film of Example 14B was obtained in the same manner as in Example 13B described above, except that, in the above-described step [4], the molding of the pressure sensitive adhesive layer was carried out by blowing air to the surface of the pressure sensitive adhesive layer using an air knife. In a case where a surface roughness Ra of the pressure sensitive adhesive layer opposite to the second layer was measured, the surface roughness was 0.16 μm.

Example 15B

A protective film of Example 15B was obtained in the same manner as in Example 13B described above, except that, in the above-described step [3], as the first layer (outermost layer) forming material, an antiblocking agent (KINOPLUS FPP-AB05A) was added as shown in Tables 2-1, 2-2, 2-3 and 2-4, in addition to the polyolefin-based resin having a melting point of 150° C. or higher.

5. Evaluation

The protective film of each of Examples and Comparative Examples were evaluated according to the following method.

<1> Re-Adhesion of Protective Film to Attaching Substrate

First, the protective film of each of Examples and Comparative Examples was formed into a size of a width of 25 mm and a length of 200 mm, and then sandwiched between substrates (manufactured by Sumitomo Bakelite Co., Ltd., "ECK100UU"), each of which was made of polycarbonate and had a length of 30 cm, a width of 30 cm, and a thickness of 2.0 mm, with a mirror surface facing the protective film. Thereafter, the protective film was attached to the polycarbonate substrate located on the pressure sensitive adhesive layer side by pressure-bonding the laminate with a roll under a condition of a load of 1 kg/cm$^2$.

The polycarbonate forming the polycarbonate substrate was an aromatic polycarbonate-based resin obtained by an interfacial polycondensation reaction of bisphenol A and phosgene, the mirror surface was imparted by mold transfer after being sheeted by extrusion molding.

Next, the protective film was sandwiched between the polycarbonate substrates and kept under the conditions of 25° C. for 30 minutes, and then under an environment of 25° C., one end of the protective film was held, the protective film was peeled off from the polycarbonate substrate in a direction of 90° to a position of a length of 100 mm, and the one end of the protective film was released to re-attach the protective film to the polycarbonate substrate.

After 1 minute from the re-attachment, a total area (mm$^2$) in a plan view of a region where the polycarbonate substrate and the protective film were not bonded was measured, the number of regions where the polycarbonate substrate and the protective film were not bonded was counted, and the total area and the number obtained were evaluated based on the following evaluation criteria.

(Evaluation of Total Area)

The total area of the region where the polycarbonate substrate and the protective film were not bonded was A: less than 125 mm$^2$.

B: 125 mm$^2$ or more and less than 750 mm$^2$.

C: 750 mm$^2$ or more and less than 1,250 mm$^2$.

D: 1,250 mm$^2$ or more.

(Evaluation of Number)

The number of regions where the polycarbonate substrate and the protective film were not bonded was A: 3 or less.

B: more than 3 and 10 or less.

C: more than 10 and 20 or less.

D: more than 20.

<2> Evaluation of Presence or Absence of Whiskers Attached on Resin Substrate

First, resin substrates (manufactured by Sumitomo Bakelite Co., Ltd.) formed by holding a polarizer with two polycarbonate substrates (polycarbonate layers) were respectively prepared for the protective film of each of Examples and Comparative Examples. Both surfaces of the resin substrate were pressure-bonded under a condition of a load of 0.5 kg/cm$^2$ using a roll so that the protective films were attached thereto, thereby obtaining a laminate.

Next, after storing the laminate under conditions of a temperature of 23° C. and a time of 12 hr, the laminate, that is, the resin substrate having the protective film attached on both surfaces was punched in a thickness direction, thereby forming the laminate into a circular shape in a plan view.

Next, after peeling off the two protective films from the laminate, and the presence or absence of whiskers (pressure sensitive adhesive layer) remained on the punched surface (cut surface) of the resin substrate 21 was visually observed, and a case where no residual whiskers was observed was evaluated as A, a case where residual whiskers were slightly observed was evaluated as B, and a case where residual whiskers were clearly observed was evaluated as C.

<3> Evaluation of Presence or Absence of Orange Peel Formed on Surface of Resin Substrate First, resin substrates (manufactured by Sumitomo Bakelite Co., Ltd.) formed by holding a polarizer with two polycarbonate substrates (polycarbonate layers) were respectively prepared for the protective film of each of Examples and Comparative Examples. Both surfaces of the resin substrate were pressure-bonded under a condition of a load of 0.5 kg/cm$^2$ using a roll so that the protective films were attached thereto, thereby obtaining a laminate.

Next, after storing the laminate under conditions of a temperature of 23° C. and a time of 12 hr, the laminate, that is, the resin substrate having the protective film attached on both surfaces was punched in a thickness direction, thereby forming the laminate into a circular shape in a plan view.

Next, using a REMA molding machine with a mold (manufactured by REMA, "CR-32 type"), the laminate which had been formed into a circular shape was subjected to heat bending while being heated.

Next, after peeling off the two protective films from the laminate, the presence or absence of formation of orange peel (unevenness) on the attached surface (peeled surface) of the resin substrate 21 was visually observed, and a case where the formation of orange peel was not observed was evaluated as A, a case where the formation of orange peel was slightly observed was evaluated as B, and a case where the formation of orange peel was definitely observed was evaluated as C.

The evaluation results of the protective film of each of Examples and Comparative Examples, which had been obtained in the above-described manner, are listed in Tables 2-1, 2-2, 2-3 and 2-4.

TABLE 2-1

| | | | Example | | | | |
|---|---|---|---|---|---|---|---|
| | | | 1B | 2B | 3B | 4B | 5B |
| Base material layer | First layer (outermost layer) | Polyolefin having melting point of 150 °C or higher | h-PP | h-PP | h-PP | h-PP | h-PP |
| | | Melting point of polyolefin [°C] | 167 | 167 | 167 | 167 | 167 |
| | | Antiblocking agent (KINOPLUS FPP-AB05A) | | | | | |
| | | Component ratio of polyolefin:antiblocking agent [% by weight] | 100:0 | 100:0 | 100:0 | 100:0 | 100:0 |
| | | Average thickness [μm] | 10 | 10 | 10 | 10 | 10 |
| | Second layer (intermediate layer) | Adhesive resin A | SEBS | SEBS | SEBS | SEBS | SEBS |
| | | Non-adhesive resin B | h-PP | h-PP | h-PP | h-PP | h-PP |
| | | Melting point of non-adhesive resin [°C] | 167 | 167 | 167 | 167 | 167 |
| | | Component ratio of A:B [% by weight] | 20:80 | 20:80 | 20:80 | 20:80 | 20:80 |
| | | Average thickness [μm] | 30 | 30 | 30 | 30 | 30 |
| Pressure sensitive adhesive layer(innermost layer) | | Polyolefin C | LLDPE | LLDPE | LLDPE | LLDPE | LLDPE |
| | | Melting point of polyolefin [°C] | 121 | 121 | 121 | 114 | 114 |
| | | Elastomer D | SEBS | SEBS | SEBS | HSBR | HSBR |
| | | Component ratio of C:D [% by mass] | 90:10 | 90:10 | 90:10 | 90:10 | 90:10 |
| | | Melting point of pressure sensitive adhesive layer [°C] | 121 | 121 | 121 | 114 | 114 |
| | | Average thickness [μm] | 10 | 10 | 10 | 10 | 10 |
| | | Surface roughness Ra [μm] | 0.05 | 0.14 | 0.17 | 0.06 | 0.13 |
| Evaluation | Elastic modulus of protective film (25 °C) [MPa] | | 475 | 481 | 492 | 441 | 428 |
| | Re-adhesion of protective film | Total area of region where protective film is not bonded | A | B | C | A | B |
| | | Number of regions where protective film is not bonded | A | B | C | A | B |
| | Presence or absence of whiskers on punched surface | | A | A | A | A | A |

TABLE 2-1-continued

| | | | Example | | | | |
|---|---|---|---|---|---|---|---|
| | | | 1B | 2B | 3B | 4B | 5B |
| | Presence or absence of orange peel formation on peeled surface | | B | B | B | A | A |

TABLE 2-2

| | | | Example | | | | |
|---|---|---|---|---|---|---|---|
| | | | 6B | 7B | 8B | 9B | 10B |
| Base material layer | First layer (outermost layer) | Polyolefin having melting point of 150 °C or higher | h-PP | h-PP | h-PP | h-PP | h-PP |
| | | Melting point of polyolefin [°C] | 167 | 167 | 167 | 167 | 167 |
| | | Antiblocking agent (KINOPLUS FPP-AB05A) | | | | | |
| | | Component ratio of polyolefin:antiblocking agent [% by weight] | 100:0 | 100:0 | 100:0 | 100:0 | 100:0 |
| | | Average thickness [μm] | 10 | 10 | 10 | 10 | 10 |
| | Second layer (intermediate layer) | Adhesive resin A | SEBS | SEBS | SEBS | SEBS | SEBS |
| | | Non-adhesive resin B | h-PP | h-PP | h-PP | h-PP | h-PP |
| | | Melting point of non-adhesive resin [°C] | 167 | 167 | 167 | 167 | 167 |
| | | Component ratio of A:B [% by weight] | 20:80 | 20:80 | 20:80 | 20:80 | 20:80 |
| | | Average thickness [μm] | 30 | 30 | 30 | 30 | 30 |
| Pressure sensitive adhesive layer(innermost layer) | | Polyolefin C | LLDPE | LLDPE | LLDPE | LLDPE | EMA |
| | | Melting point of polyolefin [°C] | 114 | 93 | 93 | 93 | 90 |
| | | Elastomer D | HSBR | SEBS | SEBS | SEBS | SEBS |
| | | Component ratio of C:D [% by mass] | 90:10 | 90:10 | 90:10 | 90:10 | 95:5 |
| | | Melting point of pressure sensitive adhesive layer [°C] | 114 | 93 | 93 | 93 | 90 |
| | | Average thickness [μm] | 10 | 10 | 10 | 10 | 10 |
| | | Surface roughness Ra [μm] | 0.18 | 0.07 | 0.13 | 0.15 | 0.07 |
| Evaluation | Elastic modulus of protective film (25 °C) [MPa] | | 432 | 316 | 325 | 349 | 330 |
| | Re-adhesion of protective film | Total area of region where protective film is not bonded | C | A | A | A | A |
| | | Number of regions where protective film is not bonded | B | A | A | B | A |
| | Presence or absence of whiskers on punched surface | | A | A | A | A | B |
| | Presence or absence of orange peel formation on peeled surface | | A | A | A | A | A |

TABLE 2-3

| | | | Example | | | | |
|---|---|---|---|---|---|---|---|
| | | | 11B | 12B | 13B | 14B | 15B |
| Base material layer | First layer (outermost layer) | Polyolefin having melting point of 150 °C or higher | h-PP | h-PP | h-PP | h-PP | h-PP |
| | | Melting point of polyolefin [°C] | 167 | 167 | 167 | 167 | 167 |
| | | Antiblocking agent (KINOPLUS FPP-AB05A) | | | | | ○ |
| | | Component ratio of polyolefin:antiblocking agent [% by weight] | 100:0 | 100:0 | 100:0 | 100:0 | 95:5 |
| | | Average thickness [μm] | 10 | 10 | 10 | 10 | 10 |
| | Second layer (intermediate | Adhesive resin A | SEBS | SEBS | b-PP | b-PP | b-PP |
| | | Non-adhesive resin B | h-PP | h-PP | — | — | — |

TABLE 2-3-continued

| | | | Example | | | | |
|---|---|---|---|---|---|---|---|
| | | | 11B | 12B | 13B | 14B | 15B |
| | layer) | Melting point of non-adhesive resin [°C] | 167 | 167 | 165 | 165 | 165 |
| | | Component ratio of A:B [% by weight] | 20:80 | 20:80 | | | |
| | | Average thickness [μm] | 30 | 30 | 30 | 30 | 30 |
| Pressure sensitive adhesive layer(innermost layer) | | Polyolefin C | EMA | EMA | LLDPE | LLDPE | LLDPE |
| | | Melting point of polyolefin[°C] | 90 | 90 | 93 | 93 | 93 |
| | | Elastomer D | SEBS | SEBS | — | — | — |
| | | Component ratio of C:D [% by mass] | 95:5 | 95:5 | 100:0 | 100:0 | 100:0 |
| | | Melting point of pressure sensitive adhesive layer [°C] | 90 | 90 | 93 | 93 | 93 |
| | | Average thickness [μm] | 10 | 10 | 10 | 10 | 10 |
| | | Surface roughness Ra [μm] | 0.13 | 0.15 | 0.06 | 0.16 | 0.06 |
| Evaluation | Elastic modulus of protective film (25 °C) [MPa] | | 347 | 340 | 370 | 368 | 370 |
| | Re-adhesion of protective film | Total area of region where protective film is not bonded | A | A | A | B | A |
| | | Number of regions where protective film is not bonded | A | B | A | B | A |
| | Presence or absence of whiskers on punched surface | | B | B | A | A | A |
| | Presence or absence of orange peel formation on peeled surface | | A | A | A | A | A |

*: for Examples 13B and 14B, the addition of the non-adhesive resin is omitted, and the melting point of the adhesive resin is indicated.

TABLE 2-4

| | | | Comparative Example | | |
|---|---|---|---|---|---|
| | | | 1B | 2B | 3B |
| Base material layer | First layer (outermost layer) | Polyolefin having melting point of 150 °C or higher | h-PP | h-PP | h-PP |
| | | Melting point of polyolefin [°C] | 167 | 167 | 167 |
| | | Antiblocking agent (KINOPLUS FPP-AB05A) | | | |
| | | Component ratio of polyolefin:antiblocking agent [% by weight] | | | |
| | | Average thickness [μm] | 10 | 10 | 10 |
| | Second layer (intermediate layer) | Adhesive resin A | SEBS | SEBS | SEBS |
| | | Non-adhesive resin B | h-PP | h-PP | h-PP |
| | | Melting point of non-adhesive resin [°C] | 167 | 167 | 167 |
| | | Component ratio of A:B [% by weight] | 20:80 | 20:80 | 20:80 |
| | | Average thickness [μm] | 30 | 30 | 30 |
| Pressure sensitive adhesive layer (innermost layer) | | Polyolefin C | LLDPE | LLDPE | r-PP |
| | | Melting point of polyolefin[°C] | 121 | 114 | 131 |
| | | Elastomer D | SEBS | SEBS | SEBS |
| | | Component ratio of C:D [% by mass] | 90:10 | 90:10 | 98:2 |
| | | Melting point of pressure sensitive adhesive layer [°C] | 121 | 107 | 131 |
| | | Average thickness [μm] | 10 | 10 | 10 |
| | | Surface roughness Ra [μm] | 0.28 | 0.31 | 0.32 |
| Evaluation | Elastic modulus of protective film (25 °C) [MPa] | | 477 | 419 | 630 |
| | Re-adhesion of protective film | Total area of region where protective film is not bonded | D | D | D |
| | | Number of regions where protective film is not bonded | C | C | D |
| | Presence or absence of whiskers on punched surface | | A | A | A |
| | Presence or absence of orange peel formation on peeled surface | | B | B | C |

As shown in Tables 2-1, 2-2, 2-3 and 2-4, in the protective film of each of Examples, since the surface roughness Ra of the surface of the pressure sensitive adhesive layer was set to 0.20 μm or less, it was satisfied that the total area in a plan view of the region where the above-described polycarbonate substrate and the protective film were not bonded was less than 1,250 mm$^2$, and the number of regions where the above-described polycarbonate substrate and the protective film were not bonded was 20 or less, and it was found that the protective film could exhibit re-adhesion to the resin substrate.

On the other hand, in the protective film of each of Comparative Examples, the surface roughness Ra of the surface of the pressure sensitive adhesive layer was not set to 0.20 μm or less, and due to this, it could not be satisfied that the total area in a plan view of the region where the above-described polycarbonate substrate and the protective film were not bonded was less than 1,250 mm$^2$, and the number of regions where the above-described polycarbonate substrate and the protective film were not bonded was 20 or less. That is, the protective film could not exhibit re-adhesion to the resin substrate.

6. Production of Protective Film

Example 1C

[1] First, in a case of formation of a pressure sensitive adhesive layer (innermost layer), LLDPE having a melting point of 114° C., as a polyolefin-based resin, was prepared as a pressure sensitive adhesive layer forming material (resin composition).

[2] Next, in a case of formation of a second layer (intermediate layer) including a base material layer, SEPS as a thermoplastic resin having adhesiveness and h-PP having a melting point of 158° C., as a thermoplastic resin having no adhesiveness, were kneaded such that the content of the SEPS was set to 30 wt %, thereby preparing a second layer forming material (resin composition).

[3] Next, the pressure sensitive adhesive layer forming material, the prepared second layer forming material, and h-PP having a melting point of 158° C., as a polyolefin-based resin for forming a first layer (outermost layer) and having a melting point of 150° C. or higher, were respectively stored in three extruders.

[4] Next, after obtaining a laminate in a molten state, which was obtained by extruding each material in a molten state from the three extruders from a co-extrusion T-die, and then laminating these materials in layers, this laminate was cooled to obtain a protective film of Example 1C, in which average thicknesses of the first layer, the second layer, and the pressure sensitive adhesive layer were each 10 μm, 30 μm, and 10 μm.

Examples 2C to 11C and Comparative Example 1C

Protective films of Examples 2C to 11C and Comparative Example 1C were obtained in the same manner as in Example 1 described above, except that at least one of the type of the polyolefin-based resin and the type of the elastomer, which were used in the above-described step [1], the type of the thermoplastic resin having adhesiveness, the type of the thermoplastic resin having no adhesiveness, the content of the thermoplastic resin having adhesiveness contained in the prepared second layer forming material, which were used in the above-described step [2], and the average thicknesses of the first layer, the second layer, and the pressure sensitive adhesive layer in the above-described step [4] was changed as shown in Tables 3-1, 3-2 and 3-3, respectively.

7. Evaluation

The protective film of each of Examples and Comparative Examples was evaluated according to the following method.

<1> Electrification in Resin Substrate Due to Peeling of Protective Film

First, the protective film of each of Examples and Comparative Examples was formed into a size of a width of 25 mm and a length of 200 mm, and then sandwiched between resin substrates (manufactured by Sumitomo Bakelite Co., Ltd., "ECK100UU"), each of which was made of polycarbonate and had a length of 30 cm, a width of 30 cm, and a thickness of 2.0 mm, with a mirror surface facing the protective film. Thereafter, the protective film was attached to the resin substrate located on the pressure sensitive adhesive layer side by pressure-bonding the laminate with a roll under a condition of a load of 1 kg/cm$^2$.

The polycarbonate forming the resin substrate was an aromatic polycarbonate-based resin obtained by an interfacial polycondensation reaction of bisphenol A and phosgene, the mirror surface was formed by mold transfer after being sheeted by extrusion molding.

Next, the protective film was sandwiched between the resin substrates and kept under the conditions of 25° C. for 30 minutes, and then under an environment of 25° C., one end of the protective film was held, and the protective film was peeled off in a direction of 90° at a speed of 200 mm/min.

In the protective film peeled off from the resin substrate, the presence or absence of charging as the entire protective film and the presence or absence of charging on the surface of the pressure sensitive adhesive layer on the resin substrate side were measured with an electrostatic meter (manufactured by SIMCO, "FMX-004"). In addition, in the resin substrate from which the protective film had been peeled off, the presence or absence of charging on the surface of the resin substrate on the pressure sensitive adhesive layer side was measured with an electrostatic meter (manufactured by SIMCO, "FMX-004").

Furthermore, after 1 minute from a state in which the protective film was peeled off and left in the atmosphere, the presence or absence of adhesion of environmental foreign matter (dust) on the surface of the resin substrate on the pressure sensitive adhesive layer side was visually observed, and a case where the adhesion of environmental foreign matter was not observed was evaluated as A, a case where the adhesion of environmental foreign matter was slightly observed was evaluated as B, and a case where the adhesion of environmental foreign matter was clearly observed was evaluated as C.

<2> Evaluation of Presence or Absence of Whiskers Attached on Resin Substrate

First, resin substrates (manufactured by Sumitomo Bakelite Co., Ltd.) formed by holding a polarizer with two polycarbonate substrates (polycarbonate layers) were respectively prepared for the protective film of each of Examples and Comparative Examples. Both surfaces of the resin substrate were pressure-bonded under a condition of a load of 0.5 kg/cm$^2$ using a roll so that the protective films were attached thereto, thereby obtaining a laminate.

Next, after storing the laminate under conditions of a temperature of 23° C. and a time of 12 hr, the laminate, that is, the resin substrate having the protective film attached on both surfaces was punched in a thickness direction, thereby forming the laminate into a circular shape in a plan view.

Next, after peeling off the two protective films from the laminate, and the presence or absence of whiskers (pressure sensitive adhesive layer) remained on the punched surface (cut surface) of the resin substrate 21 was visually observed, and a case where no residual whiskers was observed was evaluated as A, a case where residual whiskers were slightly observed was evaluated as B, and a case where residual whiskers were clearly observed was evaluated as C.

<3> Evaluation of Presence or Absence of Orange Peel Formed on Surface of Resin Substrate First, resin substrates (manufactured by Sumitomo Bakelite Co., Ltd.) formed by holding a polarizer with two polycarbonate substrates (polycarbonate layers) were respectively prepared for the protective film of each of Examples and Comparative Examples. Both surfaces of the resin substrate were pressure-bonded under a condition of a load of 0.5 kg/cm$^2$ using a roll so that the protective films were attached thereto, thereby obtaining a laminate.

Next, after storing the laminate under conditions of a temperature of 23° C. and a time of 12 hr, the laminate, that is, the resin substrate having the protective film attached on both surfaces was punched in a thickness direction, thereby forming the laminate into a circular shape in a plan view.

Next, using a REMA molding machine with a mold (manufactured by REMA, "CR-32 type"), the laminate which had been formed into a circular shape was subjected to heat bending while being heated.

Next, after peeling off the two protective films from the laminate, the presence or absence of formation of orange peel (unevenness) on the attached surface (peeled surface) of the resin substrate 21 was visually observed, and a case where the formation of orange peel was not observed was evaluated as A, a case where the formation of orange peel was slightly observed was evaluated as B, and a case where the formation of orange peel was definitely observed was evaluated as C.

The evaluation results of the protective film of each of Examples and Comparative Examples, which had been obtained in the above-described manner, are listed in Tables 3-1, 3-2 and 3-3.

TABLE 3-1

| | | | Example | | | |
|---|---|---|---|---|---|---|
| | | | 1C | 2C | 3C | 4C |
| Base material layer | First layer (outermost layer) | Polyolefin having melting point of 150 °C or higher | h-PP | h-PP | h-PP | h-PP |
| | | Melting point of polyolefin [°C] | 158 | 158 | 158 | 158 |
| | | Average thickness [μm] | 10 | 10 | 10 | 10 |
| | Second layer (intermediate layer) | Adhesive resin A | SEPS | SEPS | SEPS | SEPS |
| | | Non-adhesive resin B | h-PP | h-PP | h-PP | h-PP |
| | | Melting point of non-adhesive resin [°C] | 158 | 158 | 158 | 158 |
| | | Component ratio of A:B [% by weight] | 30:70 | 20:80 | 10:90 | 10:90 |
| | | Average thickness [μm] | 30 | 30 | 30 | 35 |
| Pressure sensitive adhesive layer(innermost layer) | | Polyolefin C | LLDPE | LLDPE | LLDPE | LLDPE |
| | | Melting point of polyolefin [°C] | 114 | 114 | 114 | 114 |
| | | Elastomer D | | | | |
| | | Component ratio of C:D [% by weight] | 100:0 | 100:0 | 100:0 | 100:0 |
| | | Average thickness [μm] | 10 | 10 | 10 | 5 |
| Evaluation | Electrification evaluation | Presence or absence of charging as entire protective film | − | − | − | − |
| | | Presence or absence of charging on surface of pressure sensitive adhesive layer on resin substrate side | − | − | − | − |
| | | Presence or absence of charging on surface of resin substrate on pressure sensitive adhesive layer side | + | + | + | + |
| | | Presence or absence of adhesion of environmental foreign matter on surface of resin substrate | B | A | A | A |
| | Presence or absence of whiskers on punched surface | | A | A | A | A |
| | Presence or absence of orange peel formation on peeled surface | | A | A | A | B |

TABLE 3-2

| | | | Example | | | |
|---|---|---|---|---|---|---|
| | | | 5C | 6C | 7C | 8C |
| Base material layer | First layer (outermost layer) | Polyolefin having melting point of 150 °C or higher | h-PP | h-PP | h-PP | h-PP |
| | | Melting point of polyolefin [°C] | 158 | 158 | 158 | 158 |
| | | Average thickness [μm] | 10 | 10 | 10 | 10 |
| | Second layer (intermediate layer) | Adhesive resin A | SEPS | SEPS | SEPS | SEPS |
| | | Non-adhesive resin B | h-PP | h-PP | h-PP | h-PP |
| | | Melting point of non-adhesive resin [°C] | 158 | 158 | 158 | 158 |
| | | Component ratio of A:B [% by weight] | 30:70 | 20:80 | 10:90 | 10:90 |
| | | Average thickness [μm] | 30 | 30 | 30 | 35 |

TABLE 3-2-continued

| | | | Example | | | |
|---|---|---|---|---|---|---|
| | | | 5C | 6C | 7C | 8C |
| Pressure sensitive adhesive layer(innermost layer) | | Polyolefin C | LLDPE | LLDPE | LLDPE | LLDPE |
| | | Melting point of polyolefin [C] | 121 | 121 | 121 | 121 |
| | | Elastomer D | | | | |
| | | Component ratio of C:D [% by weight] | 100:0 | 100:0 | 100:0 | 100:0 |
| | | Average thickness [μm] | 10 | 10 | 10 | 5 |
| Evaluation | Electrification evaluation | Presence or absence of charging as entire protective film | − | − | − | − |
| | | Presence or absence of charging on surface of pressure sensitive adhesive layer on resin substrate side | − | − | − | − |
| | | Presence or absence of charging on surface of resin substrate on pressure sensitive adhesive layer side | + | + | + | + |
| | | Presence or absence of adhesion of environmental foreign matter on surface of resin substrate | B | A | A | A |
| | Presence or absence of whiskers on punched surface | | A | A | A | A |
| | Presence or absence of orange peel formation on peeled surface | | A | A | A | B |

TABLE 3-3

| | | | Example | | | Comparative Example |
|---|---|---|---|---|---|---|
| | | | 9C | 10C | 11C | 1C |
| Base material layer | First layer (outermost layer) | Polyolefin having melting point of 150 °C or higher | h-PP | h-PP | h-PP | h-PP |
| | | Melting point of polyolefin [°C] | 158 | 158 | 158 | 158 |
| | | Average thickness [μm] | 10 | 15 | 20 | 10 |
| | Second layer (intermediate layer) | Adhesive resin A | b-PP | b-PP | b-PP | |
| | | Non-adhesive resin B | | | | h-PP |
| | | Melting point of non-adhesive resin [°C] | 165 | 165 | 165 | 158 |
| | | Component ratio of A:B [% by weight] | 100:0 | 100:0 | 100:0 | 100:0 |
| | | Average thickness [μm] | 30 | 20 | 10 | 30 |
| Pressure sensitive adhesive layer(innermost layer) | | Polyolefin C | LLDPE | LLDPE | LLDPE | LLDPE |
| | | Melting point of polyolefin [°C] | 114 | 114 | 114 | 114 |
| | | Elastomer D | | | | SEBS |
| | | Component ratio of C:D [% by weight] | 100:0 | 100:0 | 100:0 | 100:10 |
| | | Average thickness [μm] | 10 | 15 | 20 | 10 |
| Evaluation | Electrification evaluation | Presence or absence of charging as entire protective film | − | − | − | + |
| | | Presence or absence of charging on surface of pressure sensitive adhesive layer on resin substrate side | − | − | − | + |
| | | Presence or absence of charging on surface of resin substrate on pressure sensitive adhesive layer side | + | + | + | − |

TABLE 3-3-continued

| | Example | | | Comparative Example |
|---|---|---|---|---|
| | 9C | 10C | 11C | 1C |
| Presence or absence of adhesion of environmental foreign matter on surface of resin substrate | A | A | A | C |
| Presence or absence of whiskers on punched surface | A | A | A | C |
| Presence or absence of orange peel formation on peeled surface | A | A | A | A |

*: for Examples 9C to 11C, the addition of the non-adhesive resin is omitted, and the melting point of the adhesive resin is indicated.

As shown in Tables 3-1, 3-2 and 3-3, in the protective film of each of Examples, the surface of the pressure sensitive adhesive layer on the resin substrate side was charged with a negative charge due to the peeling of the protective film from the resin substrate, and as a result, it was clarified that the surface of the resin substrate on the pressure sensitive adhesive layer side was charged with a positive charge, and thus, it was possible to effectively suppress or prevent the adhesion of. environmental foreign matter (dust) to the resin substrate.

On the other hand, in the protective film of Comparative Example, the surface of the pressure sensitive adhesive layer on the resin substrate side was charged with a positive charge due to the peeling of the protective film from the resin substrate, and as a result, the environmental foreign matter (dust) unintentionally adhered to the resin substrate due to the fact that the surface of the resin substrate on the pressure sensitive adhesive layer side was charged with a negative charge.

7. Production of Protective Film

Example 1D

[1] First, in a case of formation of a pressure sensitive adhesive layer (innermost layer), LLDPE having a melting point of 121° C., as a polyolefin-based resin, and the elastomer A as an elastomer were kneaded such that the content of the elastomer A was set to 10% by weight, thereby preparing a pressure sensitive adhesive layer forming material (resin composition).

[2] Next, in a case of formation of a second layer (intermediate layer) including a base material layer, SEBS as a thermoplastic resin having adhesiveness and h-PP having a melting point of 167° C., as a thermoplastic resin having no adhesiveness, were kneaded such that the content of the SEBS was set to 20% by weight, thereby preparing a second layer forming material (resin composition).

[3] Next, the prepared pressure sensitive adhesive layer forming material, the prepared second layer forming material, and h-PP having a melting point of 167° C., as a polyolefin-based resin for forming a first layer (outermost layer) and having a melting point of 150° C. or higher, were respectively stored in three extruders.

[4] Next, after obtaining a laminate in a molten state, which was obtained by extruding each material in a molten state from the three extruders from a co-extrusion T-die, and then laminating these materials in layers, this laminate was cooled to obtain a protective film of Example 1D, in which average thicknesses of the first layer, the second layer, and the pressure sensitive adhesive layer were each 10 μm, 30 μm, and 10 μm.

Examples 2D to 12D and Comparative Examples 1D and 2D

Protective films of Examples 2D to 12D and Comparative Examples 1D and 2D were obtained in the same manner as in Example 1D described above, except that at least one of the type of the polyolefin-based resin, the type of the elastomer, the presence or absence of the antiblocking agent, and the content of the elastomer contained in the prepared pressure sensitive adhesive layer forming material, which were used in the above-described step [1], the type of the thermoplastic resin having adhesiveness, the type of the thermoplastic resin having no adhesiveness, the content of the thermoplastic resin having adhesiveness contained in the prepared second layer forming material, which were used in the above-described step [2], and the type of the polyolefin-based resin having a melting point of 150° C. or higher, which was used in the above-described step [3], was changed as shown in Tables 4-1, 4-2 and 4-3, respectively.

8. Evaluation

The protective film of each of Examples and Comparative Examples were evaluated according to the following method.

<1> Evaluation of Adhesive Force of Protective Film

First, with regard to the protective film of each of Examples and Comparative Examples, in accordance with JIS Z 0273:2009, the protective film was attached to the polycarbonate substrate by pressure-bonding the protective film with a rubber roll at a speed of 2 m/min with a pressure of 5880 N/m.

Next, the protective film was cut into a size of a length of 100 mm and a width of 25 mm, and under a condition of 23° C., a peel strength $T_0$ [N/25 mm] was measured in a case where one end of the cut protective film was held, and then the cut protective film was peeled off in a direction of 90° at a speed of 200 mm/min.

<2> Evaluation of Adhesive Force of Protective Film at Heating Temperature of 100° C.

First, with regard to the protective film of each of Examples and Comparative Examples, in accordance with JIS Z 0273:2009, the protective film was attached to the polycarbonate substrate by pressure-bonding the protective film with a rubber roll at a speed of 2 m/min with a pressure of 5880 N/m, and then the protective film was heated conditions of 100° C. for 30 minutes and cooled at 23° C.

Next, the protective film was cut into a size of a length of 100 mm and a width of 25 mm, and a peel strength $T_1$ [N/25 mm] was measured in a case where one end of the cut protective film was held, and then the cut protective film was peeled off in a direction of 90° at a speed of 200 mm/min.

<3> Evaluation of Adhesive Force of Protective Film at Heating Temperature of 145° C.

First, with regard to the protective film of each of Examples and Comparative Examples, in accordance with JIS Z 0273:2009, the protective film was attached to the polycarbonate substrate by pressure-bonding the protective film with a rubber roll at a speed of 2 m/min with a pressure of 5880 N/m, and then the protective film was heated conditions of 145° C. for 30 minutes and cooled at 23° C.

Next, the protective film was cut into a size of a length of 100 mm and a width of 25 mm, and a peel strength $T_2$ [N/25 mm] was measured in a case where one end of the cut protective film was held, and then the cut protective film was peeled off in a direction of 90° at a speed of 200 mm/min.

The evaluation results of the protective film of each of Examples and Comparative Examples, which had been obtained in the above-described manner, are listed in Tables 4-1, 4-2 and 4-3.

TABLE 4-1

| | | | Example | | | | |
|---|---|---|---|---|---|---|---|
| | | | 1D | 2D | 3D | 4D | 5D |
| Base material layer | First layer (outermost layer) | Polyolefin having melting point of 150 °C or higher | h-PP | h-PP | h-PP | h-PP | h-PP |
| | | Melting point of polyolefin [°C] | 167 | 167 | 167 | 167 | 167 |
| | | Antiblocking agent | | | | | |
| | | Component ratio of polyolefin:antiblocking agent [% by weight] | 100:0 | 100:0 | 100:0 | 100:0 | 100:0 |
| | | Average thickness [μm] | 10 | 10 | 10 | 10 | 10 |
| | Second layer (intermediate layer) | Adhesive resin A | SEBS | SEBS | SEBS | SEBS | SEBS |
| | | Non-adhesive resin B | h-PP | h-PP | h-PP | h-PP | h-PP |
| | | Melting point of non-adhesive resin [°C] | 167 | 167 | 167 | 167 | 167 |
| | | Component ratio of A:B [% by weight] | 20:80 | 20:80 | 20:80 | 20:80 | 20:80 |
| | | Average thickness[μm] | 30 | 30 | 30 | 30 | 30 |
| Pressure sensitive adhesive layer(innermost layer) | | Polyolefin C | LLDPE | LLDPE | LLDPE | LLDPE | LLDPE |
| | | Melting point of polyolefin [°C] | 121 | 121 | 121 | 121 | 121 |
| | | Polyolefin D | | | | | |
| | | Melting point of polyolefin [°C] | | | | | |
| | | Elastomer E | A | B | C | D | E |
| | | Melting point of elastomer [°C] | 66 | 77 | 83 | 98 | 110 |
| | | Component ratio of C:D or C:E [% by weight] | 90:10 | 90:10 | 90:10 | 90:10 | 90:10 |
| | | Average thickness [μm] | 10 | 10 | 10 | 10 | 10 |
| | | Two different melting points of pressure sensitive adhesive layer [°C] — High temperature | 121 | 121 | 121 | 121 | 121 |
| | | Two different melting points of pressure sensitive adhesive layer [°C] — Low temperature | 66 | 77 | 83 | 98 | 110 |
| | | Difference between two different melting points [°C] | 55 | 44 | 38 | 23 | 11 |
| | Peel strength T0 [N/25 mm] | | 0.17 | 0.14 | 0.13 | 0.1 | 0.08 |
| | Peel strength T1 [N/25 mm] | | 0.35 | 0.34 | 0.31 | 0.25 | 0.15 |
| | Peel strength T2 [N/25 mm] | | 1.30 | 1.22 | 1.21 | 0.80 | 0.75 |
| | Ratio of peel strength (T2/T1) | | 3.71 | 3.59 | 3.90 | 3.20 | 5.00 |

TABLE 4-2

| | | | Example | | | | |
|---|---|---|---|---|---|---|---|
| | | | 6D | 7D | 8D | 9D | 10D |
| Base material layer | First layer (outermost layer) | Polyolefin having melting point of 150 °C or higher | h-PP | h-PP | h-PP | h-PP | h-PP |
| | | Melting point of polyolefin [°C] | 167 | 167 | 167 | 167 | 167 |
| | | Antiblocking agent | | | | | |

TABLE 4-2-continued

| | | | Example | | | | |
|---|---|---|---|---|---|---|---|
| | | | 6D | 7D | 8D | 9D | 10D |
| | | Component ratio of polyolefin:antiblocking agent [% by weight] | 100:0 | 100:0 | 100:0 | 100:0 | 100:0 |
| | | Average thickness [μm] | 10 | 10 | 10 | 10 | 10 |
| | Second layer (intermediate layer) | Adhesive resin A | SEBS | SEBS | SEBS | SEBS | SEBS |
| | | Non-adhesive resin B | h-PP | h-PP | h-PP | h-PP | h-PP |
| | | Melting point of non-adhesive resin [°C] | 167 | 167 | 167 | 167 | 167 |
| | | Component ratio of A:B [% by weight] | 20:80 | 20:80 | 20:80 | 20:80 | 20:80 |
| | | Average thickness[μm] | 30 | 30 | 30 | 30 | 30 |
| Pressure sensitive adhesive layer(innermost layer) | | Polyolefin C | LLDPE | LLDPE | LLDPE | HDPE | LLDPE |
| | | Melting point of polyolefin [°C] | 106 | 121 | 121 | 132 | 121 |
| | | Polyolefin D | | EMAA | EMA | EMA | LLDPE |
| | | Melting point of polyolefin [°C] | | 106 | 90 | 90 | 93 |
| | | Elastomer E | F | | | | |
| | | Melting point of elastomer [°C] | 140 | | | | |
| | | Component ratio of C:D or C:E [% by weight] | 50:50 | 70:30 | 70:30 | 70:30 | 70:30 |
| | | Average thickness [μm] | 10 | 10 | 10 | 10 | 10 |
| | | Two different melting points of pressure sensitive adhesive layer [°C] — High temperature | 140 | 121 | 121 | 132 | 121 |
| | | Two different melting points of pressure sensitive adhesive layer [°C] — Low temperature | 106 | 106 | 90 | 90 | 93 |
| | | Difference between two different melting points [°C] | 34 | 15 | 31 | 42 | 28 |
| | Peel strength T0 [N/25 mm] | | 0.04 | 0.09 | 0.13 | 0.11 | 0.13 |
| | Peel strength T1 [N/25 mm] | | 0.19 | 0.14 | 0.31 | 0.30 | 0.26 |
| | Peel strength T2 [N/25 mm] | | 0.42 | 0.72 | 0.97 | 0.64 | 0.82 |
| | Ratio of peel strength (T2/T1) | | 2.21 | 5.14 | 3.13 | 2.13 | 3.15 |

TABLE 4-3

| | | | Example | | Comparative Example | |
|---|---|---|---|---|---|---|
| | | | 11D | 12D | 1D | 2D |
| Base material layer | First layer (outermost layer) | Polyolefin having melting point of 150 °C or higher | h-PP | h-PP | h-PP | h-PP |
| | | Melting point of polyolefin [°C] | 167 | 167 | 167 | 167 |
| | | Antiblocking agent | | ○ | | |
| | | Component ratio of polyolefin:antiblocking agent [% by weight] | 100:0 | 95:5 | | |
| | | Average thickness [μm] | 10 | 10 | | |
| | Second layer (intermediate layer) | Adhesive resin A | SEBS | SEBS | — | — |
| | | Non-adhesive resin B | h-PP | h-PP | — | LLDPE |
| | | Melting point of non-adhesive resin [°C] | 167 | 167 | — | 121 |
| | | Component ratio of A:B [% by weight] | 20:80 | 20:80 | — | 0:100 |
| | | Average thickness[μm] | 30 | 30 | | |
| Pressure sensitive adhesive layer (innermost layer) | | Polyolefin C | LLDPE | LLDPE | LLDPE | LLDPE |
| | | Melting point of polyolefin [°C] | 114, 99 | 121 | 121 | 90 |
| | | Polyolefin D | | | | |
| | | Melting point of polyolefin [°C] | | | | |
| | | Elastomer E | | B | | |
| | | Melting point of elastomer [°C] | | 77 | | |
| | | Component ratio of C:D or C:E [% by weight] | — | 90:10 | 90:10 | 90:10 |
| | | Average thickness [μm] | 10 | 10 | | |
| | | Two different melting points of — High temperature | 111 | 121 | 121 | 93 |

TABLE 4-3-continued

| | | Example | | Comparative Example | |
|---|---|---|---|---|---|
| | | 11D | 12D | 1D | 2D |
| pressure sensitive adhesive layer [°C] | Low temperature | 87 | 77 | — | — |
| Difference between two different melting points [°C] | | 24 | 44 | — | — |
| Peel strength T0 [N/25mm] | | 0.15 | 0.14 | 0.03 | 0.16 |
| Peel strength T1 [N/25mm] | | 0.30 | 0.34 | 0.04 | 0.62 |
| Peel strength T2 [N/25mm] | | 1.20 | 1.22 | 0.41 | 0.69 |
| Ratio of peel strength (T2/T1) | | 4.00 | 3.59 | 10.25 | 1.11 |

As shown in Tables 4-1, 4-2 and 4-3, in the protective film of each of Examples, the pressure sensitive adhesive layer had two different melting points, and as a result, it was found that a degree of a ratio ($T_2/T_1$) of the peel strength $T_1$ as the adhesion force of the protective film at a heating temperature of 100° C. and the peel strength $T_2$ as the adhesion force of the protective film at a heating temperature of 145° C. was 2.0 or more, and by appropriately setting the heating temperature for the protective film, the degree of adhesive force to the polycarbonate substrate (resin substrate) could be selected.

On the other hand, in the protective film of each of Comparative Examples, the pressure sensitive adhesive layer had only one melting point, and due to this, it is presumed that the degree of the ratio ($T_2/T_1$) of the above-described peel strength $T_1$ and the above-described peel strength $T_2$ was less than 2.0, and it was clarified that it could not be said that the degree of adhesive force to the polycarbonate substrate (resin substrate) could be selected by appropriately setting the heating temperature for the protective film.

9. Preparation of Raw Materials

First, raw materials used for production of the protective film of each of Examples and Comparative Examples are as follows.

<Binder Resin: Polyolefin>

Block polypropylene having melting point of 158° C. (propylene-ethylene block copolymer) (b-PP, manufactured by Japan Polypropylene Corporation, "NOVATEC EC9GD", MFR=0.5 g/10 min)

<White Light-Shielding Material>

White masterbatch in which titanium oxide is blended (dispersed) in polypropylene (manufactured by DIC Corporation, "PEONY L-11165MFT")

<White Colorant (Dye)>

Synthetic resin colorant (manufactured by Sumika Chemtex Co., Ltd., "Sumiplast Blue SR")

<Antiblocking Agent>

Antiblocking agent (manufactured by SUMIKA COLOR CO., LTD., "KINOPLUS FPP-AB05A")

10. Production of Protective Film

Example 1E

[1A] First, in a case of formation of a pressure sensitive adhesive layer, LLDPE having a melting point of 121° C., as a polyolefin-based resin, and SEBS as an elastomer were kneaded such that the content of the SEBS was set to 10% by weight, thereby preparing a pressure sensitive adhesive layer forming material (resin composition).

[2A] Next, in a case of formation of a shielding layer, the block polypropylene and the white masterbatch were kneaded such that the content of the white masterbatch was set to 2.30% by weight, thereby preparing a shielding layer forming material (resin composition).

[3A] Next, the prepared pressure sensitive adhesive layer forming material, the prepared shielding layer forming material, and h-PP having a melting point of 167° C., as a polyolefin-based resin for forming a back layer and having a melting point of 150° C. or higher, were respectively stored in three extruders.

[4A] Next, after obtaining a laminate in a molten state, which was obtained by extruding each material in a molten state from the three extruders from a co-extrusion T-die, and then laminating these materials in layers, this laminate was cooled to obtain a protective film 150A, in which average thicknesses of the back layer, the shielding layer, and the pressure sensitive adhesive layer were each 10 μm, 30 μm, and 10 μm.

[5A] In addition, in a case of formation of a protective film 150B, the block polypropylene was kneaded to prepare a protective film 150B forming material (resin composition).

[6A] Next, the prepared protective film 150B forming material was stored in one extruder.

[7A] Next, by extruding the protective film 150B forming material in a molten state from the one extruder to form a layered protective film 150B forming material from a T-die, and then cooling the forming material, a non-colored protective film 150B was obtained.

Through the above-described respective steps, a protective film set of Example 1E, including the protective films 150A and 150B, was obtained.

Using a haze meter (manufactured by NIPPON DENSHOKU INDUSTRIES Co., Ltd., "NDH4000"), total light transmittances of the protective film 150A and the protective film 150B, which was measured in accordance with JIS K 7361, were each 22% and 90%.

In addition, average thicknesses of the protective film 150A and the protective film 150B was 50 μm, respectively.

Examples 2E to 8E, Examples 12E and 13E, and Comparative Example 1E

Protective film sets of Examples 2E to 8E, Example 12E, and Comparative Example 1E, including the protective films 150A and 150B, were obtained in the same manner as in Example 1E described above, except that, in preparing the protective film 150A forming material in the above-described step [2A], the content of the white masterbatch and the presence or absence of the antiblocking agent were changed as shown in Tables 5-1, 5-2, 5-3 and 5-4.

Example 9E

[1B] First, in a case of formation of a pressure sensitive adhesive layer, LLDPE having a melting point of 121° C., as a polyolefin-based resin, and SEBS as an elastomer were kneaded such that the content of the SEBS was set to 10% by weight, thereby preparing a pressure sensitive adhesive layer forming material (resin composition).

[2B] Next, in a case of formation of a shielding layer, the block polypropylene and the white masterbatch were kneaded such that the content of the white masterbatch was set to 1.60% by weight, thereby preparing a shielding layer forming material (resin composition).

[3B] Next, the prepared pressure sensitive adhesive layer forming material, the prepared shielding layer forming material, and h-PP having a melting point of 167° C., as a polyolefin-based resin for forming a back layer and having a melting point of 150° C. or higher, were respectively stored in three extruders.

[4B] Next, after obtaining a laminate in a molten state, which was obtained by extruding each material in a molten state from the three extruders from a co-extrusion T-die, and then laminating these materials in layers, this laminate was cooled to obtain a protective film A, in which average thicknesses of the back layer, the shielding layer, and the pressure sensitive adhesive layer were each 10 μm, 30 μm, and 10 μm.

[5B] Next, in a case of formation of a protective film 150B, the block polypropylene and a blue colorant (Sumiplast Blue SR) were kneaded such that the content of the colorant was set to 0.50% by weight, thereby preparing a protective film 150B forming material (resin composition).

[6B] Next, the prepared protective film 150B forming material was stored in one extruder.

[7B] Next, by extruding the protective film 150B forming material in a molten state from the one extruder to form a layered protective film 150B forming material from a T-die, and then cooling the forming material, a colored protective film 150B was obtained.

Through the above-described respective steps, a protective film set of Example 9E, including the protective films 150A and 150B, was obtained.

Using a haze meter (manufactured by NIPPON DENSHOKU INDUSTRIES Co., Ltd., "NDH4000"), total light transmittances of the protective film 150A and the protective film 150B, which was measured in accordance with JIS K 7361, were each 28% and 90%.

In addition, average thicknesses of the protective film 150A and the protective film 150B was 50 μm, respectively.

Examples 10E and 11E

Protective film sets of Examples 10E and 11E, including the protective films 150A and 150B, were obtained in the same manner as in Example 9E described above, except that, in preparing the protective film 150A forming material in the above-described step [2B], the content of the white masterbatch was changed as shown in Tables 5-1, 5-2, 5-3 and 5-4.

Comparative Example 2E

A protective film set of Comparative Example 2E, including the protective films 150A and 150B, was obtained in the same manner as in Example 9E described above, except that, in preparing the protective film 150A forming material in the above-described step [2B], the content of the white masterbatch titanium oxide was changed as shown in Tables 5-1, 5-2, 5-3 and 5-4, and in preparing the protective film 150B forming material in the above-described step [5B], the content of the blue colorant was changed as shown in Tables 5-1, 5-2, 5-3 and 5-4.

Comparative Example 1E

A protective film set of Comparative Example 1E was obtained in the same manner as in Example 1E described above, except that two protective films 150B were prepared instead of the protective films 150A and 150B.

Comparative Example 3E

[1C] First, in a case of formation of a pressure sensitive adhesive layer, LLDPE having a melting point of 121° C., as a polyolefin-based resin, and SEBS as an elastomer were kneaded such that the content of the SEBS was set to 10% by weight, thereby preparing a pressure sensitive adhesive layer forming material (resin composition).

[2C] Next, in a case of formation of a shielding layer, the block polypropylene and the white masterbatch were kneaded such that the content of the white masterbatch was set to 1.10% by weight, thereby preparing a shielding layer forming material (resin composition).

[3C] Next, the prepared pressure sensitive adhesive layer forming material, the prepared shielding layer forming material, and h-PP having a melting point of 167° C., as a polyolefin-based resin for forming a back layer and having a melting point of 150° C. or higher, were respectively stored in three extruders.

[4C] Next, after obtaining a laminate in a molten state, which was obtained by extruding each material in a molten state from the three extruders from a co-extrusion T-die, and then laminating these materials in layers, this laminate was cooled to obtain a protective film A, in which average thicknesses of the back layer, the shielding layer, and the pressure sensitive adhesive layer were each 10 μm, 30 μm, and 10 μm.

[5C] In addition, in a case of formation of a protective film 150B, the block polypropylene and the white masterbatch were kneaded such that the content of the white masterbatch was set to 1.10% by weight, thereby preparing a protective film 150B forming material (resin composition).

[6C] Next, the prepared protective film 150B forming material was stored in one extruder.

[7C] Next, by extruding the protective film 150B forming material in a molten state from the one extruder to form a layered protective film 150B forming material from a T-die, and then cooling the forming material, a protective film 150B having light-shielding property was obtained.

Through the above-described respective steps, a protective film set of Comparative Example 3E, including the protective films 150A and 150B, was obtained.

Using a haze meter (manufactured by NIPPON DENSHOKU INDUSTRIES Co., Ltd., "NDH4000"), total light transmittances of the protective film 150A and the protective film 150B, which was measured in accordance with JIS K 7361, were 58%, respectively.

In addition, average thicknesses of the protective film 150A and the protective film 150B was 50 μm, respectively.

11. Production of Resin Sheet Laminate

Examples 1E to 8E, Example 12E, and Comparative Example 3E

First, a light-transmitting resin sheet having the following configuration was prepared.

That is, a sheet forming material which had been prepared by kneading polycarbonate and a blue colorant (Sumiplast Blue SR) such that the content of the blue colorant was set to 0.10% by weight was stored in an extruder, and by extruding the sheet forming material in a molten state from the extruder, a layered sheet forming material was obtained from a T-die. The layered sheet forming material was cooled to obtain a light-transmitting resin sheet, and the light-transmitting resin sheet was cut into a size of a length of 50 mm and a width of 50 mm, thereby obtaining a light-transmitting resin sheet of 50 mm long×50 mm wide×300 μm thick.

Next, the protective film 150A and the protective film 150B included in the protective film set of Examples 1E to BE, Example 12E, and Comparative Example 3E were respectively attached to (laminated on) a front surface (upper surface) and a back surface (lower surface) of the obtained light-transmitting resin sheet to obtain a resin sheet laminate.

On the surfaces of the light-transmitting resin sheet, one circular black marking with a diameter of 5 mm was formed.

Examples 9E to 11E and Comparative Examples 1E and 2E

First, a light-transmitting resin sheet having the following configuration was prepared.

That is, a sheet forming material made of 100% by weight of polycarbonate was stored in an extruder, and by extruding the sheet forming material in a molten state from the extruder, a layered sheet forming material was obtained from a T-die. The layered sheet forming material was cooled to obtain a light-transmitting resin sheet, and the light-transmitting resin sheet was cut into a size of a length of 50 mm and a width of 50 mm, thereby obtaining a light-transmitting resin sheet of 50 mm long×50 mm wide×300 μm thick.

Next, the protective film 150A and the protective film 150B included in the protective film set of Examples 9E to 11E, and Comparative Examples 1E and 2E were respectively attached to (laminated on) a front surface (upper surface) and a back surface (lower surface) of the obtained light-transmitting resin sheet to obtain a resin sheet laminate.

On the surfaces of the light-transmitting resin sheet, one circular black marking with a diameter of 5 mm was formed.

12. Evaluation

The resin sheet laminate of each of Examples and Comparative Examples was evaluated according to the following method.

<1> Distinguishability of Front and Back Sides of Light-Transmitting Resin Sheet With regard to the resin sheet laminate obtained using the protective film set of each of Examples and Comparative Examples, in each case, front and back sides of the resin sheet laminate were determined under an environment of illuminance of 600 Lx, without peeling off the protective film from the resin sheet laminate. Based on a difference in color tone between the front and back sides, in a case where the front and back sides could be easily determined was evaluated as A, a case where the front and back sides could be determined was evaluated as B, a case where the front and back sides could be determined, but it took time to determine the front and back sides was evaluated as C, and a case where it was difficult to determine the front and back sides was evaluated as D.

<2> Visibility of Marking on Light-Transmitting Resin Sheet

With regard to the resin sheet laminate obtained using the protective film set of each of Examples and Comparative Examples, in each case, visibility of the marking on the surface of the light-transmitting resin sheet was determined from the surface side of the light-transmitting resin sheet under an environment of illuminance of 600 Lx, without peeling off the protective film from the resin sheet laminate. From the surface side of the resin sheet laminate, a case where the marking was easily visible was evaluated as A, a case where the marking was visible was evaluated as B, a case where the marking was slightly visible was evaluated as C, and a case where the marking was hardly visible was evaluated as D.

The evaluation results of the resin sheet laminate of each of Examples and Comparative Examples, which had been obtained in the above-described manner, are listed in Tables 5-1, 5-2, 5-3 and 5-4.

TABLE 5-1

| | | | | Example | | | |
|---|---|---|---|---|---|---|---|
| | | | | 1E | 2E | 3E | 4E |
| Protective film | Front surface (protective film 150A) | Back layer | h-PP (NOVATEC EA9FTD) [% by weight] Antiblocking agent (KINOPLUS FPP-AB05A) | 100.00 | 100.00 | 100.00 | 100.00 |
| | | | Thickness [μm] | 10 | 10 | 10 | 10 |
| | | Shielding layer | Binder resin b-PP (NOVATEC EC9GD) [% by weight] | 97.70 | 98.00 | 98.40 | 98.70 |
| | | | White masterbatch (L-11165MFT) [% by weight] | 2.30 | 2.00 | 1.60 | 1.30 |
| | | | Content of titanium oxide [% by weight] | 1.38 | 1.20 | 0.96 | 0.78 |
| | | | Thickness [μm] | 30 | 30 | 30 | 30 |
| | | Pressure sensitive adhesive layer | Thickness [μm] | 10 | 10 | 10 | 10 |

TABLE 5-1-continued

| | | | | Example 1E | Example 2E | Example 3E | Example 4E |
|---|---|---|---|---|---|---|---|
| | | Total light transmittance [%] | | 22 | 28 | 41 | 50 |
| | | Average thickness(total thickness) [μm] | | 50 | 50 | 50 | 50 |
| | Back surface (protective film 150B) | Colored layer | Binder resin b-PP (NOVATEC EC9GD) [% by weight] | 100.0 | 100.0 | 100.0 | 100.0 |
| | | | Blue colorant Sumiplast Blue SR [% by weight] | — | — | — | — |
| | | Shielding layer | White masterbatch (L-11165MFT) [% by weight] | — | — | — | — |
| | | | Content of titanium oxide [% by weight] | — | — | — | — |
| | | | Thickness [μm] | 30 | 30 | 30 | 30 |
| | | Total light transmittance [%] | | 90 | 90 | 90 | 90 |
| | | Average thickness [μm] | | 50 | 50 | 50 | 50 |
| Light-transmitting resin sheet | | Resin layer | Polycarbonate resin [% by weight] | 99.90 | 99.90 | 99.90 | 99.90 |
| | | | Blue colorant Sumiplast Blue SR [% by weight] | 0.10 | 0.10 | 0.10 | 0.10 |
| | | | Thickness [μm] | 300 | 300 | 300 | 300 |
| Evaluation | Distinguishability of front and back sides of sheet | | | A | A | A | A |
| | Visibility of marking on light-transmitting resin sheet | | | B | B | A | A |

TABLE 5-2

| | | | | Example 5E | Example 6E | Example 7E | Example 8E |
|---|---|---|---|---|---|---|---|
| Protective film | Front surface (protective film 150A) | Back layer | h-PP (NOVATEC EA9FTD) [% by weight] | 100.00 | 100.00 | 100.00 | 100.00 |
| | | | Antiblocking agent (KINOPLUS FPP-AB05A) | | | | |
| | | | Thickness [μm] | 10 | 10 | 10 | 10 |
| | | Shielding layer | Binder resin b-PP (NOVATEC EC9GD) [% by weight] | 98.90 | 99.20 | 99.50 | 99.65 |
| | | | White masterbatch (L-11165MFT) [% by weight] | 1.10 | 0.80 | 0.50 | 0.35 |
| | | | Content of titanium oxide [% by weight] | 0.66 | 0.48 | 0.30 | 0.21 |
| | | | Thickness [μm] | 30 | 30 | 30 | 30 |
| | | Pressure sensitive adhesive layer | Thickness [μm] | 10 | 10 | 10 | 10 |
| | | Total light transmittance [%] | | 58 | 65 | 74 | 77 |
| | | Average thickness(total thickness) [μm] | | 50 | 50 | 50 | 50 |
| | Back surface (protective film 150B) | Colored layer | Binder resin b-PP (NOVATEC EC9GD) [% by weight] | 100.0 | 100.0 | 100.0 | 100.0 |
| | | | Blue colorant Sumiplast Blue SR [% by weight] | — | — | — | — |
| | | Shielding layer | White masterbatch (L-11165MFT) [% by weight] | — | — | — | — |
| | | | Content of titanium oxide [% by weight] | — | — | — | — |
| | | | Thickness [μm] | 30 | 30 | 30 | 30 |
| | | Total light transmittance [%] | | 90 | 90 | 90 | 90 |
| | | Average thickness [μm] | | 50 | 50 | 50 | 50 |
| Light-transmitting resin sheet | | Resin layer | Polycarbonate resin [% by weight] | 99.90 | 99.90 | 99.90 | 99.90 |
| | | | Blue colorant Sumiplast Blue SR [% by weight] | 0.10 | 0.10 | 0.10 | 0.10 |
| | | | Thickness [μm] | 300 | 300 | 300 | 300 |
| Evaluation | Distinguishability of front and back sides of sheet | | | A | A | A | B |
| | Visibility of marking on light-transmitting resin sheet | | | A | A | A | A |

TABLE 5-3

| | | | | Example | | | |
|---|---|---|---|---|---|---|---|
| | | | | 9E | 10E | 11E | 12E |
| Protective film | Front surface (protective film 150A) | Back layer | h-PP (NOVATEC EA9FTD) [% by weight] | 100.00 | 100.00 | 100.00 | 100.00 |
| | | | Antiblocking agent (KINOPLUS FPP-AB05A) | | | | |
| | | | Thickness [μm] | 10 | 10 | 10 | 10 |
| | | Shielding layer | Binder resin b-PP (NOVATEC EC9GD) [% by weight] | 98.40 | 98.90 | 99.20 | 97.50 |
| | | | White masterbatch (L-11165MFT) [% by weight] | 1.60 | 1.10 | 0.80 | 2.50 |
| | | | Content of titanium oxide [% by weight] | 0.96 | 0.66 | 0.48 | 1.50 |
| | | | Thickness [μm] | 30 | 30 | 30 | 30 |
| | | Pressure sensitive adhesive layer | Thickness [μm] | 10 | 10 | 10 | 10 |
| | | Total light transmittance [%] | | 28 | 50 | 65 | 14 |
| | | Average thickness(total thickness) [μm] | | 50 | 50 | 50 | 50 |
| | Back surface (protective film 150B) | Colored layer | Binder resin b-PP (NOVATEC EC9GD) [% by weight] | 99.50 | 99.50 | 99.50 | 100.0 |
| | | | Blue colorant Sumiplast Blue SR [% by weight] | 0.50 | 0.50 | 0.50 | — |
| | | Shielding layer | White masterbatch (L-11165MFT) [% by weight] | — | — | — | — |
| | | | Content of titanium oxide [% by weight] | — | — | — | — |
| | | | Thickness [μm] | 30 | 30 | 30 | 30 |
| | | Total light transmittance [%] | | 90 | 90 | 90 | 90 |
| | | Average thickness [μm] | | 50 | 50 | 50 | 50 |
| Light-transmitting resin sheet | | Resin layer | Polycarbonate resin [% by weight] | 100.0 | 100.0 | 100.0 | 99.90 |
| | | | Blue colorant Sumiplast Blue SR [% by weight] | — | — | — | 0.10 |
| | | | Thickness [μm] | 300 | 300 | 300 | 300 |
| Evaluation | Distinguishability of front and back sides of sheet | | | A | A | A | A |
| | Visibility of marking on light-transmitting resin sheet | | | B | A | A | D |

TABLE 5-4

| | | | | Example | Comparative Example | | |
|---|---|---|---|---|---|---|---|
| | | | | 138 | 1E | 2E | 3E |
| Protective film | Front surface (protective film 150A) | Back layer | h-PP (NOVATEC EA9FTD) [% by weight] | 95.00 | 100.00 | 100.00 | 100.00 |
| | | | Antiblocking agent (KINOPLUS FPP-AB05A) | 5.00 | | | |
| | | | Thickness [μm] | 10 | 10 | 10 | 10 |
| | | Shielding layer | Binder resin b-PP (NOVATEC EC9GD) [% by weight] | 98.40 | 100.00 | 100.00 | 98.90 |
| | | | White masterbatch (L-11165MFT) [% by weight] | 1.60 | 0.0 | 0.0 | 1.10 |
| | | | Content of titanium oxide [% by weight] | 0.96 | 0.0 | 0.0 | 0.66 |
| | | | Thickness [μm] | 30 | 30 | 30 | 30 |
| | | Pressure sensitive adhesive layer | Thickness [μm] | 10 | 10 | 10 | 10 |
| | | Total light transmittance [%] | | 41 | 90 | 90 | 58 |
| | | Average thickness(total thickness) [μm] | | 50 | 50 | 50 | 50 |
| | Back surface (protective film 150B) | Colored layer | Binder resin b-PP (NOVATEC EC9GD) [% by weight] | 100.0 | 100.0 | 99.95 | 99.37 |
| | | | Blue colorant Sumiplast Blue SR [% by weight] | — | — | 0.10 | — |

TABLE 5-4-continued

| | | | Example | Comparative Example | | |
|---|---|---|---|---|---|---|
| | | | 138 | 1E | 2E | 3E |
| | Shielding layer | White masterbatch (L-11165MFT) [% by weight] | — | — | — | 1.10 |
| | | Content of titanium oxide [% by weight] | — | — | — | 0.66 |
| | | Thickness [μm] | 30 | 30 | 30 | 30 |
| | Total light transmittance [%] | | 90 | 90 | 90 | 58 |
| | Average thickness [μm] | | 50 | 50 | 50 | 50 |
| Light-transmitting resin sheet | Resin layer | Polycarbonate resin [% by weight] | 99.90 | 100.0 | 100.0 | 99.90 |
| | | Blue colorant Sumiplast Blue SR [% by weight] | 0.10 | — | — | 0.10 |
| | | Thickness [μm] | 300 | 300 | 300 | 300 |
| Evaluation | Distinguishability of front and back sides of sheet | | A | D | D | D |
| | Visibility of marking on light-transmitting resin sheet | | A | A | A | A |

As shown in Tables 5-1, 5-2, 5-3 and 5-4, in the resin sheet laminate of each of Examples, since the protective film attached to the front surface had light-shielding property and any one of the protective film or the light-transmitting resin sheet attached to the back surface was colored, it was possible to determine the front and back sides of the resin sheet laminate.

On the other hand, in the resin sheet laminate of each of Comparative Examples, since one of the fact that the protective film attached to the front surface had light-shielding property and the fact the protective film or the light-transmitting resin sheet attached to the back surface was colored was not satisfied, it was not possible to determine the front and back sides of the resin sheet laminate.

INDUSTRIAL APPLICABILITY

According to the present invention, in the protective film, a trouser elongation strain at break in a direction inclined at 45° to both MD and TD of the protective film, which is measured in accordance with JIS K 7128-1 (1998), is set to 300% or less. In this way, by setting the trouser elongation strain at break in a direction inclined at 45° to both MD and TD of the protective film to the above-described upper limit value or less, it is possible to, in a case of punching a resin substrate and then peeling off the protective film from the resin substrate, accurately suppress or prevent a pressure sensitive adhesive layer from remaining as so-called whiskers in which the pressure sensitive adhesive layer extends to the resin substrate side on a cut surface which is formed by carrying out the punching. Accordingly, in a case where the resin substrate is applied to, for example, a resin substrate of a lens for sunglasses, the lens for sunglasses can be manufactured with high yield. Accordingly, the present invention has industrial applicability.

The invention claimed is:

1. A protective film which is used by being attached to a resin substrate in a case of performing heat bending on the resin substrate while heating the resin substrate, the protective film comprising:

a base material layer;

a pressure sensitive adhesive layer which is positioned between the base material layer and the resin substrate, and is adhered to the resin substrate, wherein the base material layer is composed of a laminate including a first layer which is positioned on a side opposite to the pressure sensitive adhesive layer and a second layer which is positioned on a side of the pressure sensitive adhesive layer, wherein the protective film has a degree of crystallinity of 17% or more and 60% or less, wherein the protective film has a trouser elongation strain at break of 300% or less in a direction inclined at 45° to both MD and TD of the protective film, which is measured in accordance with JIS K 7128-1 (1998).

2. The protective film according to claim 1, wherein the protective film has a trouser elongation strain at break of 50% or more and 250% or less in the directions inclined at 45° to both MD and TD of the protective film, which is measured in accordance with JIS K 7128-1 (1998) after heating the protective film at 145° C. for 30 minutes and cooling the heated protective film at 25° C. for 30 minutes.

3. The protective film according to claim 1, wherein the protective film has a nominal tensile strain at break of 400% or more and 650% or less, which is measured with an autograph manufactured by Shimadzu Corporation (tensile speed: 500 mm/min) in accordance with JIS K 7127 using a test piece (No. 1 dumbbell) obtained from the protective film under an atmosphere of 23° C. and 60% RH.

4. The protective film according to claim 1, wherein the first layer contains a thermoplastic resin as a main material and a melting point of the first layer is 150° C. or higher, and the second layer contains a thermoplastic resin as a main material and a melting point of the second layer is 120° C. or higher.

5. The protective film according to claim 4, wherein both the thermoplastic resin contained in the first layer and the thermoplastic resin contained in the second layer are polyolefins.

6. A resin substrate with protective film comprising

The resin substrate; and the protective films according to claim 1 attached to both surfaces of the resin substrate.

7. The resin substrate with protective films according to claim 6, wherein at least one side constituting an edge of the resin substrate forms a curved convex curve in a plan view.

8. The resin substrate with protective films according to claim 6, wherein a coating layer, which is formed of a single layer or a laminate having at least one layer of a polycarbonate resin layer, a polyamide resin layer, and a cellulose resin layer, is provided on one surface or the other surface of the resin substrate, or the coating layers are provided on both surfaces of the resin substrate.

9. The resin substrate with protective films according to claim 6, wherein the resin substrate is subjected to the heat bending by carrying out press molding or vacuum molding.

10. A resin sheet laminate comprising:

a light-transmitting resin sheet having light-transmitting properties; and protective films peelably laminated on both surfaces of the light-transmitting resin sheet, wherein one protective film contains a light-shielding material and has light-shielding property, and at least one of the other protective film and the light-transmitting resin sheet is colored in a color different from that of the light-shielding material.

11. A protective film which is used by being attached to a resin substrate in a case of performing heat bending on the resin substrate while heating the resin substrate, the protective film comprising:

a base material layer; and a pressure sensitive adhesive layer which is positioned between the base material layer and the resin substrate, and is adhered to the resin substrate, wherein the base material layer is composed of a laminate including a first layer which is positioned on a side opposite to the pressure sensitive adhesive layer and a second layer which is positioned on a side of the pressure sensitive adhesive layer, wherein the first layer contains a thermoplastic resin as a main material and a melting point of the first layer is 150° C. or higher, the second layer contains a thermoplastic resin as a main material and a melting point of the second layer is 120° C. or higher, and the pressure sensitive adhesive layer contains a thermoplastic resin as a main material and a melting point of the pressure sensitive adhesive layer is 110° C. or lower, and the pressure sensitive adhesive layer has a surface roughness Ra of 0.20 μm or less in a surface on a side of the resin substrate, which is measured in accordance with JIS B 0601, and in a case where, using an autograph manufactured by Shimadzu Corporation (tensile speed: 500 mm/min), a test piece (No. 1 dumbbell) obtained from the protective film was measured in accordance with JIS K 7127 under an atmosphere of 23° C. and 60% RH, an elastic modulus of the test piece is in a range of 300 MPa or more and 600 MPa or less.

12. A protective film which is used by being attached to a resin substrate in a case of performing heat bending on the resin substrate while heating the resin substrate, and subsequently being peeled off from the resin substrate after the heat bending, the protective film comprising:

a base material layer; and a pressure sensitive adhesive layer which is positioned between the base material layer and the resin substrate, and is adhered to the resin substrate, wherein the base material layer is composed of a laminate including a first layer which is positioned on a side opposite to the pressure sensitive adhesive layer and a second layer which is positioned on a side of the pressure sensitive adhesive layer, wherein the second layer consists of homo polypropylene (h-PP) and styrene-ethylene-propylene-styrene block copolymer (SEPS), h-PP and styrene-ethylene-butylene-styrene block copolymer (SEBS), or block polypropylene (b-PP), and the protective film is configured such that, in a case where the protective film is peeled off from the resin substrate, a surface of the pressure sensitive adhesive layer on a side of the resin substrate is charged with a negative charge, and by the negative charge, a surface of the resin substrate on a side of the pressure sensitive adhesive layer is charged with a positive charge.

13. A protective film which is used by being attached to a resin substrate in a case of performing heat bending on the resin substrate while heating the resin substrate, the protective film comprising:

a base material layer; and a pressure sensitive adhesive layer which is positioned between the base material layer and the resin substrate, and is adhered to the resin substrate, wherein the base material layer is composed of a laminate including a first layer which is positioned on a side opposite to the pressure sensitive adhesive layer and a second layer which is positioned on a side of the pressure sensitive adhesive layer, wherein the pressure sensitive adhesive layer consists of at least one selected from linear low-density polyethylene (LLDPE) and high-density polyethylene (HDPE) having a melting point of 106° C. or higher, and at least one selected from ethylene-methacrylic acid copolymer (EMMA), ethylene-methyl acrylate copolymer (EMA), LLDPE having a melting point of 93° C. or lower, an α-polyolefin resin/polyethylene copolymer elastomer, an α-polyolefin resin/polypropylene copolymer elastomer and an α-polyolefin resin/polybutene copolymer elastomer, and the pressure sensitive adhesive layer contains polyolefin having pressure sensitive adhesiveness as a main material and has two or more different melting points.

* * * * *